US009846909B2

(12) United States Patent
Cormack et al.

(10) Patent No.: US 9,846,909 B2
(45) Date of Patent: *Dec. 19, 2017

(54) DIRECTED ORDER

(71) Applicant: NYSE Group, Inc., New York, NY (US)

(72) Inventors: Michael A. Cormack, Evanston, IL (US); Jennifer L. Drake, Evanston, IL (US); Thomas F. Haller, Longwood, FL (US); Robert A. Hill, LaGrange, IL (US)

(73) Assignee: NYSE Group, Inc., New York, NY (US)

( * ) Notice: Subject to any disclaimer, the term of this patent is extended or adjusted under 35 U.S.C. 154(b) by 185 days.

This patent is subject to a terminal disclaimer.

(21) Appl. No.: 14/549,244

(22) Filed: Nov. 20, 2014

(65) Prior Publication Data

US 2015/0081515 A1 Mar. 19, 2015

Related U.S. Application Data

(60) Continuation of application No. 14/309,230, filed on Jun. 19, 2014, which is a division of application No.
(Continued)

(51) Int. Cl.
*G06Q 40/00* (2012.01)
*G06Q 40/04* (2012.01)
(Continued)

(52) U.S. Cl.
CPC ............ *G06Q 40/04* (2013.01); *G06Q 30/08* (2013.01); *G06Q 40/06* (2013.01)

(58) Field of Classification Search
CPC ........ G06Q 40/00; G06Q 30/00; G06Q 40/04; G06Q 40/06; G06Q 30/08; G06Q 30/06
(Continued)

(56) References Cited

U.S. PATENT DOCUMENTS 5,101,353 A 3/1992 Lupien et al.
5,560,580 A 10/1996 Almoslino
(Continued)

FOREIGN PATENT DOCUMENTS

AU 2006244479 5/2006
AU 2006244483 5/2006
(Continued)

OTHER PUBLICATIONS

John Hintze, Directed Order Decision Polarizes Exchanges, Security Industry News, Jun. 13, 2005, Securities Data Publishing.
(Continued)

*Primary Examiner* — Hani M Kazimi
(74) *Attorney, Agent, or Firm* — DLA Piper LLP (US)

(57) ABSTRACT

A directed order process and related market center are disclosed, wherein a market center grants permission to order sending firms to send directed order flow to participating designated market makers. Such designated market makers create a virtual guarantee order book for each permissioned order sending firm. If an order sending firm sends a directed order to the market center that is marketable against a virtual guarantee order, then the market center automatically pairs the orders in a two-sided directed cross order instruction, which executes against any superior trading interest in the marketplace first before crossing.

18 Claims, 17 Drawing Sheets

Related U.S. Application Data

11/525,363, filed on Sep. 22, 2006, now Pat. No. 8,799,131.

(60) Provisional application No. 60/720,164, filed on Sep. 23, 2005.

(51) Int. Cl.
*G06Q 30/08* (2012.01)
*G06Q 40/06* (2012.01)

(58) Field of Classification Search
USPC .......................................................... 705/37
See application file for complete search history.

(56) References Cited

U.S. PATENT DOCUMENTS

| | | |
|---|---|---|
| 5,845,266 A | 12/1998 | Lupien et al. |
| 5,905,974 A | 5/1999 | Fraser et al. |
| 5,950,176 A | 9/1999 | Keiser et al. |
| 6,012,046 A | 1/2000 | Lupien et al. |
| 6,098,051 A | 8/2000 | Lupien et al. |
| 6,278,982 B1 | 8/2001 | Korhammer et al. |
| 6,343,278 B1 | 1/2002 | Jain et al. |
| 6,377,940 B2 | 4/2002 | Tilfors et al. |
| 6,405,180 B2 | 6/2002 | Tilfors et al. |
| 6,408,282 B1 | 6/2002 | Buist |
| 6,505,174 B1 | 1/2003 | Keiser et al. |
| 6,505,175 B1 | 1/2003 | Silverman et al. |
| 6,615,188 B1 | 9/2003 | Breen et al. |
| 6,714,948 B1 | 3/2004 | Richards |
| 6,829,589 B1 | 12/2004 | Saliba |
| 6,832,210 B1 | 12/2004 | Li |
| 6,850,907 B2 | 2/2005 | Lutnick et al. |
| 6,963,856 B2 | 11/2005 | Lutnick et al. |
| 6,983,260 B2 | 1/2006 | Hummelgren |
| 7,162,448 B2 | 1/2007 | Madoff et al. |
| 7,184,982 B1 | 2/2007 | Howorka et al. |
| 7,197,483 B2 | 3/2007 | Brady et al. |
| 7,209,896 B1 | 4/2007 | Serkin et al. |
| 7,225,153 B2 | 5/2007 | Lange |
| 7,242,669 B2 | 7/2007 | Bundy et al. |
| 7,246,090 B1 | 7/2007 | Thomas |
| 7,249,086 B2 | 7/2007 | Bloom et al. |
| 7,356,498 B2 | 4/2008 | Kaminsky et al. |
| 7,383,220 B1 | 6/2008 | Keith |
| 7,401,046 B2 | 7/2008 | Hollerman et al. |
| 7,406,447 B2 | 7/2008 | Moore et al. |
| 7,467,110 B2 | 12/2008 | Muller et al. |
| 7,685,057 B2 | 3/2010 | Chiulli et al. |
| 7,765,137 B1 | 7/2010 | Adcock et al. |
| 7,873,544 B2 | 1/2011 | Adcock et al. |
| 7,873,561 B1 | 1/2011 | Adcock et al. |
| 7,877,316 B2 | 1/2011 | Adcock et al. |
| 7,908,201 B2 | 3/2011 | Adcock et al. |
| 7,912,775 B1 | 3/2011 | Brill et al. |
| 7,917,418 B2 | 3/2011 | Jimenez et al. |
| 7,937,315 B2 | 5/2011 | Adcock et al. |
| 7,949,596 B2 | 5/2011 | Adcock et al. |
| 8,195,557 B2 | 6/2012 | Adcock et al. |
| 8,301,542 B2 | 10/2012 | Adcock et al. |
| 8,311,930 B2 | 11/2012 | Adcock et al. |
| 8,600,862 B2 | 12/2013 | Adcock et al. |
| 8,635,144 B2 | 1/2014 | Waelbroeck et al. |
| 8,738,484 B2 | 5/2014 | Adcock et al. |
| 2002/0019795 A1 | 2/2002 | Madoff et al. |
| 2002/0019799 A1 | 2/2002 | Ginsberg et al. |
| 2002/0042765 A1 | 4/2002 | Dawson |
| 2002/0062273 A1 | 5/2002 | Perkel et al. |
| 2002/0082979 A1 | 6/2002 | Sands et al. |
| 2002/0091617 A1 | 7/2002 | Keith |
| 2002/0091621 A1 | 7/2002 | Conklin et al. |
| 2002/0120511 A1 | 8/2002 | Hanes |
| 2002/0128951 A1 | 9/2002 | Kiron et al. |
| 2002/0128958 A1 | 9/2002 | Slone |
| 2002/0143676 A1 | 10/2002 | Kiron et al. |
| 2002/0147670 A1 | 10/2002 | Lange |
| 2002/0161687 A1 | 10/2002 | Serkin et al. |
| 2002/0169703 A1 | 11/2002 | Lutnick et al. |
| 2002/0184135 A1 | 12/2002 | Zakarin |
| 2002/0184136 A1 | 12/2002 | Cleary |
| 2002/0198815 A1 | 12/2002 | Greifeld et al. |
| 2002/0198816 A1 | 12/2002 | Gilbert et al. |
| 2003/0004851 A2 | 1/2003 | Kiron et al. |
| 2003/0009400 A2 | 1/2003 | Kiron et al. |
| 2003/0009413 A1 | 1/2003 | Furbush et al. |
| 2003/0009414 A1* | 1/2003 | Furbush et al. ............... 705/37 |
| 2003/0014351 A1 | 1/2003 | Neff et al. |
| 2003/0023536 A1 | 1/2003 | Hollerman et al. |
| 2003/0040955 A1 | 2/2003 | Anaya et al. |
| 2003/0041006 A1 | 2/2003 | Bunda |
| 2003/0083974 A1 | 5/2003 | Bunda |
| 2003/0093343 A1 | 5/2003 | Huttenlocher et al. |
| 2003/0115131 A1 | 6/2003 | Heaton et al. |
| 2003/0130920 A1 | 7/2003 | Freund |
| 2003/0130925 A1 | 7/2003 | Malitzis |
| 2003/0130926 A1 | 7/2003 | Moore et al. |
| 2003/0139998 A1 | 7/2003 | Gilbert et al. |
| 2003/0172024 A1 | 9/2003 | Kokis et al. |
| 2003/0177082 A1 | 9/2003 | Buckwalter |
| 2003/0191703 A1 | 10/2003 | Chen et al. |
| 2003/0216932 A1 | 11/2003 | Foley |
| 2003/0229557 A1 | 12/2003 | Richmann et al. |
| 2003/0233307 A1 | 12/2003 | Salvadori et al. |
| 2004/0030630 A1 | 2/2004 | Tilfors et al. |
| 2004/0044610 A1 | 3/2004 | Fraser et al. |
| 2004/0059666 A1 | 3/2004 | Waelbroeck et al. |
| 2004/0088242 A1 | 5/2004 | Ascher et al. |
| 2004/0143538 A1 | 7/2004 | Korhaminer et al. |
| 2004/0143542 A1 | 7/2004 | Magill et al. |
| 2004/0177024 A1 | 9/2004 | Bok et al. |
| 2004/0177026 A1 | 9/2004 | Balabon |
| 2004/0210508 A1 | 10/2004 | Bohnenberger |
| 2004/0210511 A1 | 10/2004 | Waelbroeck et al. |
| 2004/0215538 A1 | 10/2004 | Smith et al. |
| 2004/0225592 A1 | 11/2004 | Churquina |
| 2004/0236662 A1 | 11/2004 | Korhammer et al. |
| 2004/0236669 A1 | 11/2004 | Horst et al. |
| 2004/0243502 A1 | 12/2004 | Slowik et al. |
| 2004/0267655 A1 | 12/2004 | Davidowitz et al. |
| 2005/0010481 A1 | 1/2005 | Lutnick et al. |
| 2005/0075963 A1 | 4/2005 | Balabon |
| 2005/0096999 A1 | 5/2005 | Newell et al. |
| 2005/0119964 A1 | 6/2005 | Brady et al. |
| 2005/0125316 A1 | 6/2005 | Levering et al. |
| 2005/0137962 A1 | 6/2005 | Penney et al. |
| 2005/0160024 A1 | 7/2005 | Soderborg et al. |
| 2005/0171887 A1 | 8/2005 | Daley et al. |
| 2005/0171888 A1 | 8/2005 | Daley et al. |
| 2005/0171889 A1 | 8/2005 | Daley et al. |
| 2005/0171890 A1 | 8/2005 | Daley et al. |
| 2005/0171891 A1 | 8/2005 | Daley et al. |
| 2005/0171895 A1 | 8/2005 | Howorka et al. |
| 2005/0197916 A1 | 9/2005 | Newell et al. |
| 2005/0222936 A1 | 10/2005 | Panariti et al. |
| 2005/0228739 A1 | 10/2005 | Leibowitz |
| 2005/0240510 A1 | 10/2005 | Schweickert et al. |
| 2005/0273407 A1 | 12/2005 | Black et al. |
| 2005/0273408 A1 | 12/2005 | Bandman et al. |
| 2005/0273419 A1 | 12/2005 | Ogg et al. |
| 2005/0283415 A1 | 12/2005 | Studnitzer et al. |
| 2005/0283421 A1 | 12/2005 | Hatheway et al. |
| 2005/0283426 A1 | 12/2005 | Krishnasami et al. |
| 2005/0283427 A1 | 12/2005 | Owens et al. |
| 2006/0020536 A1 | 1/2006 | Renfon et al. |
| 2006/0025380 A1 | 2/2006 | Thorsteinsson et al. |
| 2006/0031157 A1 | 2/2006 | Gianakouros et al. |
| 2006/0036838 A1 | 2/2006 | Salcedo et al. |
| 2006/0089898 A1 | 4/2006 | Durkin et al. |
| 2006/0089899 A1 | 4/2006 | Durkin et al. |
| 2006/0136318 A1 | 6/2006 | Rafieyan et al. |
| 2006/0136326 A1 | 6/2006 | Heckman et al. |
| 2006/0149659 A1 | 7/2006 | Carone et al. |
| 2006/0161494 A1 | 7/2006 | Littlewood |

(56) References Cited

U.S. PATENT DOCUMENTS

| | | |
|---|---|---|
| 2006/0184444 A1 | 8/2006 | McConaughy et al. |
| 2006/0206404 A1 | 9/2006 | Hatheway et al. |
| 2006/0235786 A1 | 10/2006 | DiSalvo |
| 2006/0253374 A1 | 11/2006 | Addock et al. |
| 2006/0253379 A1 | 11/2006 | Adcock et al. |
| 2006/0253380 A1 | 11/2006 | Adcock et al. |
| 2006/0253382 A1 | 11/2006 | Adcock et al. |
| 2006/0259391 A1 | 11/2006 | Schoen et al. |
| 2006/0277137 A1 | 12/2006 | Claus et al. |
| 2006/0277138 A1 | 12/2006 | Ross et al. |
| 2007/0055607 A1 | 3/2007 | Wunsch et al. |
| 2007/0073611 A1 | 3/2007 | Drake et al. |
| 2007/0078753 A1 | 4/2007 | Cormack et al. |
| 2007/0112693 A1 | 5/2007 | Cushing |
| 2007/0198391 A1 | 8/2007 | Dreyer et al. |
| 2007/0244792 A1 | 10/2007 | Couperier et al. |
| 2008/0040290 A1 | 2/2008 | Harris |
| 2008/0228622 A1 | 9/2008 | Adcock et al. |
| 2009/0030828 A1 | 1/2009 | Haller et al. |
| 2009/0125431 A1 | 5/2009 | Armstrong et al. |
| 2010/0030704 A1 | 2/2010 | Griffen et al. |

FOREIGN PATENT DOCUMENTS

| | | |
|---|---|---|
| AU | 2006244499 | 5/2006 |
| AU | 2006244562 | 5/2006 |
| AU | 2006244563 | 5/2006 |
| AU | 2006244564 | 5/2006 |
| AU | 2006244566 | 5/2006 |
| EP | 1 321 870 A1 | 6/2003 |
| JP | 2008-510109 | 4/2008 |
| JP | 2008-510110 | 4/2008 |
| JP | 2008-510226 | 4/2008 |
| JP | 2008-510238 | 4/2008 |
| SG | 2007166754 | 5/2006 |
| SG | 2007166762 | 5/2006 |
| SG | 2007166770 | 5/2006 |
| SG | 2007166788 | 5/2006 |
| SG | 2007166796 | 5/2006 |
| SG | 2007166804 | 5/2006 |
| SG | 2007166812 | 5/2006 |
| WO | 01/22322 A2 | 3/2001 |
| WO | 01/22339 A2 | 3/2001 |
| WO | 01/52166 A1 | 7/2001 |
| WO | 01/75733 A1 | 10/2001 |
| WO | 01/90925 A2 | 11/2001 |
| WO | 02/07039 A2 | 1/2002 |
| WO | 02/09008 A1 | 1/2002 |
| WO | 2004/008296 A2 | 1/2004 |
| WO | 2005/010790 A1 | 2/2005 |
| WO | 2005/036354 A2 | 4/2005 |
| WO | 2006/017901 A1 | 2/2006 |
| WO | 2006/018001 A1 | 2/2006 |
| WO | 2006/018307 A2 | 2/2006 |
| WO | 2006/121687 A2 | 11/2006 |
| WO | 2006/121688 A2 | 11/2006 |
| WO | 2006/121689 A2 | 11/2006 |
| WO | 2006/121691 A2 | 11/2006 |
| WO | 2006/121792 A2 | 11/2006 |
| WO | 2006/121796 A2 | 11/2006 |
| WO | 2006/121812 A2 | 11/2006 |
| WO | 2007/038084 A2 | 4/2007 |
| WO | 2007/038218 A2 | 4/2007 |
| WO | 2008/013776 A2 | 1/2008 |
| WO | 2008/013916 A2 | 1/2008 |
| WO | 2008/013917 A2 | 1/2008 |
| WO | 20081013828 A2 | 1/2008 |
| WO | 2008/024172 A2 | 2/2008 |
| WO | 2008027124 A2 | 3/2008 |
| WO | 2008/073252 A1 | 6/2008 |

OTHER PUBLICATIONS

Peter Chapman, Special Feature: Fragmented Dealing Under Fire, Traders, May 1, 2000, Securities Data Publishing.
A Taxonomy of Automated Trade Execution Systems, Ian Domowitz, Journal of International Money and Finance, (1993), 12, pp. 607-631.
McKinnion, Julie M., Toldeo Ohio-Based Dana Corp. Could Lose NYSE Listing in Takeover Battle, The Blade, Aug. 3, 2003.
Phlx Allows Floor Broker Crossing, Wall Street Letter, New York, Feb. 24, 2003, p. 1.
Anonymous, Rising Tide Lifts All Boats in Institutional Equities, The Investment Dealers' Digest: IDD, New York, Mar. 28, 1994, vol. 60, Issue 13, p. 16 (5 pages).
Headstrong Buys Assets of Elind Software Provider: Noticiasfinancieras, Miami Nov. 1, 2004, p. 1.
Roger D. Huang et al., Tick Size, Bid-Ask Spreads and Market Structure Feb. 8, 2001, Forthcoming Journal of Financial and Quantitative Analysis. pp. 1-29.
Bar Frijns et al., Price Discovery in Tick Time, Journal of Empirical Financial, vol. 16, Issue 5, cc. 2009, pp. 759-776.
Tseng, K.C., Supermontage as a New Trading System of NASDAQ, Investment Management and Financial Innovations, Mar. 2005.
Schnitzlein, Charles R., Call and Continuous Trading Mechanisms Under Asymmetric Information: An Experimental Investigation, The Journal of Finance, vol. 51, No. 2, pp. 613-636.
NASDAQ Launches Liquidity Tracker, HighBeam Research, Dec. 5, 2002.

* cited by examiner

DIRECTED ORDER

TECHNICAL FIELD

The disclosure relates generally to the field of electronic trading methods and systems and in particular to directed order processing in an electronic trading environment.

BACKGROUND

Market centers have utilized directed orders, also known as preferenced orders, for some time. Directed orders are orders that are sent to a market center with instructions that a specific market maker act as a contra party in executing a cross with the directed order. In prior systems, the directed order process was typically not integrated with the non-directed (or auction) process. In such directed order systems, the market maker that received a directed order could reject the order, execute it or respond with a counter-offer. Such systems are negotiation systems and because they were not integrated with the non-directed order process, directed orders in such systems executed without regard to the price-time priority of orders in the non-directed process. This had the unfavorable effect of having directed orders often trading at prices inferior to the market. In such systems, non-directed limit orders that had price and/or time priority were bypassed.

Other prior directed order systems were set up to take account of present orders in the non-directed order process, but such systems did not allow directed orders to interact with the non-directed order process. Instead, for the directed order to execute in such systems, it had to improve the order book for the market center that received the directed order and it also had to be priced at or better than the national best bid or offer ("NBBO"). Such prior systems forced a directed order to execute cleanly without marketplace interaction, as the directed order would not execute otherwise. In such systems, because a market maker was obligated to unconditionally improve the price of the market to execute with such directed orders, many market makers refused to accept directed orders.

Accordingly, there is a need for a directed order processing system that is integrated with and interacts with the non-directed order process, thereby preventing directed orders from executing at inferior prices. Additionally, there is a need for a directed order processing system that provides market makers with more flexibility in regard to specifying the prices and sizes at which they are willing to interact with incoming directed order flow. Additionally, there is a need for a directed order processing system that does not divulge the presence of, nor identify the senders of, such incoming directed order flow, thus preventing such orders from being seen or declined.

SUMMARY

According to an aspect of the present disclosure, a method includes providing a posting market center having an internal book and having a guarantee order book populated with a plurality of guarantee orders. The method further includes receiving a directed order on the posting market center and retrieving a marketable contra side guarantee order from the plurality of guarantee orders on the guarantee order book and pairing the received directed order with the retrieved guarantee order.

The method further includes ranking the retrieved guarantee order in the internal book; presenting the received directed order to the internal book; and matching the received directed order with the retrieved guarantee order in price and time priority on the internal book, whereby the received directed order interacts with the internal book and does not cross at a price that trades through the market.

DESCRIPTION OF THE DRAWINGS

These and other features, aspects and advantages of the present disclosure will become better understood with regard to the following description, appended claims and accompanying drawings where:

DETAILED DESCRIPTION

Figure 1A:
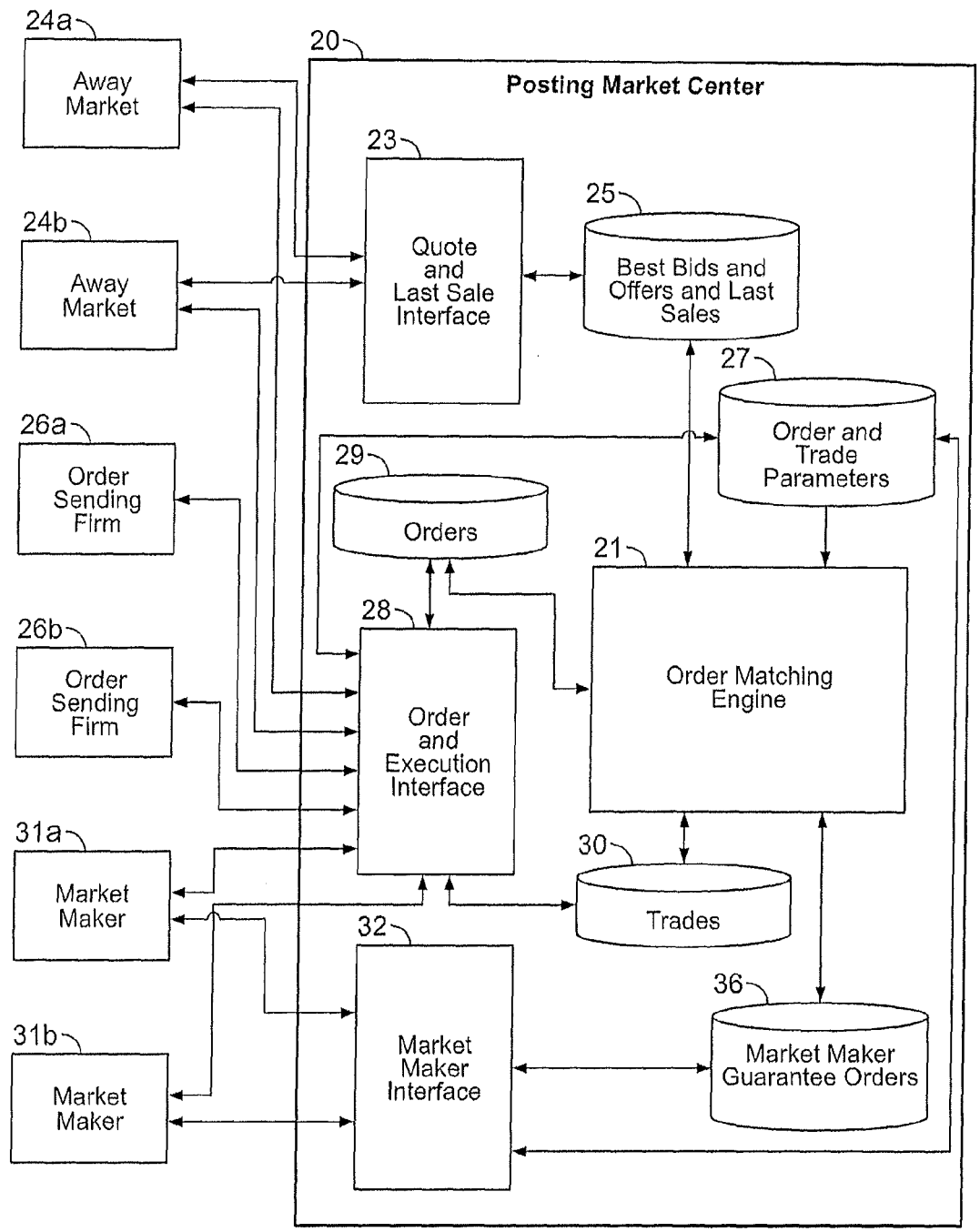
FIG. 1A is a block diagram illustrating the trading environment in which an embodiment of the present disclosure operates.

Referring to FIG. 1A, a trading environment in which an embodiment of the system and method of the present disclosure operates is depicted. The examples discussed herein describe the use and application of the present disclosure in an equity security market center environment, but it should be understood that the present disclosure could be used in any type of financial instrument market center environment (e.g., equities, futures, options, bonds, etc.). The trading environment of this embodiment includes a posting market center 20 which interacts with a number of other market centers 24 (i.e. away markets) and traders at order sending firms 26 and market makers 31. The disclosure described herein is applicable to issues with participating market makers 31; however, it should be understood that market makers 31 may provide liquidity to the posting market center 20 by way of special order types (e.g., "Q Orders") rather than (or in addition to) just using published quotes. It should also be understood that the posting market center 20 referred to herein refers to a computing system having sufficient processing and memory capabilities and does not refer to a specific physical location. In fact, in certain embodiments, the computing system may be distributed over several physical locations. It should also be understood that any number of order sending firms 26 or market makers 31 or away market centers 24 can interact with the posting market center 20. As described herein, the posting market center 20 is the market center on which a specific order sending firm 26 posts a specific order, and on which a specific market maker 31 posts a specific Q Order or quote. In this embodiment, the posting market center 20 includes an order matching engine 21, which validates, matches and processes all orders and quotes on the posting market center 20. In this embodiment, the code for the order matching engine 21 is stored in the posting market center's memory.

The posting market center 20 may also include a quote and last sale interface 23 that interacts with the away market centers 24 to capture quote and last sale information. This information is stored to a best bids and offers and last sales data structure 25. This data structure 25 is where the market best bid and offer information is stored. This data structure 25 is also where the market trade reports (prints) are stored. The posting market center 20 may also include an order and trade parameters data structure 27. The order and trade parameters data structure 27 stores pre-defined trading parameters and rules that are used by the order matching engine 21 in matching orders and executing trades. The posting market center 20 may also include an order and execution interface 28 which interacts with the traders at order sending firms 26, the market makers 31, the away market centers 24 and the order matching engine 21 in the order designation and execution process. The posting market center 20 may also include an order information data structure 29 where order information is stored, and a trade information data structure 30 where completed trade information is stored. The posting market center 20 may also include a market maker interface 32 that interacts with market makers 31 to capture market maker bids, offers and guarantee order information, as explained below, in assigned issues. In this illustration, guarantee orders are logically depicted in a market maker guarantee order structure 36, whereas market makers bids and offers consist of Q Orders that are logically depicted in the order information data structure 29. In another embodiment, the market maker bids and offers may consist of quotes that are logically depicted in the away market center best bids and offers data structure 25, or in a separate data structure not shown in this illustration. Q Orders and quotes are ranked and executed like any other fully-displayed limit-priced order type.

Throughout the discussion herein, it should be understood that the details regarding the operating environment, data structures, and other technological elements surrounding the posting market center 20 are by way of example and that the present disclosure may be implemented in various differing forms. For example, the data structures referred to herein may be implemented using any appropriate structure, data storage, or retrieval methodology (e.g., local or remote data storage in data bases, tables, internal arrays, etc.). Furthermore, a market center of the type described herein may support any type of suitable interface on any suitable computer system.

Figure 1B:
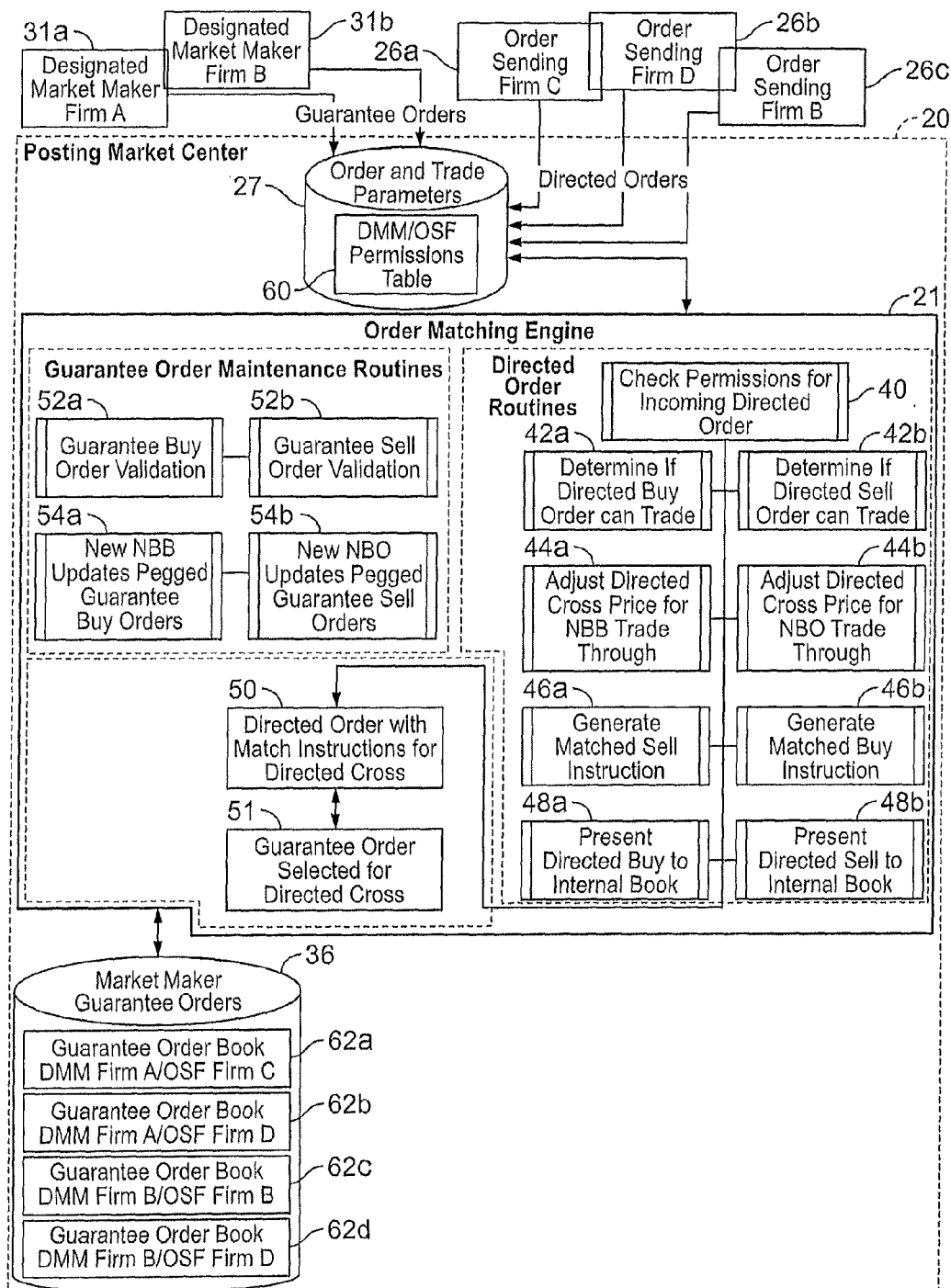
FIG. 1B illustrates an overview of the architecture involved in the directed order process.

Referring now to FIG. 1B, a more detailed illustration of the portion of the posting market center 20 that is involved in the directed order process of this disclosure is depicted. Specifically, as depicted, the order matching engine 21 includes directed order routines and guarantee order maintenance routines. In this embodiment, the directed order routines include a routine to check permissions for incoming directed orders 40, a routine to determine if directed buy orders can trade 42a, a routine to determine if directed sell orders can trade 42b, a routine to adjust a directed cross order's price for national best bid ("NBB") trade through 44a, a routine to adjust a directed cross order's price for national best offer ("NBO") trade through 44b, a routine to generate a matched sell instruction 46a, a routine to generate a matched buy instruction 46b, a routine to present a directed buy to the internal book 48a and a routine to present a directed sell to the internal book 48b. These routines when activated result in a directed order with match instructions for a directed cross 50 and a guarantee order selected for the directed cross 51. In this embodiment, the guaranteed order maintenance routines include a routine to validate guarantee buy orders 52a, a routine to validate guarantee sell orders 52b, a routine to update pegged guarantee buy orders based on a new NBB 54a and a routine to update pegged guarantee sell orders based on a new NBO 54b.

The posting market center 20 illustrated in FIG. 1B further includes a designated market maker and order sending firm ("DMM/OSF") permissions table 60 which, in this embodiment, is located in the order and trade parameters data structure 27. The posting market center 20 also includes guarantee order book data tables 62 which, in this embodiment, are located on the market maker guarantee orders data structure 36, As illustrated in FIG. 1B, in a preferred embodiment, when a market making firm 31 is willing to accept directed orders from a specific order sending firm 26, the market making firm 31 creates a book 62 of virtual, non-disclosed guarantee orders exclusively allocated for that order sending firm 26. Then, when an order sending firm 26 desires to trade with that specific market making firm 31, the order sending firm 26 sends a directed order to the posting market center 20 indicating that preference. If the directed order is permissioned and is marketable against the best contra guarantee order, the orders are automatically paired on the posting market center 20, and the cross is evaluated for possible interaction with superior orders and/or quotes. The validation, pairing, and execution of this mutual trading interest are, in this embodiment, handled completely electronically by the directed order process using the routines resident in the order matching engine 21.

When a directed order and a guarantee order are paired for execution, the two-sided order is referred to as a "directed cross" order herein. As will be described in detail, a directed cross order conforms to all prevailing marketplace regulations regarding the protection of displayed orders and quotes. Note that while this document uses the equities marketplace as its model, this disclosure may also be applicable to other financial markets, including options and futures marketplaces.

As referred to herein, the routines that validate, maintain, price, execute, or reject the directed orders and the guarantee orders constitute the directed order process. All processing outside of the directed order process is commonly referred to as the continuous order matching process. Non-directed orders execute solely in the continuous order matching process, as do directed orders that have been automatically converted to non-directed orders because they are either not eligible to participate in the directed order process or else because they have exhausted the trading opportunities available in the directed order process and are eligible for additional matching opportunities.

In a preferred embodiment, the directed order process acts as described below. Before a regular trading session begins, designated market makers 31 create a two-sided guarantee order book 62 for each of the order sending firms 26 that are permissioned to send those market makers 31 directed order flow. The posting market center 20 grants (or denies) permission to order sending firms 26 that prefer to send orders to a specific designated market maker 31. Order sending firms 26 can only send directed orders to the specific designated market makers 31 that have been permissioned by the posting market center 20 to receive directed order flow from them. In a preferred embodiment, market makers 31 can choose to send limit-priced guarantee orders, primary peg guarantee orders or any other type of guarantee order supported by the posting market center 20. Market makers 31 may also combine different guarantee order types in the same guarantee order book. For example, a market maker 31 may elect to send pegged orders whose prices will follow the NBBO and also send limit orders at prices away from the market in case "circuit breakers" are needed.

The trading relationship between each order sending firm 26 and designated market maker 31 is established via a routing permissions table, referred to as the "DMM/OSF permissions table" 60 in this document. The DMM/OSF permissions table 60 contains an entry for each permissioned DMM/OSF pair, for each issue in which they can trade preferentially.

The DMM/OSF permissions table 60 allows orders to be directed on a firm-wide basis or on an order-by-order basis. For example, an order sending firm 26 may elect to have all their directed orders automatically default to route to a particular designated market maker 31. But if they wish to route specific directed orders to a different designated market maker 31, they can override the default by explicitly sending the preferred designated market maker's identifier on those selected orders.

The posting market center's rules allow more than one designated market maker 31 to be registered in most issues, but not every issue will have a designated market maker 31. In cases where an issue does not have a registered designated market maker 31, the directed order process will attempt to determine a default designated market maker 31 where possible.

Figure 2:
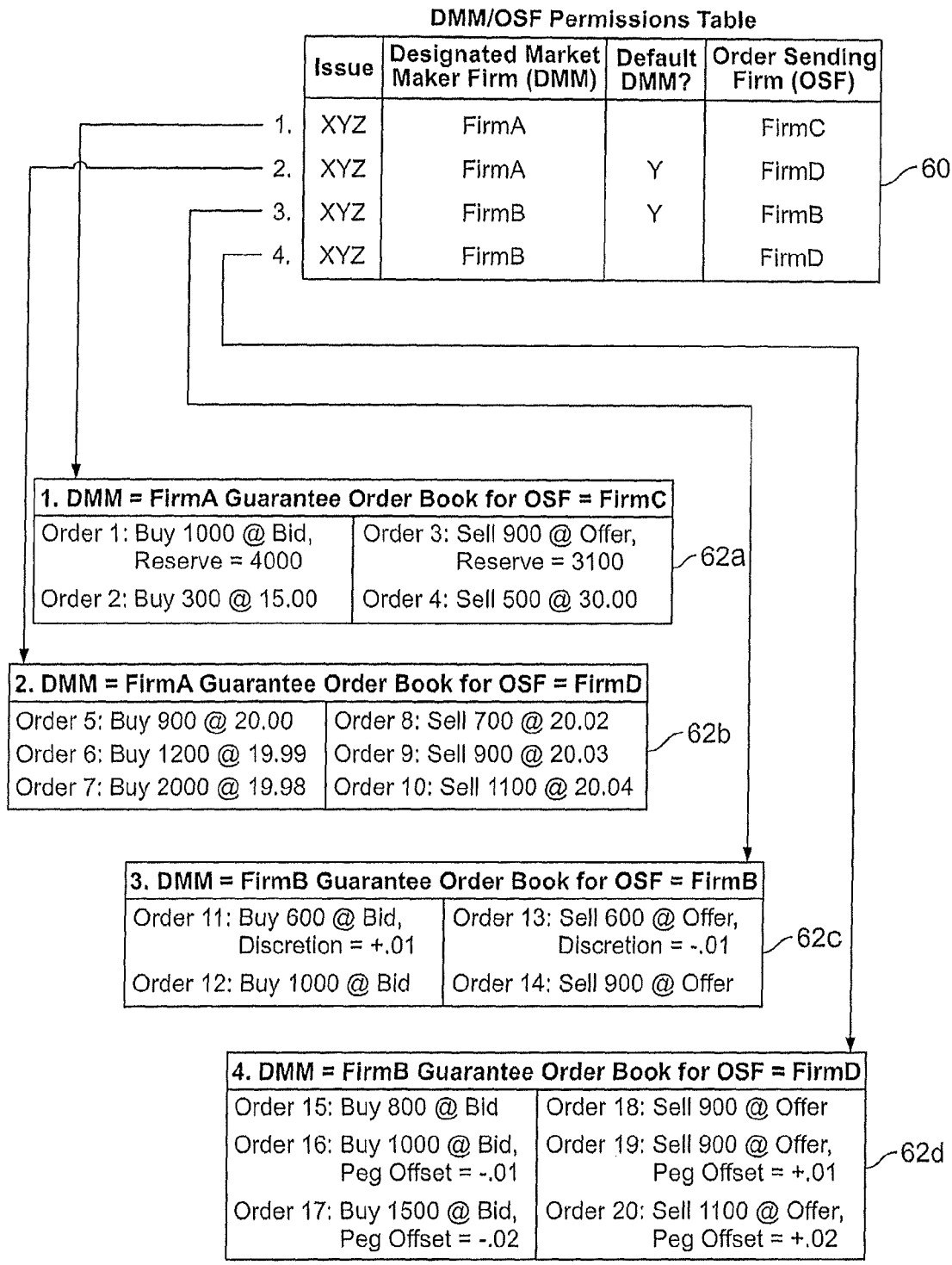
FIG. 2 is an exemplary designated market maker/order sending firm permissions table.

The example that follows, along with FIGS. 1B and 2, illustrates the routing permissions for an instrument, Issue XYZ. In this example, the DMM/OSF permissions table 60 contains the following entries:

| Issue | Designated Market Maker Firm (DMM) | Default DMM? | Order Sending Firm (OSF) |
|---|---|---|---|
| XYZ | FirmA | | FirmC |
| XYZ | FirmA | Y | FirmD |
| XYZ | FirmB | Y | FirmB |
| XYZ | FirmB | | FirmD |

Issue XYZ has two designated market makers 31, Firm A 31a and Firm B 31b. Firm A 31a is permissioned to receive directed orders from two order sending firms 26: Firm C 26a and Firm D 26b. Firm B 26c is permissioned to received directed orders from two order sending firms: Firm B 26c and Firm D 26b. As illustrated in this example, a firm may be permissioned to direct orders to itself, as is the case for Firm B. For example, the retail desk of Firm B 26c may direct orders to the market making desk of Firm B 31b.

Every row in the DMM/OSF permissions table 60 represents a DMM/OSF pair. Each DMM/OSF pair has a corresponding two-sided book of guarantee orders 62 that the designated market maker 31 allocates exclusively for trading against the specified order sending firm 26, as depicted in FIG. 1B 62a-62d. When an order sending firm 26 sends a directed order, the order is automatically routed to the order book 62 having the guarantee orders allocated for that order sending firm 26.

In this example, as Firm A has agreed to accept directed orders from Firm C, Firm A must submit buy and sell orders to a guarantee order book exclusively allocated for Firm C 62a. As Firm A has also agreed to accept directed orders from Firm D, Firm A must also submit buy and sell orders to a separate guarantee order book exclusively allocated for Firm D 62b. The table shows that Firm B accepts directed orders from itself and also from Firm D. Firm B must therefore submit buy and sell orders to its guarantee order book for matching with Firm B 62c, and it must likewise submit buy and sell orders to a separate guarantee order book for matching with Firm D 62d.

By supporting a different guarantee order book for each DMM/OSF pair, in this embodiment of the disclosure, designated market makers 31 are allowed to price and size their guarantee orders differently for each order sending firm 26, as depicted in FIG. 2. For example, a designated market maker 31 could offer price improvement to one order sending firm 26, but could choose to trade at or outside the NBBO with a different order sending firm 26.

As specified in the DMM/OSF permissions table 60, Firm A is the default designated market maker 31 for all directed orders from Firm D in symbol XYZ. If Firm D sends a directed order to the posting market center 20 in issue XYZ and does not specify a designated market maker 31 on the order, then the directed order process routes the order to Firm A's guarantee order book 62b for Firm D by default. If Firm D wishes to send a directed order in XYZ to Firm B instead, then Firm D must explicitly specify Firm B as the designated market maker on an order-by-order basis.

Firm B is the default designated market maker for directed orders from Firm B. If Firm B sends a directed order to the posting market center 20 in issue XYZ and does not specify a designated market maker 31 on the order, then the directed order process routes the order to Firm B's guarantee order book 62c for Firm B by default.

If Firm C sends a directed order to the posting market center 20 in issue XYZ and does not specify a designated market maker 31, then the directed order process does not derive a default designated market maker because this information is not explicitly provided in the DMM/OSF permissions table 60. The directed order process then passes the incoming directed order to the regular continuous order matching process, where it is processed as if it were a regular non-directed order.

Types of Orders Available in a Preferred Embodiment

In one embodiment, the posting market center 20 supports a variety of order types as shown in the table below. It should be understood that any variation or combination of these order types could be used in other embodiments of the disclosure.

| In one embodiment, order sending firms may send these directed order types to designated market makers with whom they have a preferred relationship: | In one embodiment, designated market makers may send these guarantee order types to the virtual guarantee order books allocated for permissioned order sending firms: |
|---|---|
| Sweep Limit<br>Inside Limit<br>Sweep Market<br>Inside Market<br>Exchange-Restricted<br>Immediate or Cancel ("IOC") | Limit<br>Primary Peg |

In another, more complex embodiment, designated market makers may send primary peg guarantee orders with one or more additional pegging attributes, as shown in the table below.

| In another embodiment, order sending firms may send these directed order types to designated market makers with whom they have a preferred relationship: | In another embodiment, designated market makers may send these guarantee order types to the virtual guarantee order books allocated for permissioned order sending firms: |
|---|---|
| Sweep Limit | Limit |
| Inside Limit | Primary Peg |
| Sweep Market | with Reserve |
| Inside Market | with Peg Limit |
| Exchange-Restricted | with Peg Offset |
| IOC | with Discretion Offset |

Order sending firms 26 send directed orders to designated market makers 31 with the hope, but not guarantee, of receiving a fill. An order sending firm 26 must send a directed order whose price is marketable against a resting guarantee order for a directed cross to be possible. Even if an incoming directed order is marketable against a resting guarantee order, a directed cross execution is not ensured. It is possible that the incoming directed order cannot interact with away markets due to the matching rules inherent in its order type, and therefore cannot participate in a directed cross because it would cause a trade-through violation. It is also possible that after an incoming directed order executes against superior trading interest in the marketplace, it may not have any Leaves quantity available to cross with the guarantee order.

Regardless of the underlying order type used in the directed order, in this embodiment, all directed orders must first satisfy superior trading interest before being allowed to cross with a paired guarantee order. The underlying order type determines whether the directed order can route or not; the number of price levels at which the directed order can route; and the disposition of any remaining quantity in the directed order after it has, crossed with a paired guarantee order. The rules for processing each different directed order type in this embodiment are described below.

Directed Sweep Limit Order

A directed sweep limit order can trade with any bid or offer in the marketplace. If a directed sweep limit order must interact with the marketplace, it will concurrently match, in price/time priority:

Passive liquidity orders whose nondisplayed prices are superior to the NBBO and superior to the directed cross Orders whose displayed prices are superior to the directed cross Away market quotes whose prices are superior to the directed cross Orders whose displayed prices are equal to the directed cross The paired guarantee order presented for the directed cross If any shares of the incoming directed sweep limit order remain after crossing the guarantee order, the matching engine 21 subsequently treats the directed sweep limit order as if it were a regular, non-directed sweep limit order. Accordingly, if the unmatched shares are marketable, the matching engine 21 attempts to execute the remainder of the sweep limit order against all book orders and away market quotes in price/time priority, until the sweep limit order is either exhausted or becomes nonmarketable. If any unmatched shares are not marketable, the matching engine 21 posts the remainder of the sweep limit order to the public order book.

Directed Sweep Market Order

A directed sweep market order, in a preferred embodiment, behaves exactly like a directed sweep limit order, except that the order is not capped by a limit price and is never posted. Accordingly, a directed sweep market order executes until it is exhausted.

Directed Inside Limit Order

A directed inside limit order can only execute at the NBBO. As a result, an incoming directed inside limit order must be paired with a guarantee order whose price is at or better than the best away market quote for the resulting directed cross price to be valid. If the guarantee order's price is worse than the best away market quote, then the resulting directed cross price is not valid because it would trade through an away market quote if executed. In such a case, the incoming directed inside limit order cannot trade in the directed order process, and the entire order is treated as a non-directed inside limit order in the regular continuous order matching process instead.

If the directed inside limit order cannot cross cleanly and must interact with the marketplace, it executes against the following resident trading interest, in price/time priority:

Passive liquidity orders whose nondisplayed prices are superior to the NBBO and superior to the directed cross Orders whose displayed prices are superior to the directed cross Orders whose displayed prices are equal to the directed cross The paired guarantee order presented for the directed cross If any shares of the incoming directed inside limit order remain after crossing the guarantee order, the matching engine 21 subsequently processes the directed inside limit order as if it were a regular, non-directed inside limit order. Accordingly, the non-directed inside limit order is allowed to route to away markets only if they are at the NBBO. Once the non-directed inside limit order has routed to all away markets at the NBBO, the remainder of the order is posted. If the order would cause the NBBO to become crossed, then the order is repriced at the opposite side of the NBBO before it is posted, Directed Inside Market Order A directed inside market order behaves exactly like a directed inside limit order, except that the order is not capped by a limit price and is never posted. Accordingly, a directed inside market order executes until it is exhausted. If any shares of the incoming directed inside market order remain after crossing the guarantee order, the matching engine 21 subsequently processes the directed inside market order as if it were a regular, non-directed inside market order. The order must 'walk the book,' clearing all book orders and away market quotes at the published NBBO price. The order cannot proceed to the next price level until all away markets move their quotes, and a new NBBO is disseminated, Directed Exchange-Restricted Order A directed exchange-restricted order can only trade on the posting market center, as exchange-restricted orders are never routed by definition. As a result, an incoming directed exchange-restricted order must be paired with a guarantee order whose price is at or better than the best away market quote for the resulting directed cross price to be valid unless the issue has a trade-through exemption as described below.

In the absence of such a trade-through exemption, if the guarantee order price is worse than the best away market quote, then the resulting directed cross price is not valid because it would trade through an away market quote if executed. In such a case, the incoming directed exchange-restricted order cannot trade in the directed order process, and the entire order is treated as a non-directed exchange-restricted order in the regular continuous order matching process instead.

If a directed exchange-restricted order cannot cross cleanly and must interact with the marketplace, it executes against the resident trading interest, in the same price/time priority as described above for directed inside limit orders. If any shares of the incoming directed exchange-restricted order remain unexecuted after crossing the guarantee order, the matching engine 21 subsequently processes the remainder of the directed exchange-restricted order as if it were a regular, non-directed exchange-restricted order. Accordingly, if the unmatched shares are marketable, the matching engine 21 executes the exchange-restricted order with any overlapping book orders. If the unmatched shares are not marketable, the matching engine 21 posts the remainder of the exchange-restricted order to the public order book. If the unmatched shares would lock or cross the NBBO if posted to the public order book, then the matching engine 21 cancels the remainder of the exchange-restricted order.

Directed IOC Order

A directed IOC order executes just like a directed exchange-restricted order, except that any unmarketable portion of the order cannot be posted and must be canceled immediately instead. Like a directed exchange-restricted order, a directed IOC order can only trade on the posting market center and is never routed by definition. If any shares of the incoming directed IOC order remain unexecuted after crossing the guarantee order, the matching engine 21 subsequently processes the remainder of the directed IOC order as if it were a regular, non-directed IOC order. Accordingly, if the unmatched shares are marketable, the matching engine 21 executes the IOC order with any overlapping book orders. If the unmatched shares are not marketable, the matching engine 21 cancels the remainder of the IOC order.

Trade-Through Exemption for Directed Exchange-Restricted Orders and Directed IOC Orders For certain issues, a marketwide de minimis exemption may allow incoming orders to trade through the best away market by a specified amount (e.g., three cents) to execute against book orders. If such an exemption exists for non-directed exchange-restricted orders and non-directed IOC orders, then it also applies to directed exchange-restricted orders and directed IOC orders. Such incoming directed orders are allowed to match orders priced off the NBBO, including guarantee orders.

As a result, an incoming directed IOC order or an incoming directed exchange-restricted order must be paired with a guarantee order whose price is not worse than the specified price increment (e.g., three cents) off the best away market quote for the resulting directed cross price to be valid. For example, assume the NBBO is $19.90 to $20.00 and the offer side of the marketplace looks like this:

| Offers | |
|---|---|
| Away Market A: | Offer 200 @ 20.00 |
| Order B: | Sell 300 @ 20.03 |
| Order C: | Sell 400 @ 20.04 |

An incoming exchange-restricted order to buy at $20.04 could bypass away market A to execute against Order B (NBO+0.03), but could not execute against Order C (NBO+0.04). This is true whether the incoming order is directed or non-directed. Similarly, an incoming directed or non-directed IOC order to buy at $20.04 could bypass away market A to execute against Order B, but not against Order C.

As both order types are allowed to execute against orders priced up to three cents off the NBO, they are also allowed to execute against guarantee orders priced up to three cents off the NBO. Thus, in this example, an incoming directed exchange-restricted order (or an incoming directed IOC order) could execute against a guarantee sell order priced lower than $20.00; at $20.00; at $20.01; at $20.02, or at $20.03, but not at $20.04.

Designated Market Maker Guarantee Order Types

Limit Guarantee Orders

Designated market makers 31 may submit limit-priced guarantee orders. If a limit guarantee order is submitted at a price that would lock or cross a guarantee order book 62, the order is rejected.

Primary Pee Guarantee Orders

In a preferred embodiment, designated market makers 31 may submit primary peg guarantee orders, which are priced in relation to the same side of the NBBO. A primary peg buy order follows the NBB, and a primary peg sell order follows the NBO. The price of the order is automatically adjusted as the NBBO changes. If the NBBO becomes crossed, primary peg guarantee orders are not repriced to follow the cross in a preferred embodiment of the disclosure. For example, if the NBBO is $20.00 to $20.02, a primary peg buy order would be priced at $20.00, while a primary peg sell order would be priced at $20.02. If the NBBO changed to $20.01 to $20.02, the primary peg buy order would automatically reprice to $20.01. On the other hand, if the NBBO changed to $20.02 to $20.01, neither order would be repriced.

In addition to the basic primary peg guarantee order described above, the posting market center 20, in a preferred embodiment, may also allow primary peg orders to include other pegging attributes, e.g., primary peg order+reserve+peg limit+peg offset or discretion offset. As a peg offset makes a primary peg guarantee order's current price less aggressive while a discretion offset makes a primary peg guarantee order's current price more aggressive, the two offsets cannot be included on the same order. This restriction does not apply to regular (non-guarantee) primary peg orders, which allow both offsets because only the peg offset affects the current, displayed order price (while the discretion offset determines the more aggressive, nondisplayed price). As guarantee orders do not have a displayed price, both offsets affect the current price.

Primary Peg Guarantee Order with Reserve

A primary peg guarantee order may have reserve size. Rules for processing reserve size differs for guarantee orders and regular (non-guarantee) orders. On a regular, non-guarantee order, the show size caps the maximum size to display publicly to the marketplace, while the reserve size hides the remainder of the order from the marketplace. Although the reserve size is not displayed, it is nevertheless available for immediate matching if all displayed orders at the same price have been exhausted.

In contrast, a guarantee order is completely hidden from the marketplace and therefore does not need to hide a portion of its total order size. Instead, the show size caps the maximum size available to trade with any given incoming directed order, while the reserve size allows the show size to be replenished whenever it is depleted. In contrast to a regular non-guarantee order, the reserve size of a guarantee order is not available for immediate matching with an incoming order whose size exceeds the show size.

For example, assume a market maker 31 submits a primary peg guarantee buy order for 5000 shares, with a show size of 500 shares and a reserve size of 4500 shares. The guarantee order will match an incoming directed order up to a maximum size of 500 shares. If an order sending firm 26 sends a directed order to sell 700 shares to the designated market maker 31, the directed order process pairs 500 shares (not 700 shares) of the guarantee buy order with the directed sell order. After the orders execute, it replenishes the show size of the guarantee buy order back to 500 shares, reducing its reserve size to 4000 shares.

Primary Peg Guarantee Order with Peg Limit

A peg limit allows a market maker 31 to specify the maximum price (ceiling) to which a primary peg buy order will follow the NBB, or the minimum price (floor) to which a primary peg sell order will follow the NBO. If the market moves outside the specified ceiling or floor, the order ceases to be pegged and behaves exactly as a limit order instead. If the market moves within the ceiling or floor again, then pegging resumes.

For example, a primary peg sell order has a peg limit price of $20.01. The NBBO is $20.00 to $20.02 when the order is submitted. The order is automatically priced at $20.02, the NBO. When the NBO changes to $20.03, the order is automatically repriced at $20.03. When the NBO changes to $20.01, the order is automatically repriced at $20.01. But when the NBO changes to $20.00, the order remains at $20.01 and is not repriced at $20.00 because the NBO ($20.00) is now lower than the minimum price that the user has specified in the peg limit (i.e. $20.01). If the NBO changes to $20.01 or higher, though, the order resumes pegging.

Primary Peg Guarantee Order with Peg Offset

A peg offset allows a market maker 31 to specify a fixed price interval away from the NBBO. A peg offset must always be negative for a buy order (e.g., buy at bid−0.01) and must always be positive for a sell order (e.g., sell at offer+0.01). These rules ensure that the guarantee orders are always priced less aggressively than the NBBO.

Primary Peg Guarantee Order with Discretion Offset

A discretion offset also allows a market maker 31 to specify a fixed price interval away from the NBBO—but in the opposite direction as a peg offset. A discretion offset must always be positive for a buy order (e.g., buy at bid+0.01) and must always be negative for a sell order (e.g., sell at offer−0.01). These rules ensure that the orders are always priced more aggressively than the NBBO. This allows market makers to provide price improvement to incoming directed orders. As previously described, if the business rules of the posting market center 20 do not allow guarantee orders to execute at prices that are superior to the NBBO, then discretionary offsets are not allowed in such an embodiment of the disclosure, and guarantee orders having discretionary offsets would be rejected back to the market maker 31.

In the regular continuous order matching process, orders with discretion are not allowed to provide price improvement by stepping ahead of other marketable orders to intercept an incoming order. Instead, they are only allowed to use discretion to intercept an incoming order that would otherwise be canceled, posted, or routed, and they are only allowed to use the minimum amount of discretion necessary to do so. In contrast, in the directed order process, if a market maker 31 wishes to always provide price improvement to a permissioned order sending firm 26, a primary peg guarantee order with discretion provides for this behavior. A primary peg guarantee order with discretion is always priced better than the NBBO by the specified number of ticks. This ensures that an incoming directed order will cross cleanly with the resting primary peg guarantee order unless a superior passive liquidity order resides on the posting market center 20 and must execute first. As passive liquidity orders are never displayed to the marketplace, they may be superior to the NBBO and therefore also superior to a primary peg guarantee order with discretion.

To illustrate the difference between regular (non-guarantee) primary peg orders with discretion and primary peg guarantee orders with discretion, two examples are provided below.

EXAMPLE 1

Regular (Non-Guarantee) Primary Peg Order with Discretion

This example illustrates how a regular (non-guarantee) primary peg order is not able to grant price improvement to an incoming order because primary peg orders can improve the NBBO only if an incoming order is not marketable against the NBBO. In this example, the NBBO is $20.00 to $20.03. The offer side of the internal book looks like this:

| | Offers |
|---|---|
| Order A: | Sell 200 @ 20.03 |
| Order B: | Sell 200 @ 20.03, Peg to NBO, Discretion Offset = −.01 |
| Away Market A: | Offer 400 @ 20.03 |

Order B is a primary peg sell order with discretion. It is currently priced at $20.03, with discretion to $20.02.

If the order matching engine 21 receives an incoming order to buy 300 at $20.03, it executes 200 shares against Order A at $20.03 and then executes 100 shares against Order B at $20.03. As the incoming buy order is marketable against Order A's displayed price, it does not allow Order B to step ahead of it and trade at its discretionary price.

EXAMPLE 2

Primary Peg Guarantee Order with Discretion

This example illustrates how a primary peg guarantee order is able to grant price improvement to an incoming directed order because the guarantee order is priced at its discretionary price, which is superior to the NBBO. Unlike regular (non-guarantee) primary peg orders, primary peg guarantee orders improve the NBBO even if an incoming order is marketable against the NBBO.

In this example, the NBBO is $20,00 to $20.03. The offer side of the internal book looks like this:

| | Offers |
|---|---|
| Order A: | Sell 200 @ 20.03 |
| Away Market A: | Offer 400 @ 20.03 |

The virtual guarantee order book contains the following order:

| Guarantee Sell Orders | |
|---|---|
| Order C: | Sell 200 @ 20.02, Peg to NBO, Discretion Offset = −.01 |

Guarantee Order C is a primary peg sell order with discretion. It is currently priced at $20.02, not $20.03 with discretion to $20.02. This is different from the pricing of non-Guarantee Order B in the previous example.

The directed order process receives an incoming directed order to buy 300 at $20.03. It pairs 200 shares of the incoming directed buy order with Guarantee Order C at the guarantee order price, $20.02.

As the resulting directed cross price of $20.02 is superior to all offers in the marketplace, the directed order process crosses the incoming directed buy order cleanly against Guarantee Order C, executing 200 shares at $20.02. The remaining 100 shares of the incoming directed order are released to the normal continuous order matching process, where it executes 100 shares against Order A at $20.03.

As shown in this example, a primary peg guarantee order is able to offer price improvement by using a discretion offset to ensure that its price is always superior to the NBBO when the market is unlocked and uncrossed.

Receiving an Incoming Guarantee Order from a Market Maker

Figure 3A:
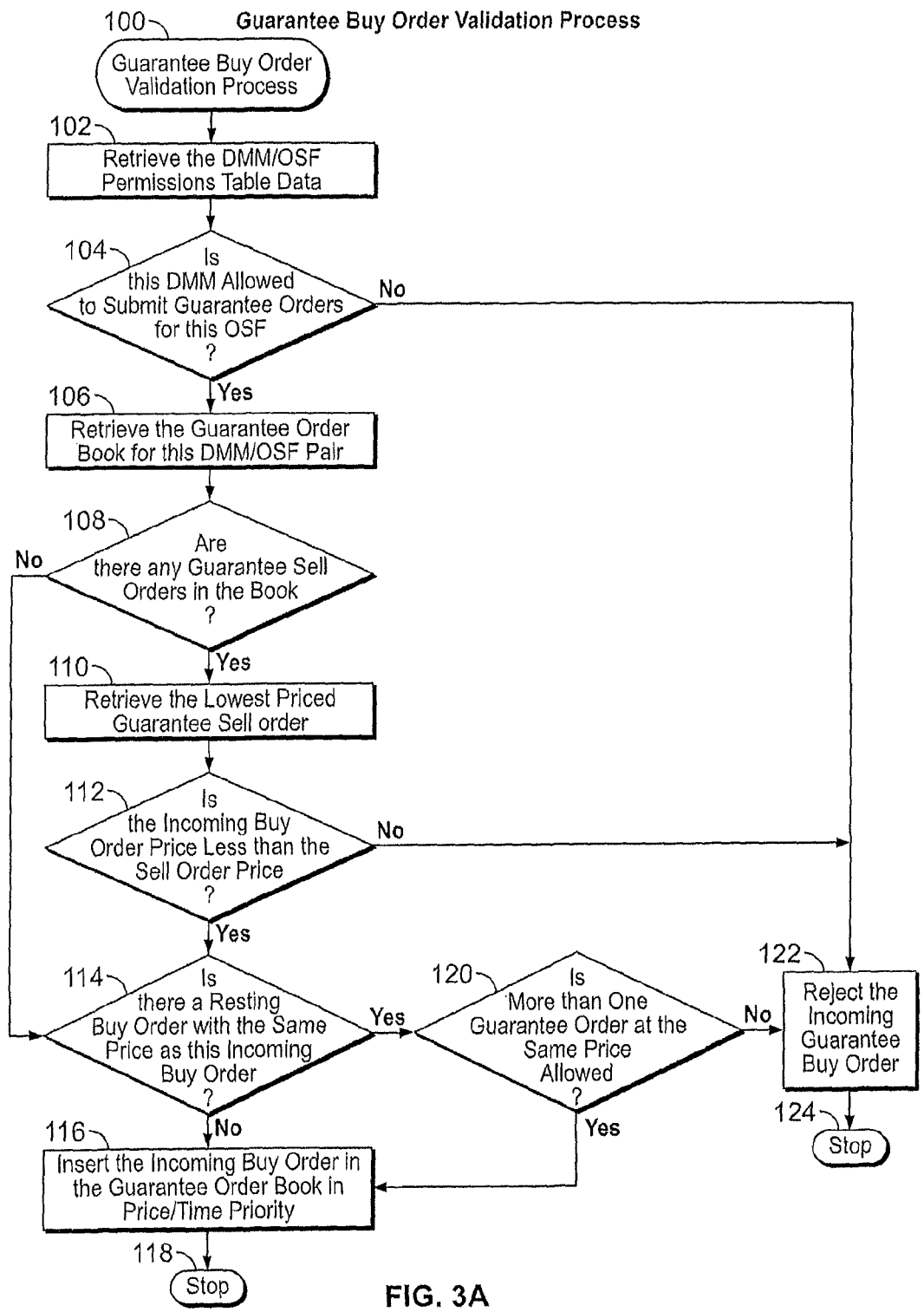
FIGS. 3A-3B illustrate guarantee buy order and guarantee sell order validation processes.
Figure 3B:
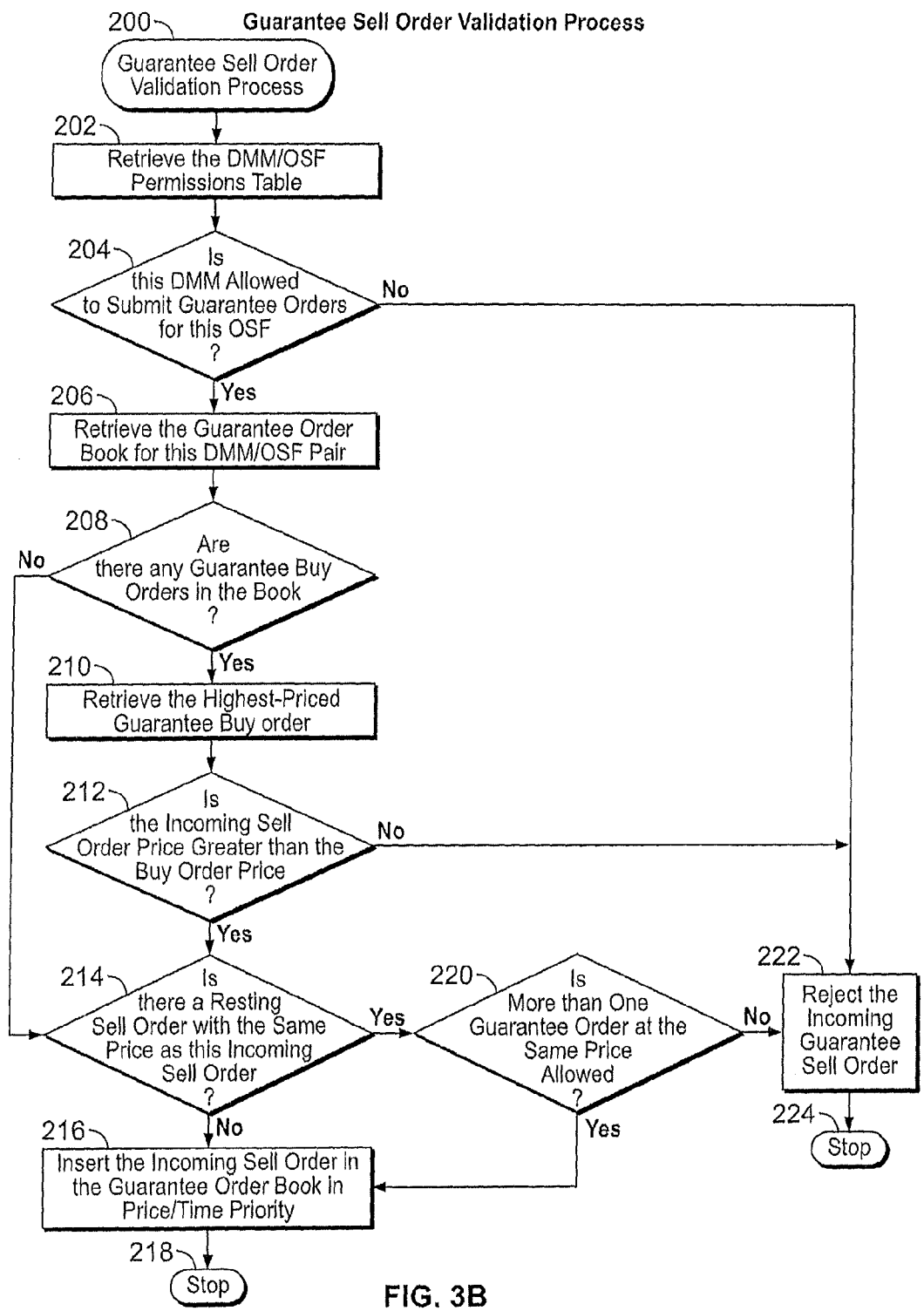

Before a trading session begins, a designated market maker 31 must populate its guarantee order books 62 for each order sending firm 26 it has a relationship with, as depicted in FIG. 2. FIG. 3A illustrates a process implemented by activating the guarantee buy order validation routine 52a in the order matching engine 21 when a designated market maker 31 sends a buy order to the posting market center 20 with instructions that the buy order be allocated for a specific order sending firm 26 and maintained in a virtual guarantee order book 62 for that purpose. FIG. 3B illustrates a similar process implemented by activating the guarantee sell order validation routine 52b in the order matching engine 21 for a received sell order.

Referring to FIG. 3A, at step 100, a new guarantee buy order is received by the order matching engine 21, and the order matching engine 21, recognizing the incoming order processing request, initiates the guarantee buy order validation routine 52a. At step 102, the activated process retrieves the DMM/OSF permissions table data. At step 104, the process checks to determine if this market maker sending the buy order is permissioned to allocate guarantee orders for the indicated order sending firm. If the process determines that this market maker is not permissioned to allocate guarantee orders for the indicated order sending firm, then the process proceeds to step 122, where it rejects the incoming guarantee buy order, and the process is terminated at step 124 as indicated.

If, however, the market maker sending the buy order is permissioned to allocate guarantee orders on behalf of the indicated order sending firm, then the process continues to step 106, where it retrieves the data for the virtual guarantee order book allocated for this order sending firm. At step 108, the process checks if there are any guarantee sell orders residing in the guarantee order book. If there are, then the process retrieves the best (lowest priced) guarantee sell order at step 110. At step 112, the process then compares the price of the incoming guarantee buy order to the price of the retrieved guarantee sell order. If the incoming guarantee buy order is a primary peg order, then its price must be determined before it can be compared to other orders. The process invokes the New NBB Updates Pegged Guarantee Buy Orders routine 54a and uses the process illustrated in FIG. 4A and described below to determine the price of the incoming primary peg buy order.

If, at step 112, it is determined that the price of the incoming guarantee buy order is greater than or equal to the price of the retrieved guarantee sell order, the incoming guarantee buy order is rejected, as indicated at step 122, because to accept this buy order would result in a locked or crossed guarantee order book. The incoming order is canceled to protect the market maker from this situation. The process then terminates as indicated at step 124.

If, however, at step 112, it is determined that the incoming guarantee buy order is less than the retrieved guarantee sell order, then the process continues to step 114. Referring again to step 108, the process also proceeds to step 114 if there are no guarantee sell orders in the guarantee order book.

At step 114, the process checks whether the price of the incoming guarantee buy order is the same as any guarantee buy order that already resides in the virtual guarantee order book 62. If a resting guarantee buy order has the same price as the incoming guarantee buy order, then the process proceeds to step 120, where it checks if the business rules of the posting market center allow multiple guarantee buy orders at the same price. If multiple guarantee buy orders at the same price are not allowed, then the process rejects the incoming guarantee buy order, as indicated at 122, and the process terminates as indicated at 124. If, on the other hand, at step 120, the posting market center's business rules allow multiple guarantee buy orders at the same price, then the process proceeds to step 116, where it inserts the incoming guarantee buy order in the guarantee order book 62 in price/time priority. Similarly, if, at step 114, the process determines that the price of the incoming guarantee buy order is unique, then the process also in that situation inserts the incoming guarantee buy order in the guarantee order book 62 in price/time priority, as indicated at step 116. After insertion of the order in the guarantee order book 62, the process terminates as indicated at 118.

Referring to FIG. 3B, the process implemented by activating the guarantee sell order validation routine 52b in the order matching engine 21 for a received sell order, which is very similar to the process described above for a received buy order, is illustrated. At step 200, a new guarantee sell order is received by the order matching engine 21, and the order matching engine 21, recognizing the incoming order processing request, initiates the guarantee sell order validation routine 52b. At step 202, the activated process retrieves the DMM/OSF permissions table data. At step 204, the process checks to determine if this market maker sending the sell order is permissioned to allocate guarantee orders for the indicated order sending firm. If the process determines that this market maker is not permissioned to allocate guarantee orders for the indicated order sending firm, then the process proceeds to step 222, where it rejects the incoming guarantee sell order, and the process is terminated at step 224 as indicated.

If, however, the market maker sending the sell order is permissioned to allocate guarantee orders on behalf of the indicated order sending firm, then the process continues to step 206, where it retrieves the data for the virtual guarantee order book allocated for this order sending firm. At step 208, the process checks if there are any guarantee buy orders residing in the guarantee order book. If there are, then the process retrieves the best (highest priced) guarantee buy order at step 210. At step 212, the process then compares the price of the incoming guarantee sell order to the price of the retrieved guarantee buy order. If the incoming guarantee sell order is a primary peg order, then its price must be determined before it can be compared to other orders. The process invokes the New NBO Updates Pegged Guarantee Sell Orders routine 54b and uses the process illustrated in FIG. 4B and described below to determine the price of the incoming primary peg sell order.

If, at step 212, it is determined that the price of the incoming guarantee sell order is less than or equal to the price of the retrieved guarantee buy order, the incoming guarantee sell order is rejected, as indicated at step 222, because to accept this sell order would result in a locked or crossed guarantee order book. The incoming order is canceled to protect the market maker from this situation. The process then terminates as indicated at step 224.

If, however, at step 212, it is determined that the incoming guarantee sell order is greater than the retrieved guarantee buy order, then the process continues to step 214. Referring again to step 208, the process also proceeds to step 214 if there are no guarantee buy orders in the guarantee order book.

At step 214, the process checks whether the price of the incoming guarantee sell order is the same as any guarantee sell order that already resides in the virtual guarantee order book 62. If a resting guarantee sell order has the same price as the incoming guarantee sell order, then the process proceeds to step 220, where it checks if the business rules of the posting market center allow multiple guarantee sell orders at the same price. If multiple guarantee sell orders at the same price are not allowed, then the process rejects the incoming guarantee sell order, as indicated at 222, and the process terminates as indicated at 224. If, on the other hand, at step 220, the posting market center's business rules allow multiple guarantee sell orders at the same price, then the process proceeds to step 216, where it inserts the incoming guarantee sell order in the guarantee order book 62 in price/time priority. Similarly, if, at step 214, the process determines that the price of the incoming guarantee sell order is unique, then the process also in that situation inserts the incoming guarantee sell order in the guarantee order book 62 in price/time priority, as indicated at step 216. After insertion of the order in the guarantee order book 62, the process terminates as indicated at 218.

Guarantee Order Price Updates

In one embodiment, if pegged guarantee orders are supported and a designated market maker has inserted pegged guarantee orders into its guarantee order books 62, the price of the pegged orders must be updated in relation to the NBBO. Depending on processing requirements and efficiencies, the update process may be configured to continually update pegged guarantee orders whenever the NBBO for the instrument changes or the process may be configured to update the price of a pegged guarantee order only when the order is retrieved by the directed order process and paired with an incoming directed order in preparation for a directed cross.

When the NBBO for an issue becomes crossed, the directed order process does not update the prices of the pegged guarantee orders because by doing so it could cause a market maker's guarantee order book to also become crossed. Instead, the pegged guarantee orders will remain at their current prices until the next uncrossed NBBO is disseminated.

In a preferred embodiment of the disclosure, when the NBBO for an issue becomes locked, the directed order process updates the prices of the pegged guarantee orders, even if by doing so it would cause a market maker's guarantee order book to also become locked. However, in another embodiment, the directed order process waits for the next unlocked/uncrossed NBBO before updating the prices of any pegged guarantee orders.

Figure 4A:
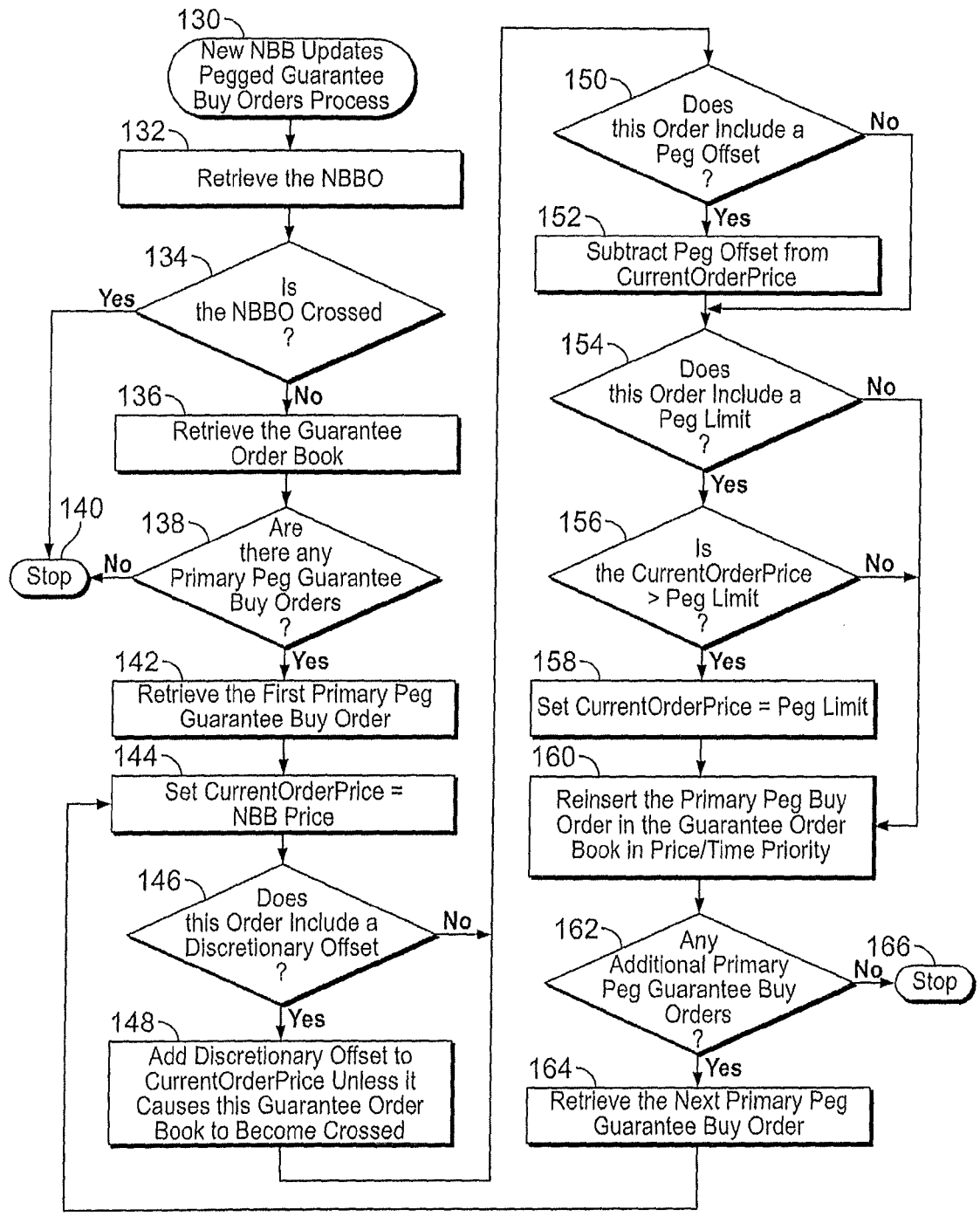
FIGS. 4A-4B illustrate processes for updating pegged guarantee buy and sell orders.
Figure 4B:
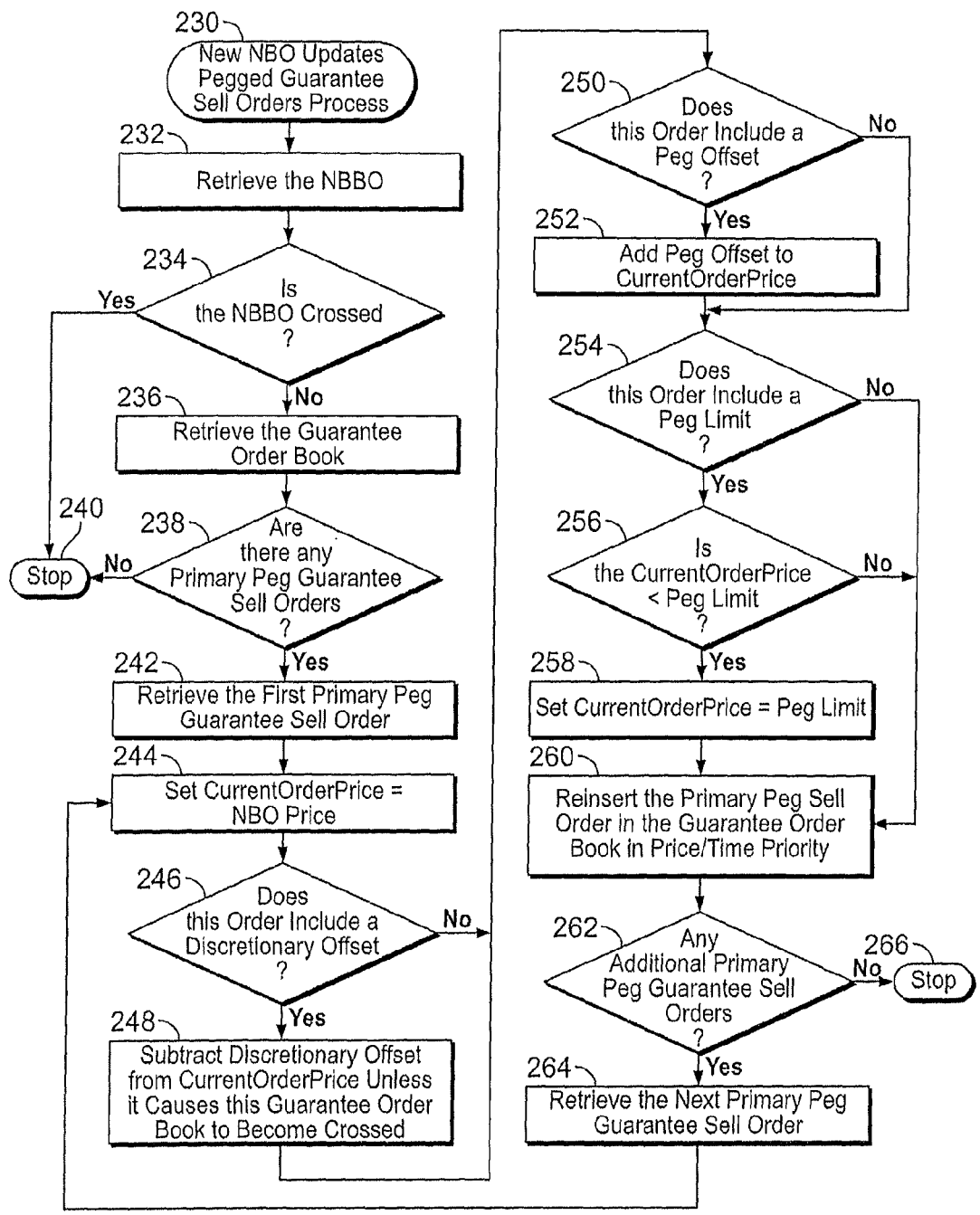

Referring to FIGS. 4A and 4B, processes are illustrated for updating a pegged guarantee order in view of a changing NBBO. FIG. 4A illustrates a process implemented when the "New NBB Updates Pegged Guarantee Buy Orders" routine 54a in the order matching engine 21 is activated. FIG. 4B illustrates a similar process implemented when the "New NBO Updates Pegged Guarantee Sell Orders" routine 54b in the order matching engine 21 is activated.

When the "New NBB Updates Pegged Guarantee Buy Orders" routine 54a is active, the process updates the price of a resting primary pegged guarantee buy order when the process detects a new NBB price. This process may be globally invoked for all primary peg buy orders in all guarantee order books 62 whenever the NBB changes, or it may be selectively invoked only as necessary, i.e., when an incoming directed sell order is about to be paired with a resting primary peg guarantee buy order. In the latter case, only the guarantee order book 62 allocated for the order sending firm 26 that sent the directed order is retrieved and evaluated. The above is also true for primary pegged guarantee sell orders when the "New NBO Updates Pegged Guarantee Sell Orders" routine 54b is active.

Referring to FIG. 4A, at step 130, the "New NBB Updates Pegged Guarantee Buy Orders" routine 54a is activated. At step 132, the process retrieves the NBBO. At step 134, the process checks if the NBBO is crossed. As, in this embodiment, pegged orders are not updated when the NBBO is crossed, the process terminates, as indicated at step 140, if the NBBO is crossed. If, however, at step 134, it is determined that the NBBO is not crossed, then the process continues to step 136, where it retrieves the guarantee order book under review. At step 138 then, the process determines whether the retrieved book includes any primary peg guarantee buy orders. If none exist, the process terminates, as indicated at 140, If, on the other hand, the process at step 138 determines that the retrieved book does have primary peg guarantee buy orders, then the process retrieves the first resting primary peg guarantee buy order, as indicated at step 142. At step 144, then, the process sets the baseline price of the retrieved order to the NBB, as primary peg buy orders are pegged to the NBB but may be optionally adjusted by an offset and/or capped by a limit price. Accordingly, the CurrentOrderPrice parameter is initially set to the NBB.

At step 146, the process checks if the retrieved order includes a discretionary offset. If the order does not include a discretionary offset, then the process continues on to determine if the retrieved order includes a peg offset at step 150. If, however, at step 146, the retrieved order does include a discretionary offset, then the process, at step 148, adds the discretionary offset to the CurrentOrderPrice parameter to yield an updated (more aggressive) CurrentOrderPrice parameter. The process then continues to step 150 to determine if the retrieved order includes a peg offset. It should be noted that a primary peg guarantee order may include a discretionary offset or a peg offset, but not both, as these attributes have the opposite effect. If the order does not include a peg offset, then the process continues to step 154. If, however, the order does include a peg offset, then the process, at step 152, subtracts the peg offset from the CurrentOrderPrice parameter to yield an updated (less aggressive) CurrentOrderPrice parameter. The process then proceeds to step 154.

At step 154, the process determines whether the retrieved order includes a peg limit. If the order does not include a peg limit, the process continues to step 160. If, however, the order does include a peg limit, then at step 156, the process checks if the CurrentOrderPrice parameter is higher than the peg limit, which caps the price of the order. If the CurrentOrderPrice parameter is higher, then the CurrentOrderPrice parameter is reset to the lower peg limit price at step 158, and the process continues to step 160. If, however, it is determined that the CurrentOrderPrice parameter is not higher than the peg limit at step 156, then the order remains at its CurrentOrderPrice parameter, and the process continues to step 160.

At step 160, the process re-inserts the primary peg guarantee buy order in the guarantee order book 62 according to its updated CurrentOrderPrice parameter in price/time priority. At step 162, the process checks if there are any other resting primary peg guarantee buy orders in the guarantee order book 62 that need to be evaluated. If not, then the process terminates, as indicated at 166. If additional primary peg guarantee buy orders do exist, however, then the process continues to step 164, where it retrieves the next resting primary peg guarantee buy order and returns to step 144, where it repeats the pricing process described above.

Referring to FIG. 4B, in a process similar to the updating of a pegged guarantee buy order in view of a new NBB as described above, at step 230, the "New NBO Updates Pegged Guarantee Sell Orders" routine is activated. At step 232, the process retrieves the NBBO. At step 234, the process checks if the NBBO is crossed. As in this embodiment, pegged orders are not updated when the NBBO is crossed, the process terminates, as indicated at step 240 if the NBBO is crossed. If, however, at step 234, it is determined that the NBBO is not crossed, then the process continues to step 236, where it retrieves the guarantee order book under review. At step 238 then, the process determines whether the retrieved book includes any primary peg guarantee sell orders. If none exist, the process terminates, as indicated at 240.

If, on the other hand, the process at step 238 determines that the retrieved book does have primary peg guarantee sell orders, then the process retrieves the first resting primary peg guarantee sell order, as indicated at step 242. At step 244, then, the process sets the baseline price of the retrieved order to the NBO, as primary peg sell orders are pegged to the NBO but may be optionally adjusted by an offset and/or capped by a limit price. Accordingly, the CurrentOrderPrice parameter is initially set to the NBO.

At step 246, the process checks if the retrieved order includes a discretionary offset. If the order does not include a discretionary offset, then the process continues on to determine if the retrieved order includes a peg offset at step 250. If, however, at step 246, the retrieved order does include a discretionary offset, then the process, at step 248, subtracts the discretionary offset from the CurrentOrderPrice parameter to yield an updated (more aggressive) CurrentOrderPrice parameter. The process then continues to step 250 to determine if the retrieved order includes a peg offset. If the order does not include a peg offset, then the process continues to step 254. If, however, the order does include a peg offset, then the process, at step 252, adds the peg offset from the CurrentOrderPrice parameter to yield an updated (less aggressive) CurrentOrderPrice parameter. The process then proceeds to step 254.

At step 254, the process determines whether the retrieved order includes a peg limit. If the order does not include a peg limit, the process continues to step 260. If, however, the order does include a peg limit, then at step 256, the process checks if the CurrentOrderPrice parameter is lower than the peg limit, which caps the price of the order. If the CurrentOrderPrice parameter is lower, then the CurrentOrderPrice parameter is reset to the higher peg limit price at step 258, and the process continues to step 260. If, however, it is determined that the CurrentOrderPrice parameter is not lower than the peg limit at step 256, then the order remains at its CurrentOrderPrice parameter, and the process continues to step 260.

At step 260, the process re-inserts the primary peg guarantee sell order in the guarantee order book 62 according to its updated CurrentOrderPrice parameter in price/time priority. At step 262, the process checks if there are any other resting primary peg guarantee sell orders in the guarantee order book 62 that need to be evaluated. If not, then the process terminates, as indicated at 266. If additional primary peg guarantee sell orders do exist, however, then the process continues to step 264, where it retrieves the next resting primary peg guarantee sell order and returns to step 244, where it repeats the pricing process described above.

Receiving an Incoming Directed Order

Figure 5:
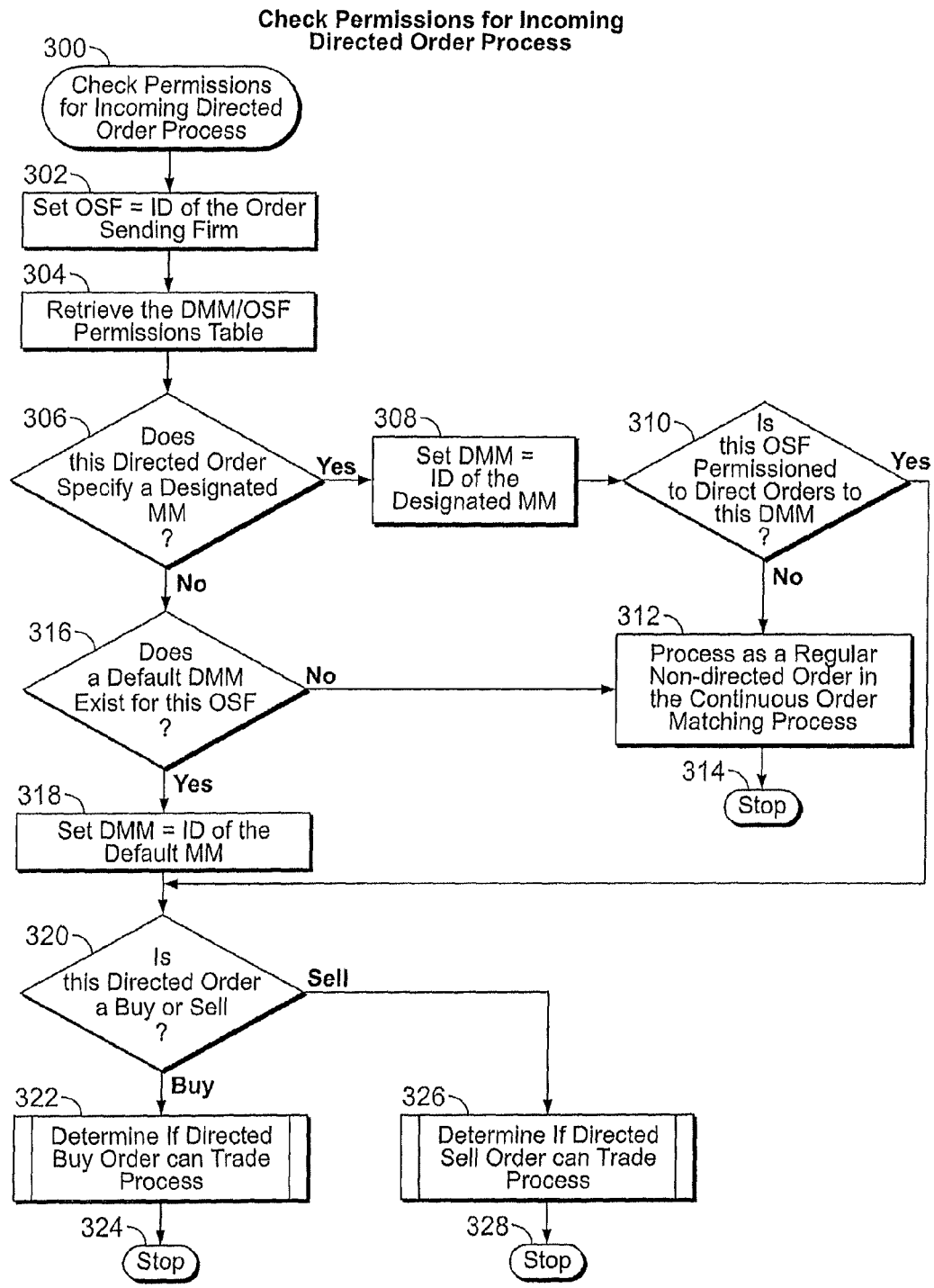
FIG. 5 illustrates a process to check whether an incoming directed order has permission to trade with a designated market maker.

With the guarantee order books 62 set by the market makers 31, directed orders can be sent to the posting market center 20 by order sending firms 26. Referring to FIG. 5, when the posting market center 20 receives a directed order, the directed order routines (FIG. 1B) are activated as required to conduct the directed order process. At step 300, the "Check Permissions for Incoming Directed Order" routine 40 is activated in order to determine if the sender and receiver are permissioned to preferentially trade with each other. At step 302, the process sets the parameter designated as "OSF" to the order sending firm ID included in the incoming directed order. Then, at step 304, the process retrieves the DMM/OSF permissions table 60. At step 306, the process checks if the incoming directed order includes the ID of a designated market maker, i.e., a specific market maker firm that is the intended recipient of this directed order. If a designated market maker is not specified, then the process continues to step 316, where it consults the DMM/OSF permissions table 60 to see if a default designated market maker has been established for this order sending firm. If no default market maker has been established in the DMM/OSF permissions table 60, then the process continues to step 312, where the incoming directed order is automatically converted to a non-directed order and is processed according to the rules of the regular continuous order matching process. The instruction to treat this order as a directed order is disregarded, and the process terminates as indicated at step 314.

Referring again to step 306, if the directed order includes the ID of a designated market maker, then the process, at step 308, assigns the designated market maker ID to the parameter "DMM." At step 310, the process consults the DMM/OSF permissions table 60 to determine if a rule exists for this DMM/OSF pair. If a rule does not exist, then this order sending firm 26 is not permissioned to send directed orders to this designated market maker. In this case, the process once again continues to step 312, where the incoming directed order is automatically converted to a non-directed order and is processed according to the rules of the regular continuous order matching process. The instruction to direct this order to the designated market maker is disregarded, and the process terminates as indicated at 314.

Referring again to step 310, however, if a rule does exist for the DMM/OSF pair, then this order sending firm 26 is permissioned to send directed orders to the designated market maker 31. That being the case, the process continues to step 320, where it checks if the incoming directed order is a buy or a sell order.

Referring again to step 316, if the process determines that a default designated market maker exists for the order sending firm sending the order, then the process, at step 318 sets the parameter designated as "DMM" to the default market maker ID and continues to step 320.

Figure 6A:
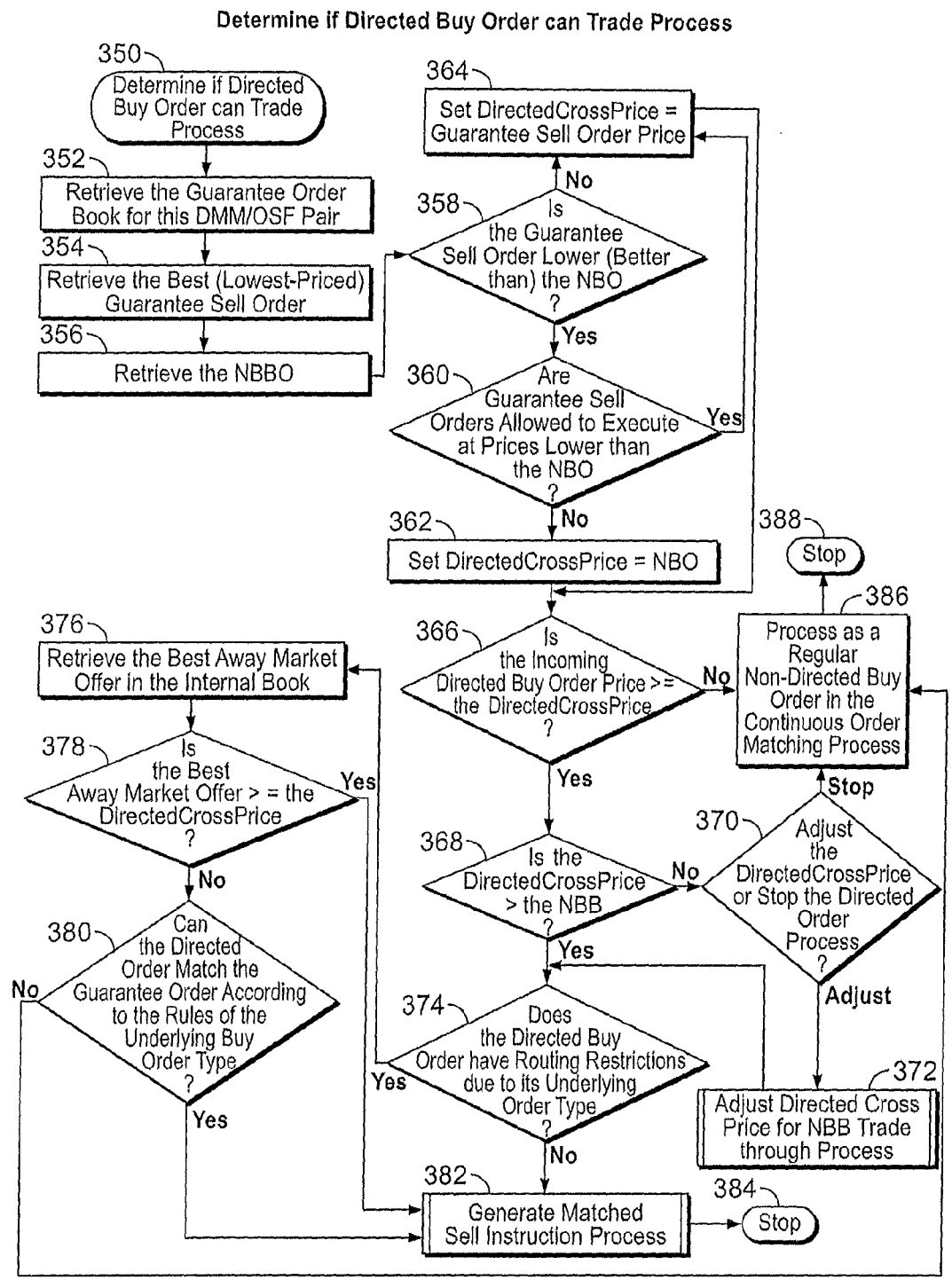
FIGS. 6A-6B illustrate processes for determining if directed buy and sell order can trade.
Figure 6B:
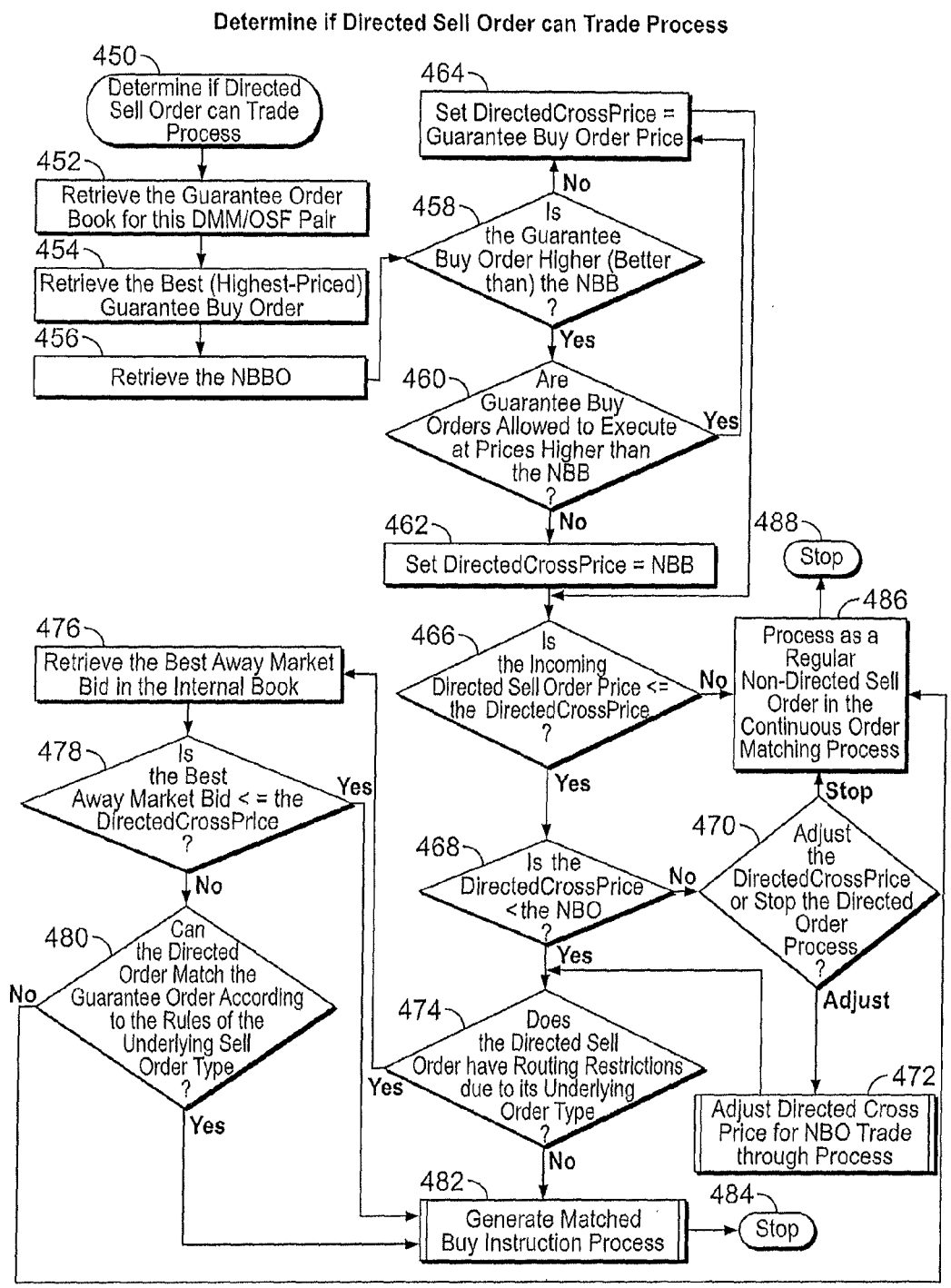

At step 320, the process determines whether the incoming directed order is a buy or a sell order. If the directed order is a buy order, then the process proceeds to step 322, where it invokes the "Determine if Directed Buy Order Can Trade" routine 42a (FIG. 6A). If, on the other hand, the directed order is a sell order, then the process proceeds to step 326, where it invokes the "Determine if Directed Sell Order Can Trade" routine 42b (FIG. 6B).

Determine if Directed Order Can Trade

At this point in the process, a valid DMM/OSF pair has been identified. The process, as a result, proceeds to retrieve the guarantee order book 62 that this designated market maker created for the paired order sending firm. A directed buy order is marketable if its price overlaps with the best-priced guarantee sell order in the guarantee order book. Similarly, a directed sell order is marketable if its price overlaps with the best-priced guarantee buy order in the guarantee order book. If the directed order price and the retrieved guarantee order price overlap, then the directed order process assigns the price of the retrieved guarantee order as the price for the directed cross to execute at.

Figure 7:
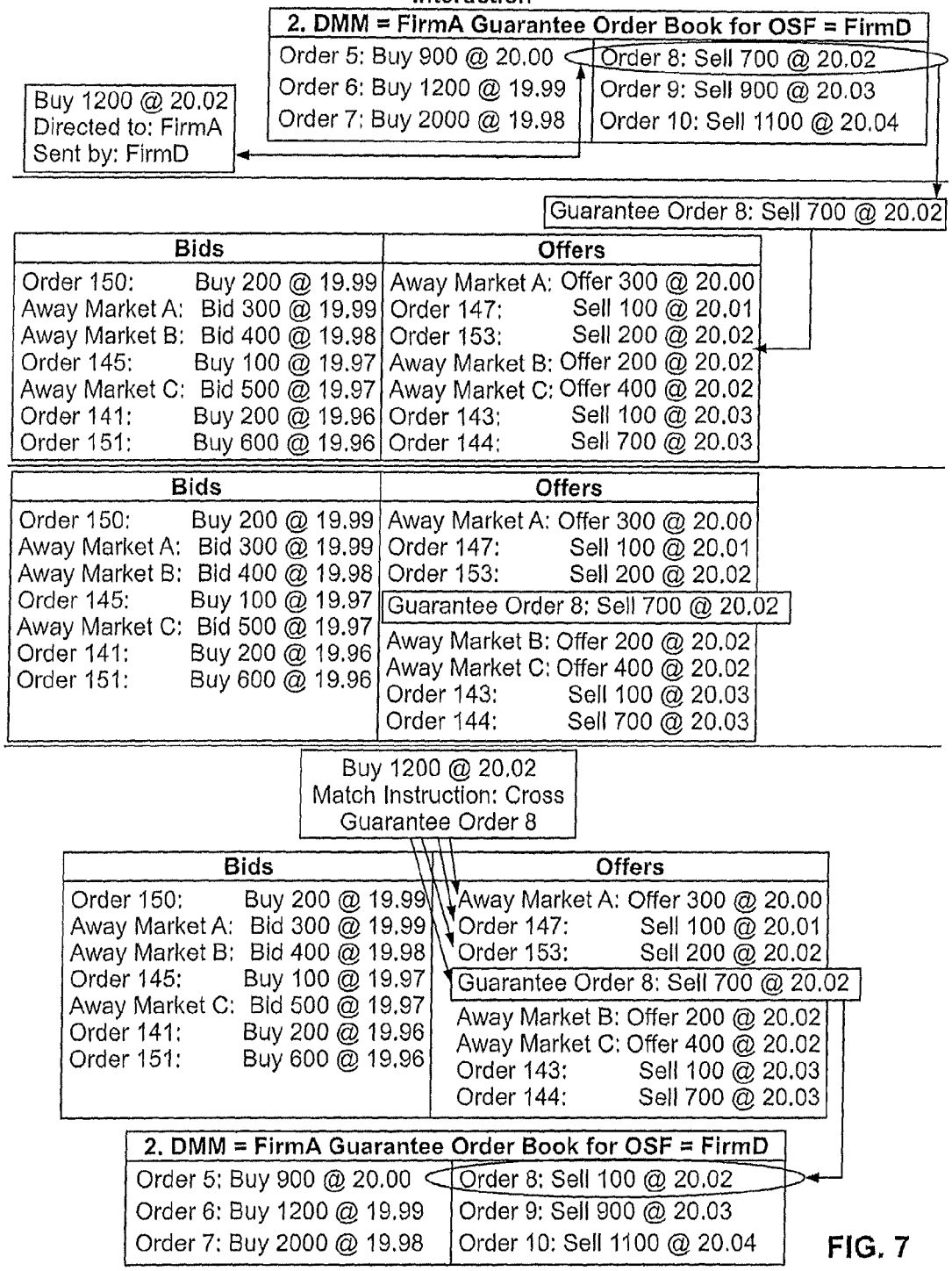
FIG. 7 is an exemplary illustration of how a directed order that has been paired with an eligible market maker guarantee order is presented to the marketplace for possible matching opportunities.

Also, even though the process has now determined that the received directed order is valid in regard to permissions, it must also determine that the order pair is valid in regard to price. FIGS. 6A and 6B illustrate processes implemented in an embodiment of the disclosure to determine if an incoming directed order is marketable against a resting contra-side guarantee order and to evaluate whether crossing the orders would cause a trade-through violation. FIG. 7 depicts an example of the pairing and matching of a directed buy order and a guarantee sell order wherein the directed cross necessitated market interaction. As a cross is a two-sided instruction, both sides of the marketplace must be evaluated for possible trade-through violations. The process also determines if the price of the pending cross must be adjusted to conform to the business rules of the posting market center 20.

Referring to FIG. 6A, the process is illustrated for an incoming directed buy order. At step 350, the "Determine if Directed Buy Order Can Trade" routine 42a is activated, and at step 352, the process retrieves the virtual guarantee order book 62 that the designated market maker 31 created, with order allocations, for the order sending firm 26 directing the order. Then, at step 354, the process retrieves the best (lowest priced) resting guarantee sell order from the guarantee order book 62. At step 356, the process then retrieves the NBBO and proceeds to step 358. At step 358, the process determines whether the resting guarantee sell order's price is superior to the NBO. If the price is not superior, then the process sets the pending directed cross price ("Directed-CrossPrice" parameter) equal to the price of the resting guarantee sell order at step 364.

Referring again to step 358, if, however, the price of the resting guarantee sell order is superior to (lower than) the NBO, then the process continues to step 360, where, in this embodiment, it checks if the business rules of the posting market center 20 allow the guarantee sell order to be executed at its superior price. If the rules allow the order to execute at the superior price, then the process continues to step 364, where the process sets the DirectedCrossPrice parameter equal to the price of the resting guarantee sell order. Referring again to step 360, if, on the other hand, the rules of the posting market center 20 do not allow the order to execute at the superior price, then the process continues to step 362, where it caps the DirectedCrossPrice parameter by setting it equal to the current NBO.

From steps 362 and 364, the process then proceeds to step 366, where the process compares the price of the incoming directed buy order to the derived DirectedCrossPrice parameter. If the process determines that the price of the incoming directed buy order is lower, then the directed buy order is not marketable against the resting guarantee sell order. That being the case, the process proceeds to step 386, where the incoming directed buy order is automatically converted to a non-directed buy order and is processed according to the rules of the regular continuous order matching process. The instruction to direct this order to the designated market maker, therefore, is disregarded, and the process terminates as indicated at 388.

Referring back to step 366, if the process instead determines that the price of the incoming directed buy order is greater than or equal to the derived DirectedCrossPrice parameter, then the incoming directed buy order is marketable against the resting guarantee sell order. The process, as a result, continues to step 368, where it checks if the derived DirectedCrossPrice parameter is greater than the NBB. The reason for this check in this embodiment is because the guarantee sell order is being allowed, in some situations, to execute at a superior price and that price may be so aggressive that it is actually lower than or equal to the NBB. If the price of the guarantee sell order is lower than or equal to the NBB, then it could cause a trade-through of the NBB if executed. At step 368, if the derived DirectedCrossPrice parameter is higher than the NBB, then the pending directed cross can execute without trading through the NBB, so the process continues to step 374. If, on the other hand, the derived DirectedCrossPrice parameter is not higher than the NBB, then the cross price may need to be adjusted to prevent trading through the NBB, and the process continues to step 370, where it determines whether the price of the pending directed cross should be adjusted.

Figure 8A:
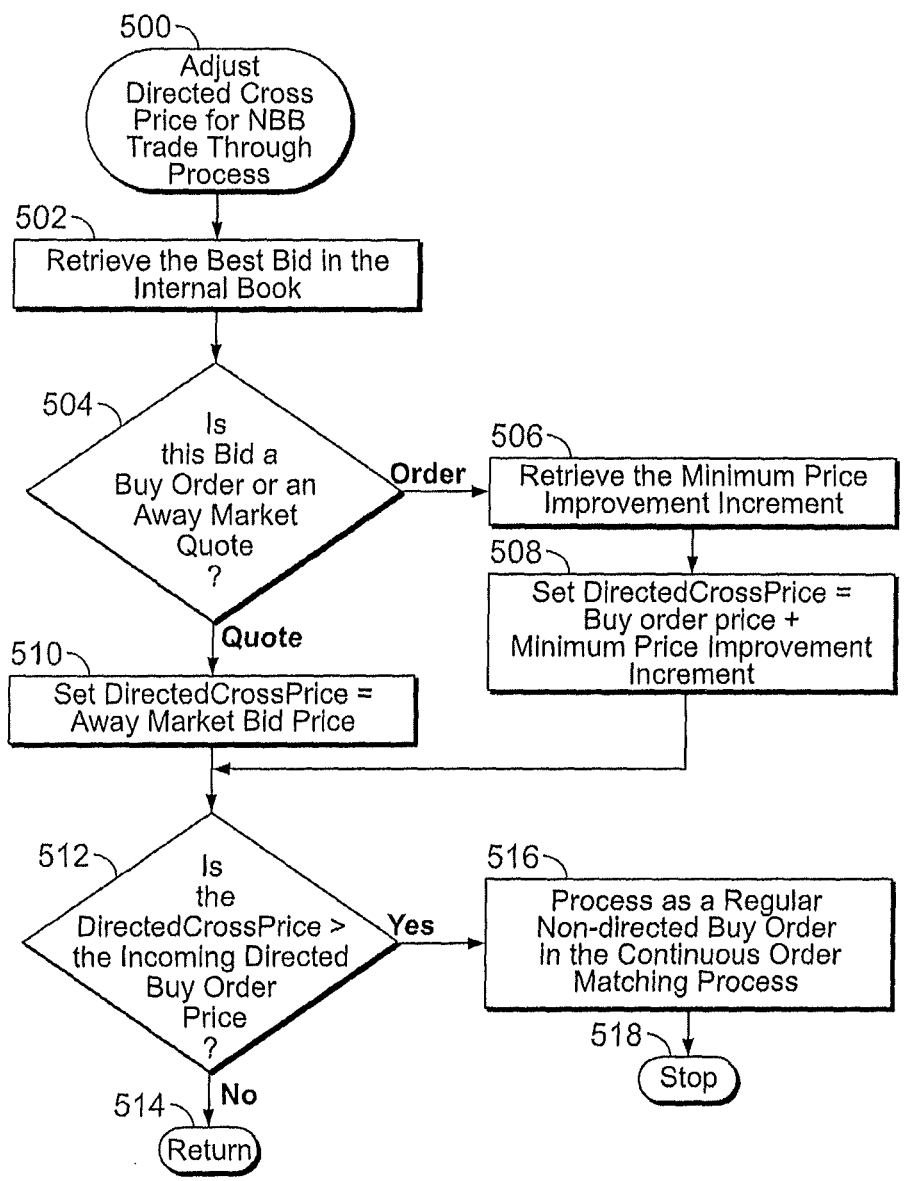
FIGS. 8A-8B illustrate processes for adjusting the directed cross price in view of a trade through situation.

If, at step 370, the process determines that according to the business rules of the posting market center 20, the directed cross price can be adjusted, then the "Adjust Directed Cross Price for NBB Trade Through" routine 44a is invoked as indicated at step 372 (FIG. 8A). If, however, at step 370, the process determines that the business rules of the posting market center 20 do not allow the price of the directed cross to be adjusted, then the directed cross processing stops because the pending directed cross would trade through the NBB if allowed to execute. As such, the process proceeds to step 386, where the incoming directed buy order is automatically converted to a non-directed buy order and is processed according to the rules of the regular continuous order matching process. The instruction to direct this order to the designated market maker, as before, is disregarded, and the process terminates as indicated at 388.

Once the process finalizes processing at step 368, there is assurance that the pending directed cross will not trade through the NBB. However, the process must also check to verify that the pending directed cross will not trade through the NBO either, As such, the process continues to step 374, where it checks if the incoming directed buy order has any routing restrictions. As previously described, some directed order types (e.g., sweep limit and sweep market orders) are eligible to route with no restrictions, while other directed order types are not eligible to route at all (e.g., exchange-restricted and IOC orders). Still other directed order types can only route at the NBBO (e.g., inside market and inside limit orders). If the incoming directed buy order type has any routing restrictions, then the process must check that the price of the pending directed cross will not cause a trade-through violation of the NBO and that the directed cross is allowed according to the rules of the order type underlying the directed buy order. The process does this by retrieving the best away market offer at step 376 and comparing it to the DirectedCrossPrice parameter at step 378.

If, at step 378, the process determines that the best away market offer is lower (better) than the derived Directed-CrossPrice parameter, then the process proceeds to step 380, where it checks if the incoming directed buy order is eligible to execute against its paired guarantee sell order at the derived, inferior directed cross price without causing a trade-through violation. For example, in certain issues (e.g., certain very liquid ETFs on the equities markets), market rules permit certain orders to trade through the NBBO by a specified price increment, e.g., 3 cents. Such an execution does not violate trade-through rules. Equities market rules currently allow exchange-restricted orders and IOC orders to trade through the NBBO by three cents, as these order types cannot route and would otherwise be canceled.

If, at step 380, the process determines that the incoming directed buy order cannot execute against the resting guarantee sell order without violating trade-through rules and/or the rules of the underlying buy order type, then the process proceeds to step 386, where the incoming directed buy order, again as described above, is automatically converted to a non-directed buy order and is processed according to the rules of the regular continuous order matching process. The instruction to direct this buy order to the designated market maker is, therefore, disregarded, and the process terminates as indicated at step 388.

Figure 9A:
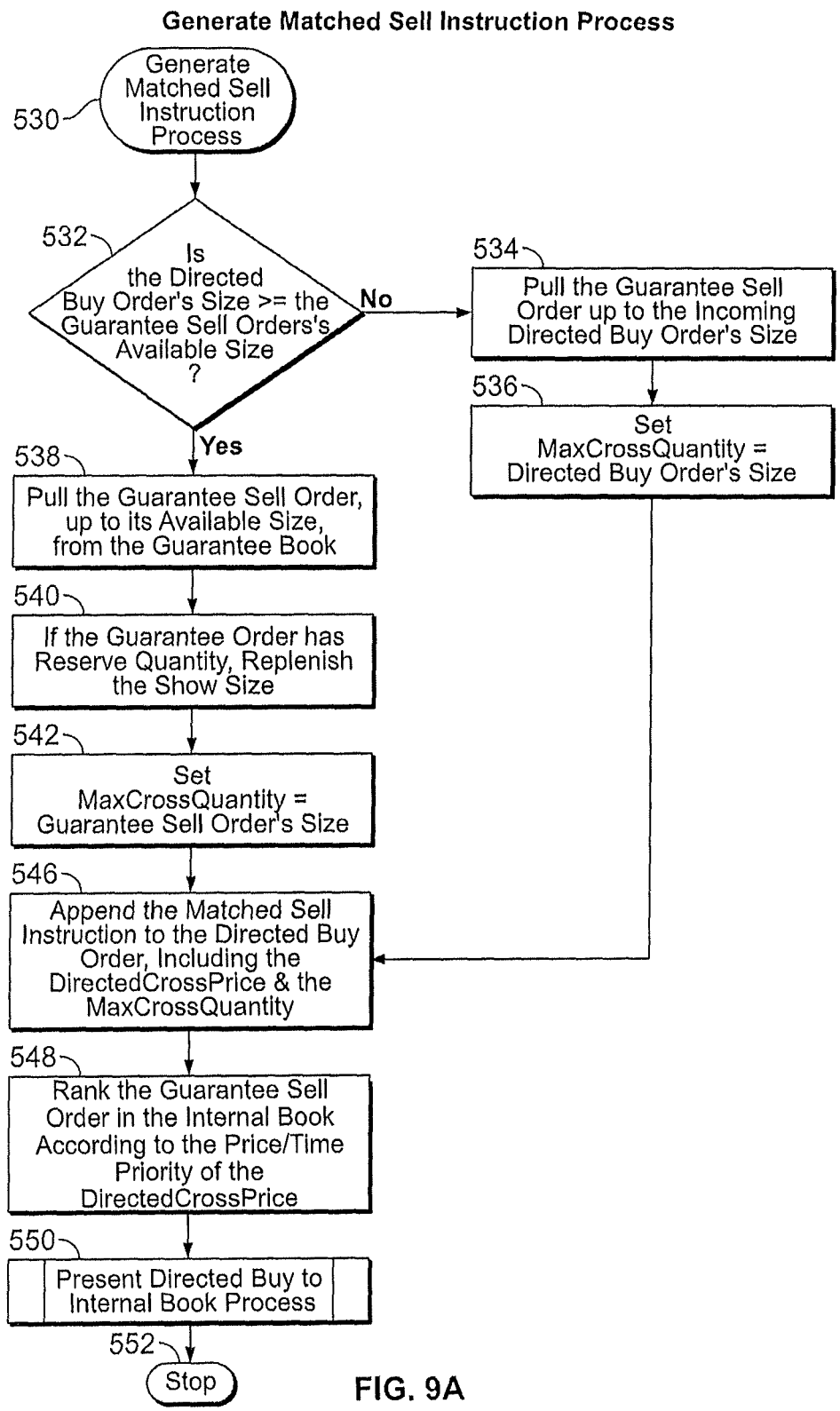
FIGS. 9A-9B illustrate processes for generating matched sell and matched buy instructions.

Referring again to step 380, if the process determines, however, that the incoming directed buy order can indeed execute against the resting guarantee sell order within the rules, then the process proceeds to step 382, where the "Generate Matched Sell Instruction" routine 46a is invoked (FIG. 9A). The process also proceeds to step 382 to invoke the "Generate Matched Sell Instruction" routine 46a if the process, at step 378, determines that the retrieved best away market offer is greater than or equal to the Directed-CrossPrice parameter.

Referring again to step 374, if the process determines that the incoming directed buy order type has no routing restrictions, then the process also proceeds to step 382 from this step as well and the "Generate Matched Sell Instruction" routine 46a is invoked (FIG. 9A). By way of explanation and as described in detail below, if an incoming directed buy order type has no routing restrictions, the process will simply route the order to all superior away market offers first before executing the pending directed cross.

Referring to FIG. 6B, in a process similar to process described above for determining if a directed buy order can trade, at step 450, the "Determine if Directed Sell Order Can Trade" routine 42b is activated, and at step 452, the process retrieves the virtual guarantee order book 62 that the designated market maker 31 created, with order allocations, for the order sending firm 26 directing the order. Then, at step 454, the process retrieves the best (highest priced) resting guarantee buy order from the guarantee order book 62. At step 456, the process then retrieves the NBBO and proceeds to step 458. At step 458, the process determines whether the resting guarantee buy order's price is superior to the NBB.

If the price is not superior, then the process sets the pending directed cross price ("DirectedCrossPrice" parameter) equal to the price of the resting guarantee buy order at step 464.

Referring again to step 458, if, however, the price of the resting guarantee buy order is superior to (higher than) the NBB, then the process continues to step 460, where, in this embodiment, it checks if the business rules of the posting market center 20 allow the guarantee buy order to be executed at its superior price. If the rules allow the order to execute at the superior price, then the process continues to step 464, where the process sets the DirectedCrossPrice parameter equal to the price of the resting guarantee buy order. Referring again to step 460, if, on the other hand, the rules of the posting market center 20 do not allow the order to execute at the superior price, then the process continues to step 462, where it caps the DirectedCrossPrice parameter by setting it equal to the current NBB.

From steps 462 and 464, the process the proceeds to step 466, where the process compares the price of the incoming directed sell order to the derived DirectedCrossPrice parameter. If the process determines that the price of the incoming directed sell order is higher, then the directed sell order is not marketable against the resting guarantee buy order. That being the case, the process proceeds to step 486, where the incoming directed sell order is automatically converted to a non-directed sell order and is processed according to the rules of the regular continuous order matching process. The instruction to direct this order to the designated market maker, therefore, is disregarded, and the process terminates as indicated at 488.

Referring back to step 466, if the process instead determines that the price of the incoming directed sell order is less than or equal to the derived DirectedCrossPrice parameter, then the incoming directed sell order is marketable against the resting guarantee buy order. The process, as a result, continues to step 468, where it checks if the derived DirectedCrossPrice parameter is lower than the NBO. The reason for this check in this embodiment is because the guarantee buy order is being allowed, in some situations, to execute at a superior price and that price may be so aggressive that it is actually greater than or equal to the NBO. If the price of the guarantee buy order is greater than or equal to the NBO, then it could cause a trade-through of the NBO if executed. At step 468, if the derived DirectedCrossPrice parameter is lower than the NBO, then the pending directed cross can execute without trading through the NBO, so the process continues to step 474. If, on the other hand, the derived DirectedCrossPrice parameter is not lower than the NBO, then the cross price may need to be adjusted to prevent trading through the NBO, and the process continues to step 470, where it determines whether the price of the pending directed cross should be adjusted.

Figure 8B:
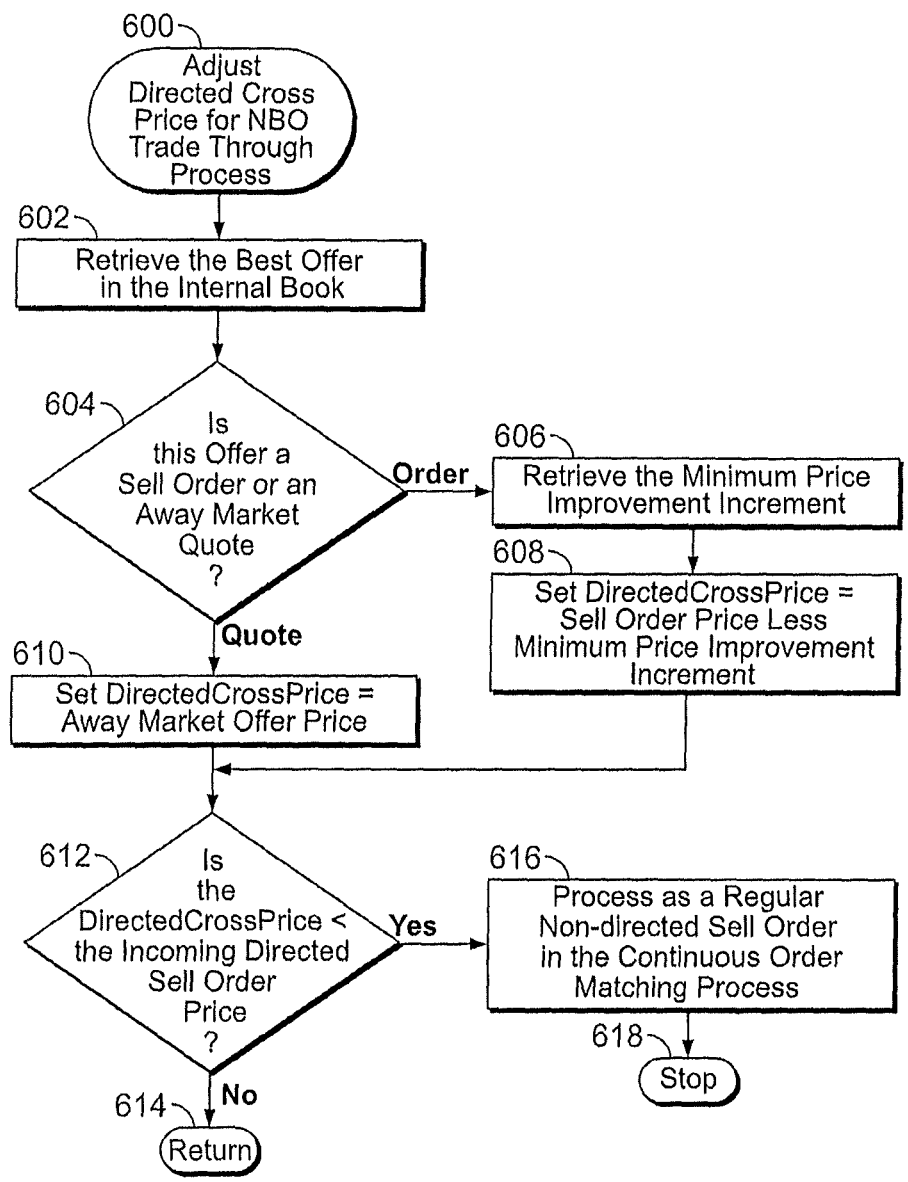

If, at step 470, the process determines that according to the business rules of the posting market center 20, the directed cross price can be adjusted, then the "Adjust Directed Cross Price for NBO Trade Through" routine 44b is invoked as indicated at step 472 (FIG. 8B). If, however, at step 470, the process determines that the business rules of the posting market center 20 do not allow the price of the directed cross to be adjusted, then the directed cross processing stops because the pending directed cross would trade through the NBO if allowed to execute. As such, the process proceeds to step 486, where the incoming directed sell order is automatically converted to a non-directed sell order and is processed according to the rules of the regular continuous order matching process. The instruction to direct this order to the designated market maker, as before, is disregarded, and the process terminates as indicated at 488.

Once the process finalizes processing at step 468, there is assurance that the pending directed cross will not trade through the NBO. However, the process must also check to verify that the pending directed cross will not trade through the NBB either. As such, the process continues to step 474, where it checks if the incoming directed sell order has any routing restrictions. As previously described, some directed order types (e.g., sweep limit and sweep market orders) are eligible to route with no restrictions, while other directed order types are not eligible to route at all (e.g., exchange-restricted and IOC orders). Still other directed order types can only route at the NBBO (e.g., inside market and inside limit orders). If the incoming directed sell order type has any routing restrictions, then the process must check that the price of the pending directed cross will not cause a trade-through violation of the NBB and that the directed cross is allowed according to the rules of the order type underlying the directed sell order. The process does this by retrieving the best away market bid at step 476 and comparing it to the DirectedCrossPrice parameter at step 478.

If, at step 478, the process determines that the best away market bid is higher (better) than the derived DirectedCrossPrice parameter, then the process proceeds to step 480, where it checks if the incoming directed sell order is eligible to execute against its paired guarantee buy order at the derived, inferior directed cross price without causing a trade-through violation. As described above, certain issues allow exchange-restricted orders and IOC orders to trade through the NBBO by three cents, as these order types cannot route and would otherwise be canceled.

If, at step 480, the process determines that the incoming directed sell order cannot execute against the resting guarantee buy order without violating trade-through rules and/or the rules of the underlying sell order type, then the process proceeds to step 486, where the incoming directed sell order, again as described above, is automatically converted to a non-directed sell order and is processed according to the rules of the regular continuous order matching process. The instruction to direct this sell order to the designated market maker is, therefore, disregarded, and the process terminates as indicated at step 488.

Figure 9B:
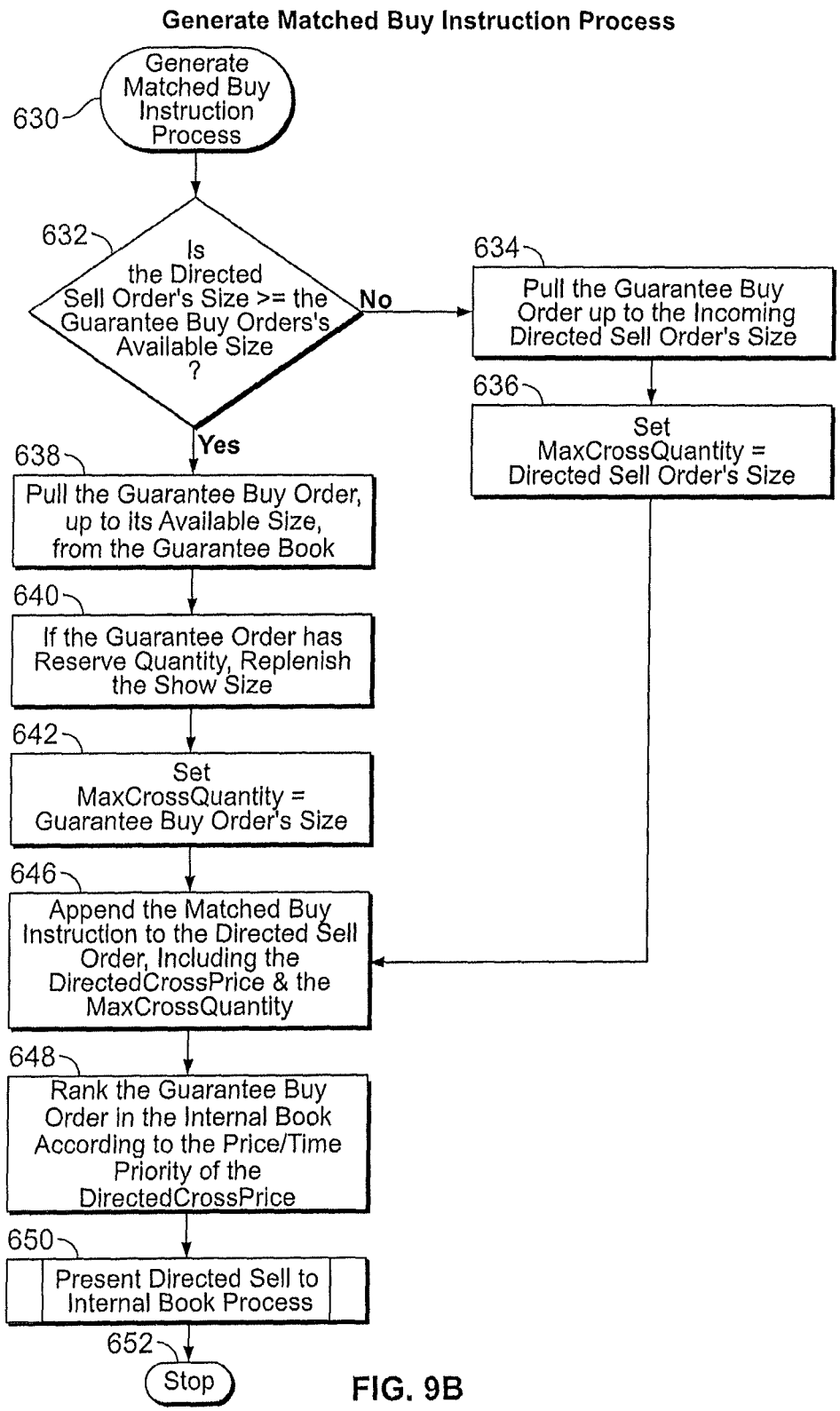

Referring again to step 480, if the process determines, however, that the incoming directed sell order can indeed execute against the resting guarantee buy order within the rules, then the process proceeds to step 482, where the "Generate Matched Buy Instruction" routine 46b is invoked (FIG. 9B). The process also proceeds to step 482 to invoke the "Generate Matched Buy Instruction" routine 46b if the process, at step 478, determines that the retrieved best away market bid is less than or equal to the DirectedCrossPrice parameter.

Referring again to step 474, if the process determines that the incoming directed sell order type has no routing restrictions, then the process also proceeds to step 482 from this step as well and the "Generate Matched Buy Instruction" routine 46b is invoked (FIG. 9B). By way of explanation and as described in detail below, if an incoming directed sell order type has no routing restrictions, the process will simply route the order to all superior away market bids first before executing the pending directed cross. Adjust Directed Cross Price for Possible NBB/NBO Trade Through As described above, if a resting guarantee order is priced very aggressively, it could result in a trade-through of either the NBB or the NBO if the pending directed cross were to execute at the guarantee order price. FIGS. 8A and 8B illustrate processes implemented in this embodiment wherein the price of the pending directed cross may be adjusted to prevent a trade-through from occurring.

Referring specifically to FIG. 8A, at step 500, the "Adjust Directed Cross Price for NBB Trade Through" routine 44a is invoked because the directed order process recognizes that the pending directed cross price may need to be adjusted to prevent an NBB trade through. The adjustment depends on whether the best trading interest is on or off the posting market center 20. At step 502, the process retrieves the best (highest-priced) bid in the internal book. At step 504, the process checks if the retrieved bid is a posted buy order or an away market quote. If the bid is a posted buy order, then the process proceeds to step 506 and derives the adjusted directed cross price by retrieving a stored minimum price improvement increment. The minimum price improvement increment is configured according to the rules of the posting market center 20 and is generally set to one tick. In this embodiment of the disclosure, the minimum price improvement increment is set to a penny. The process then proceeds to step 508 where the process adds the value of the minimum price improvement increment to the price of the retrieved posted buy order to derive the DirectedCrossPrice parameter.

If, at step 504, the process determines, however, that the bid is an away market quote, then the process derives the DirectedCrossPrice parameter by setting it equal to the away market's bid price, as indicated at step 510. By way of explanation, a directed cross is able to execute at the NBB if an away market is alone at the NBB, but a directed cross is not able to execute at the NBB if a posted buy order is at the NBB because this would cause a trade-through. The reason is that a posted buy order always has time priority over an incoming directed buy order at the same price and, therefore, the posted buy order must execute first. However, as explained above, a posted buy order cannot execute against a guarantee sell order. Therefore, the price of the pending directed cross must be improved so that it is at a price superior to the price of the posted buy order—which is why the minimum price improvement increment is necessary in this situation.

Once the DirectedCrossPrice parameter is set, the process continues to step 512, where the process checks if the derived DirectedCrossPrice parameter is now higher than the incoming directed buy order price. If the DirectedCrossPrice parameter was adjusted in the previous step, then it is possible that the incoming directed buy order's price is now too low to match its paired guarantee sell order. If that is the case, the process proceeds to step 516, where the incoming directed buy order is automatically converted to a non-directed buy order and is processed according to the rules of the regular continuous order matching process. As before, the instruction to direct this order to the designated market maker is, therefore, disregarded, and the process terminates as indicated at 518.

Referring again to step 512, if the process, however, determines that the derived DirectedCrossPrice parameter is not higher than the incoming directed buy order's price, then the incoming directed buy order and the resting guarantee sell order are still eligible to participate in the pending directed cross. In this case, the process continues to step 514, where it returns to the step 372 in FIG. 6A.

Referring now to FIG. 8B, in a process similar to the process described above for adjusting the directed cross price in view of a potential NBB trade through, at step 600, the "Adjust Directed Cross Price for NBO Trade Through" routine 44b is invoked because the directed order process recognizes that the pending directed cross price may need to be adjusted to prevent an NBO trade through. The adjustment depends on whether the best trading interest is on or off the posting market center 20. At step 602, the process retrieves the best (lowest-priced) offer in the internal book. At step 604, the process checks if the retrieved offer is a posted sell order or an away market quote. If the bid is a posted sell order, then the process proceeds to step 606 and derives the adjusted directed cross price by retrieving a stored minimum price improvement increment. In this embodiment of the disclosure, the minimum price improvement increment is set to a penny. The process then proceeds to step 608 where the process subtracts the value of the minimum price improvement increment from the price of the retrieved posted sell order to derive the DirectedCrossPrice parameter.

If, at step 604, the process determines, however, that the bid is an away market quote, then the process derives the DirectedCrossPrice parameter by setting it equal to the away market's offer price, as indicated at step 610. Similar to the explanation above with respect to the relationship between a buy order and the NBB, a directed cross is able to execute at the NBO if an away market is alone at the NBO, but a directed cross is not able to execute at the NBO if a posted sell order is at the NBO because this would cause a trade-through. The reason is that a posted sell order always has time priority over an incoming directed sell order at the same price and, therefore, the posted sell order must execute first. However, as explained above, a posted sell order cannot execute against a guarantee buy order. Therefore, the price of the pending directed cross must be improved so that it is at a price superior to the price of the posted sell order— which is why the minimum price improvement increment is necessary in this situation.

Once the DirectedCrossPrice parameter is set, the process continues to step 612, where the process checks if the derived DirectedCrossPrice parameter is now lower than the incoming directed sell order price. If the DirectedCrossPrice parameter was adjusted in the previous step, then it is possible that the incoming directed sell order's price is now too high to match its paired guarantee buy order. If that is the case, the process proceeds to step 616, where the incoming directed sell order is automatically converted to a non-directed sell order and is processed according to the rules of the regular continuous order matching process. As before, the instruction to direct this order to the designated market maker is, therefore, disregarded, and the process terminates as indicated at 618.

Referring again to step 612, if the process, however, determines that the derived DirectedCrossPrice parameter is not lower than the incoming directed sell order's price, then the incoming directed sell order and the resting guarantee buy order are still eligible to participate in the pending directed cross. In this case, the process continues to step 614, where it returns to the step 472 in FIG. 6B.

Create a Match Instruction Linking/Pairing the Directed Order with Retrieved Guarantee Order Once the process has determined that the incoming directed order is eligible to cross with its paired contra-side guarantee order and that the derived DirectedCrossPrice parameter will neither trade through the NBBO nor violate any trading rules specific to the incoming directed order type, then the incoming directed order and the retrieved contra-side guarantee order are finally linked together in a directed cross order instruction. FIGS. 9A and 9B illustrate processes implemented in this embodiment wherein the process pulls the eligible contra-side guarantee order from the appropriate guarantee order book and pairs it with the incoming directed order to construct a directed cross order instruction. The directed cross order is a two-sided instruction to the order matching engine 21 to execute the directed order and its paired contra-side guarantee order at the price set by the DirectedCrossPrice parameter, up to a maximum quantity ("MaxCrossQuantity") that is determined in this process.

Referring specifically to FIG. 9A, at step 530, the directed order process activates the "Generate Matched Sell Instruction" routine 46a. Then, at step 532, the process compares the size of the incoming directed buy order to the size of the resting guarantee sell order. If the incoming directed buy order size is lower, then the process continues to step 534, where it pulls a portion of the quantity of the guarantee sell order size equal to the incoming directed buy order's size from the book 62 and sets the maximum quantity which can cross (MaxCrossQuantity parameter) equal to the size of the incoming directed buy order's size at step 536. The remaining portion of the resting guarantee sell order is not needed for the pending directed cross and remains in the guarantee order book 62, where it is available for matching with other incoming directed buy orders.

Referring again to step 532, if, on the other hand, the size of the incoming directed buy order is greater than or equal to the available size of the resting guarantee sell order, then the process pulls the full available quantity of the guarantee sell order as indicated at step 538. If the resting guarantee sell order has a reserve quantity, then the process replenishes the guarantee sell order up to its Show Size (i.e., the maximum size available for matching with a directed order) as indicated at step 540. If the resting guarantee sell order does not have a reserve quantity, then the process pulls the entire order, removing the depleted order from the guarantee order book 62. Then, at step 542, the process sets the MaxCrossQuantity parameter equal to the size of the pulled guarantee sell order, which can be less than the incoming directed buy order. Any excess quantity of the incoming directed buy order which is unexecuted after the directed cross concludes is processed in the regular continuous order matching process as if it were a non-directed buy order.

Once the MaxCrossQuantity parameter has been determined and the guarantee sell order has been pulled up to the MaxCrossQuantity parameter, the process, at step 546, appends a matched sell instruction to the incoming directed buy order. The matched sell instruction indicates the identity of the paired guarantee sell order, the MaxCrossQuantity parameter and the DirectedCrossPrice parameter. The constructed order is the two-sided directed cross order instruction.

Figure 10A:
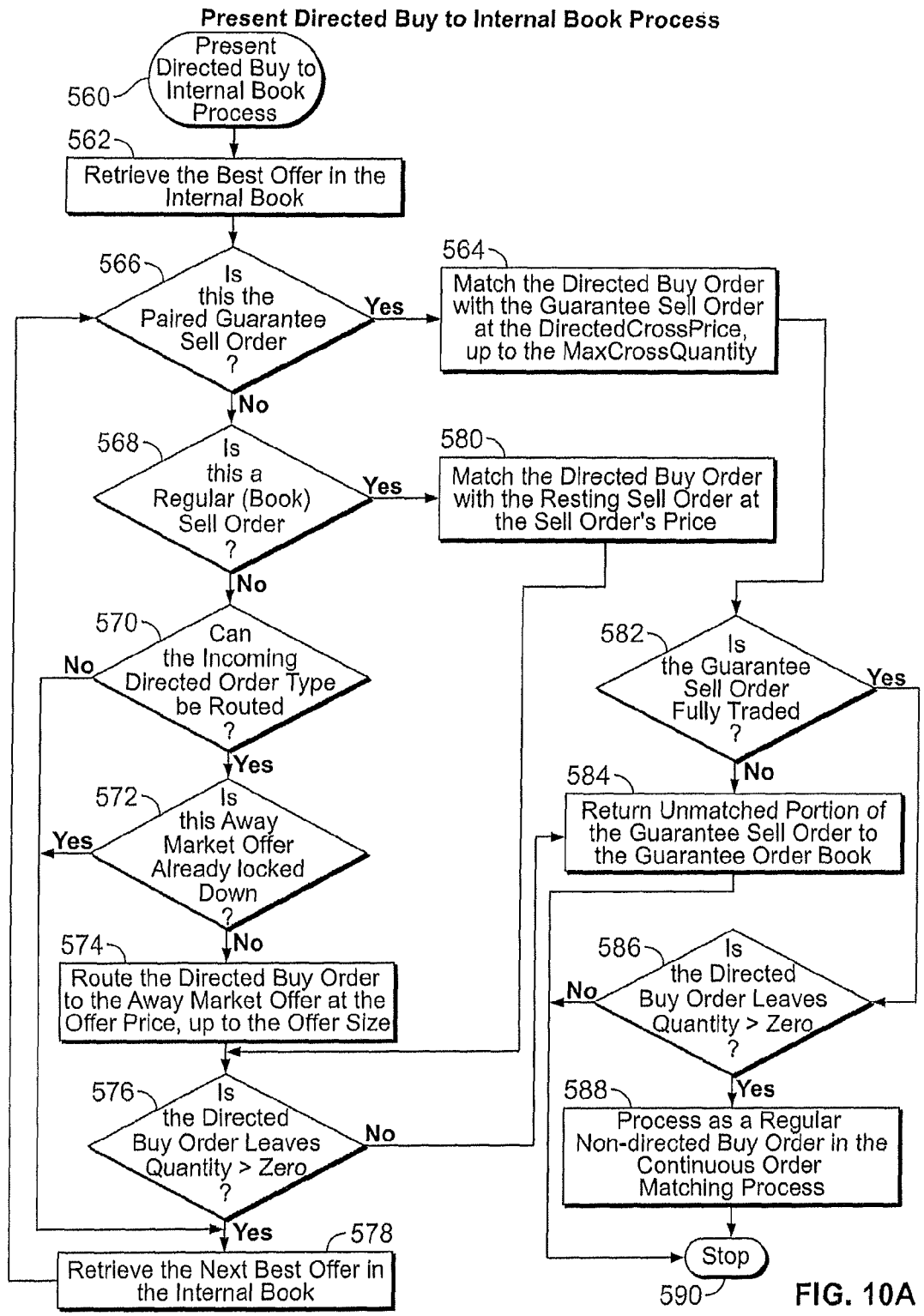
FIGS. 10A-10B illustrate processes for presenting a directed buy and directed sell order to the internal book.

At step 548, the process then momentarily ranks the paired guarantee sell order side of the two-sided directed cross order instruction in the internal book according to the price/time priority of the DirectedCrossPrice parameter. This is required so that the priority of the guarantee sell order can be determined in relation to the marketplace. The guarantee sell order is ranked behind all displayed sell orders at the same price, but ahead of all nondisplayed ("working") sell orders at the same price, and ahead of all away market offers at the same price. The process continues to step 550, where the "Present Directed Buy to Internal Book" routine 48a is invoked (FIG. 10A).

Referring now to FIG. 9B, in a process similar to the process described above for pairing directed buy orders with guarantee sell orders, at step 630, the directed order process activates the "Generate Matched Buy Instruction" routine 46b. Then, at step 632, the process compares the size of the incoming directed sell order to the size of the resting guarantee buy order. If the incoming directed sell order size is lower, then the process continues to step 634, where the process pulls a portion of the quantity of the guarantee buy order size equal to the incoming directed sell order's size from the book 62 and sets the maximum quantity which can cross (MaxCrossQuantity parameter) equal to the size of the incoming directed sell order's size at step 636. The remaining portion of the resting guarantee buy order is not needed for the pending directed cross and remains in the guarantee order book 62, where it is available for matching with other incoming directed sell orders.

Referring again to step 632, if, on the other hand, the size of the incoming directed sell order is greater than or equal to the available size of the resting guarantee buy order, then the process pulls the full available quantity of the guarantee buy order as indicated at step 638. If the resting guarantee buy order has a reserve quantity, then the process replenishes the guarantee buy order up to its Show Size (i.e., the maximum size available for matching with a directed order) as indicated at step 640. If the resting guarantee buy order does not have a reserve quantity, then the process pulls the entire order, removing the depleted order from the guarantee order book 62. Then, at step 642, the process sets the MaxCrossQuantity parameter equal to the size of the pulled guarantee buy order, which can be less than the incoming directed sell order. Any excess quantity of the incoming directed sell order which is unexecuted after the directed cross concludes is processed in the regular continuous order matching process as if it were a non-directed sell order.

Once the MaxCrossQuantity parameter has been determined and the guarantee buy order has been pulled up to the MaxCrossQuantity parameter, the process, at step 646, appends a matched buy instruction to the incoming directed sell order. The matched buy instruction indicates the identity of the paired guarantee buy order, the MaxCrossQuantity parameter and the DirectedCrossPrice parameter. The constructed order is the two-sided directed cross order instruction.

Figure 10B:
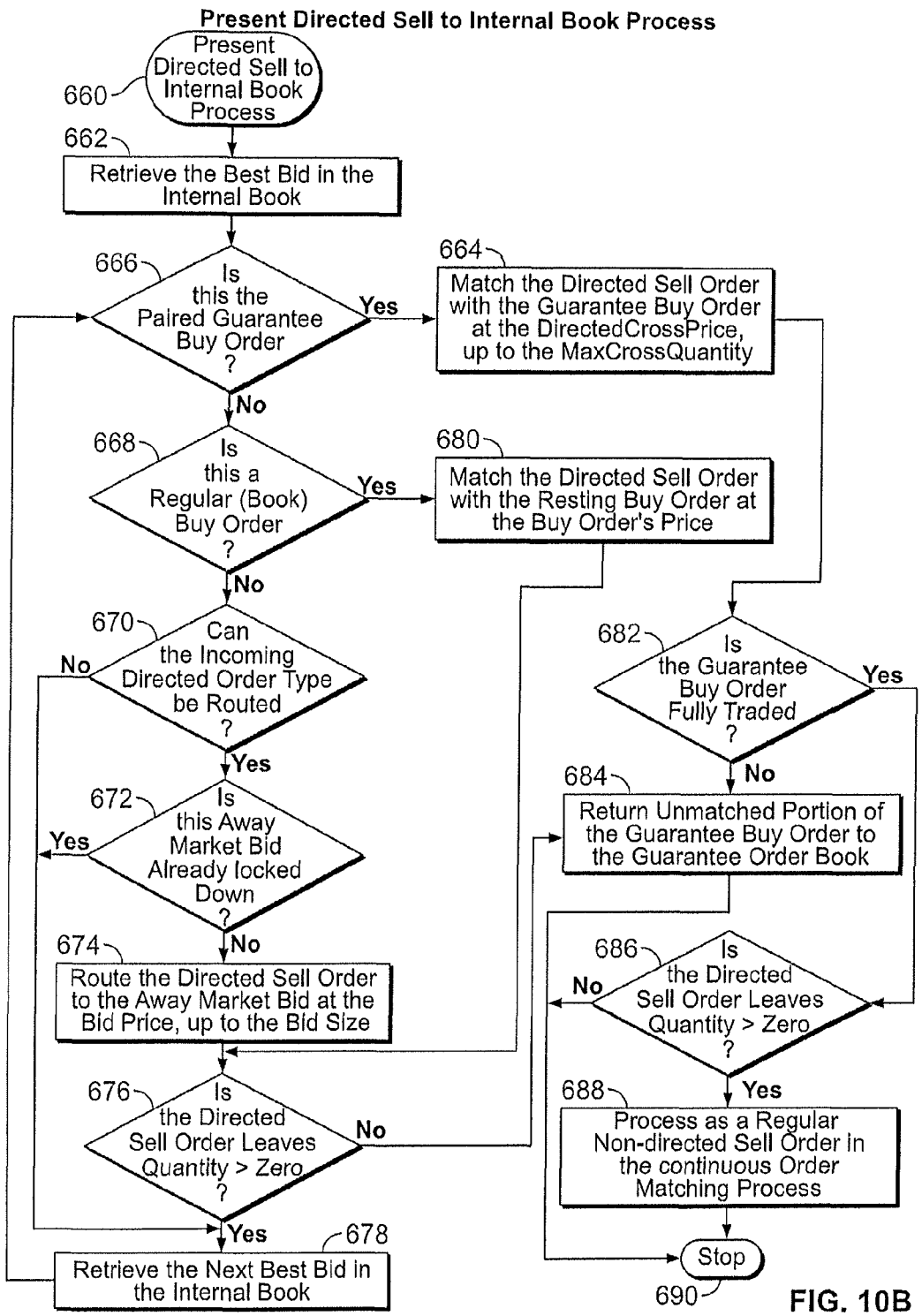

At step 648, the process then momentarily ranks the paired guarantee buy order side of the two-sided directed cross order instruction in the internal book according to the price/time priority of the DirectedCrossPrice parameter. This is required so that the priority of the guarantee buy order can be determined in relation to the marketplace. The guarantee buy order is ranked behind all displayed buy orders at the same price, but ahead of all nondisplayed ("working") buy orders at the same price, and ahead of all away market bids at the same price. The process continues to step 650, where the "Present Directed Sell to Internal Book" routine 48b is invoked (FIG. 10B).

Present Directed Order to Contra Side of the Internal Book

After a match instruction is appended to a directed order, the directed order is presented to the contra side of the internal book. The guarantee order paired with the directed order is momentarily ranked in the internal book in price/time priority while its contra paired directed order sweeps any superior bids or offers. If the paired guarantee order is the best ranked order in the internal book, then the directed order and its paired guarantee order can cross cleanly without any market interaction. If, on the other hand, the guarantee order is not the best ranked order in the internal book, then the directed order must first interact with all higher-priority contra trading interest before it can cross the guarantee order. The directed order process contemporaneously executes against all higher-priority trading interest, starting with the best-priced bid or offer and including all price levels until the paired guarantee order is detected.

The explanation that follows explains how, in this embodiment, the directed order process determines which bids and offers are superior to the guarantee order. Within the posting market center 20, the order matching engine 21 maintains an internal book of all orders resident on posting market center 20 (referred to as book orders herein) and the BBO (the Top of Book quote) of each away market (referred to as away market quotes herein). Bids and offers reside on two separate lists. In this embodiment, these lists are ranked according to price/time priority as follows: all orders and quotes are ranked according to price priority, with the highest-priced bid (lowest-priced offer) having priority over all inferior bids (offers); within each price level, book orders are ranked in time priority, but with a preference given to displayed trading interest over nondisplayed ("working") trading interest; within each price level, book orders always have priority over away market quotes and within each price level, away market quotes are ranked according to the posting market center's business rules. The paired guarantee order is ranked in price/time priority behind all displayed resident trading interest at the same price, but ahead of all nondisplayed resident trading interest at the same price. When a guarantee order resides 'unpaired' in the guarantee order book 62, it has no standing and no execution priority.

Within each price level, in this embodiment, resting book orders are ranked as follows in the internal book and may be thought of as "residing" in a corresponding order execution process:

Displayed Orders
"Working" Orders (not displayed), which include, if present:
Reserve sizes of Displayed Orders
Passive Liquidity Orders
Discretionary prices of Displayed Orders
Tracking Liquidity Orders Thus, at any given price, displayed orders "reside" in the display process and are ranked first; the reserve portions of displayed orders reside in the working process (the reserve sub-process) and are ranked second; passive liquidity orders reside in the working process (the liquidity sub-process) and are ranked third; the discretionary prices of displayed orders reside in the working process (the discretionary sub-process) and are ranked fourth; and tracking liquidity orders reside in the working process (the tracking sub-process) and are ranked fifth. Passive liquidity orders are described and disclosed in co-pending U.S. patent application Ser. No. 11/416,756, which is incorporated by reference herein. Similarly, tracking liquidity orders are described and disclosed in co-pending U.S. patent application Ser. No. 11/416,943, which is incorporated by reference herein.

For example, the following orders are ranked in this priority in regard to executing at the price of $20.00:

| Rank | Order Details |
|---|---|
| 1 | Order A: Buy 100 @ 20.00 |
| 2 | Order B: Buy 500 @ 20.00, Display Size = 100, Reserve Size = 400 |
| 3 | Order C: Buy 100 @ 20.00, Passive Liquidity |
| 4 | Order D: Buy 100 @ 19.99, with Discretion to 20.00 |
| 5 | Order E: Buy 100 @ 20.00, Tracking Liquidity |

If the NBB is $20.00 and away market A is also at the NBB, an incoming order to sell 900 at $20.00 would execute against the buy orders in the sequence shown above. Fully-displayed Order A would execute first, partly-displayed Order B would execute next (100 Displayed +400 Reserve), nondisplayed Order C would execute next, Order D would step up to its discretionary price of $20.00 and execute next, and lastly nondisplayed Order E would execute to prevent the incoming sell order from routing to away market A.

When a guarantee order is marketable against an incoming directed order, the directed order process momentarily ranks the paired guarantee order with other orders at the same price level as shown below, behind all displayed orders but ahead of all nondisplayed orders:

Displayed Orders
Guarantee Order←
"Working" Orders (not displayed), which include, if present:
Reserve sizes of Displayed Orders
Passive Liquidity Orders
Discretionary prices of Displayed Orders
Tracking Liquidity Orders Continuing from the previous example, if an incoming directed sell order is paired with a guarantee order to buy 200 at $20.00, the guarantee order side of the resulting directed cross order is momentarily ranked as follows in regard to execution opportunities:

| Rank | Order Details |
|---|---|
| 1 | Order A: Buy 100 @ 20.00 |
| 2 | Order B: Buy 100 @ 20.00, Displayed Size |
| 3 | Guarantee Order: Buy 200 @ 20.00 ← |
| 4 | Order B: Buy 400 @ 20.00, Reserve Size |
| 5 | Order C: Buy 100 @ 20.00, Passive Liquidity |
| 6 | Order D: Buy 100 @ 19.99, with Discretion to 20.00 |
| 7 | Order E: Buy 100 @ 20.00, Tracking Liquidity |

In this example, the guarantee buy order is momentarily ranked behind the displayed portion of Order B, but ahead of the reserve (nondisplayed) portion of Order B. The directed sell order side of the directed cross order must execute Order A fully, then must execute the displayed portion of Order B fully, and only then can execute against the paired guarantee order. If any portion of the directed sell order remains after executing against the paired guarantee buy order, then it is automatically converted to a non-directed sell order, and continues to execute the reserve portion of Order B, and so forth. As illustrated in this example, the guarantee order has lower priority than all displayed resident trading interest at the same price, but higher priority than non-displayed ("Working") resident trading interest at the same price.

However, if passive liquidity order C is priced at $20.01 instead of $20.00, then the NBB is still $20.00 because passive liquidity orders are not displayed to the marketplace nor included in the posting market center's BBO. In this example, the orders are ranked as follows according to price/time priority:

| Rank | Order Details |
|---|---|
| 1 | Order C: Buy 100 @ 20.01, Passive Liquidity |
| 2 | Order A: Buy 100 @ 20.00 |
| 3 | Order B: Buy 100 @ 20.00, Displayed Size |
| 4 | Guarantee Order: Buy 200 @ 20.00 ← |
| 5 | Order B: Buy 400 @ 20.00, Reserve Size |
| 6 | Order D: Buy 100 @ 19.99, with Discretion to 20.00 |
| 7 | Order E: Buy 100 @ 20.00, Tracking Liquidity |

The directed sell order side of the directed cross order must execute Order C folly, then must execute Order A fully, then must execute the displayed portion of Order B fully, and only then can execute against the paired guarantee order. If any portion of the directed sell order remains after execution against the paired guarantee buy order, then it is automatically converted to a non-directed sell order, and continues to execute the reserve portion of Order B, and so forth.

It should be understood that the description of the ranked order execution processes and sub-processes herein is only meant to illustrate the logical processing concepts and does not imply a physical implementation. The purpose of describing separate processes herein is to illustrate how various order types have priority over other order types within the order matching engine 21. It should also be understood that the posting market center 20 may choose not to support all of the Working Process order types described above, e.g., it may, for whatever reason, not allow passive liquidity orders. Such a decision does not affect the ranking of guarantee orders in regard to the Display Process or in regard to the remaining Working Process order types that are supported.

FIGS. 10A and 10B illustrate processes implemented in this embodiment wherein the process presents the directed order to the contra side of the internal book, and the process executes all superior trading interest in the marketplace before crossing any part of the paired guarantee order and then crossing any unexecuted portion of the directed order with the guarantee order. Referring specifically to FIG. 10A, after the process momentarily ranks the guarantee sell order in the internal book as described above, it is ready to execute the incoming directed buy order by presenting it to the internal book, as indicated at step 560. At step 562, the process retrieves the best offer in the internal book. Then, at step 566, the process checks if the retrieved best offer is the guarantee sell order that the directed buy order was paired with. If the retrieved best offer is indeed the paired guarantee sell order, then the process continues to step 564, where it executes the directed cross. The process executes the incoming directed buy order against the paired guarantee sell order at the computed price set in the DirectedCrossPrice parameter and up to the quantity set in the MaxCrossQuantity parameter.

After executing the directed cross, the process continues to step 582, where it checks if the guarantee sell order was fully traded or not. It should be noted that, in this embodiment, if the guarantee sell order is superior to all other offers in the marketplace, then the incoming directed buy order executes with the guarantee sell order completely because no sell orders or away market offers break up the directed cross transaction. If the guarantee sell order is fully traded, then the process proceeds to step 586, where it checks if the incoming directed buy order still has quantity remaining to trade. If the incoming directed buy order does not have any remaining quantity, then the process terminates as indicated at 590. If, however, the incoming directed buy order does still have quantity available to trade, then the process continues to step 588, where the remaining portion of the incoming directed buy order is automatically converted to a non-directed buy order and is processed according to the rules of the regular continuous order matching process. The instruction to direct this order to the designated market maker is then disregarded, and the process terminates as indicated at 590.

Referring again to step 566, if the retrieved best offer is not the paired guarantee sell order, then the incoming directed buy order must first execute against any superior trading interest in the marketplace. The process proceeds to step 568 where the process determines if the retrieved best offer is a regular (book) sell order. If it is, then the process matches the incoming directed buy order with the posted sell order at the sell order's price, as indicated at step 580. The process then continues on to check if the directed buy order still has quantity remaining at step 576. If, at step 568, the process determines, however, that the best offer is not a sell order, then it is an away market quote instead. The process, therefore, proceeds to step 570 where the process checks if the incoming directed buy order can be routed. If the order type of the directed order cannot route, then the process proceeds to step 578 to retrieve the next best offer and returns to step 566. If, at step 570, the order type of the directed order can route, then the process continues to step 572, where it checks if the away market offer is already "locked down." An away market quote is considered to be fully locked down if the order matching engine 21 has already routed one or more commitments (on behalf of one or more prior underlying orders) to the away market at its quote price at a quantity equal to its published quote size, and the away market has not moved its quote yet. If the away market offer is fully locked down, then the incoming directed order is not required to route to the away market offer, and the process continues to step 578, where it retrieves the next best offer and returns to step 566.

If, at step 572, however, the away market offer is not fully locked down, then the process continues to step 574, where it routes the lesser of the incoming directed buy order's leaves quantity and the size of the away market offer that is not yet locked down. If, for example, an away market center is currently offering 500 shares but the order matching engine 21 has previously routed 200 shares to it and is awaiting the fill, then 300 shares are not yet locked down, and the process routes 300 shares of the incoming directed order to the away market center. However, if the incoming directed order only has 200 shares remaining, then the process only routes 200 shares instead. As it may take up to 30 seconds to receive a response from a slow market center, the process does not wait for a response in this embodiment and proceeds immediately to step 576. If any shares of the routed commitment are declined by the away market, they are returned to the (now) non-directed order, and processed in the continuous order matching process.

At step 576, the process checks if the incoming directed buy order still has quantity remaining to trade after it has interacted with the marketplace. If it does not, then the process continues to step 584, where the process returns the unexecuted portion of the guarantee sell order to the guarantee book. The process then terminates as indicated at step 590.

Referring again to step 576, if, however, the incoming directed buy order does still have quantity available to trade, then the process continues to step 578, where it retrieves the next-best offer in the internal book and returns to step 566. At step 566, the process checks if this next-best offer is the paired guarantee sell order. If it is, then the process executes the directed cross at step 564, checks if the guarantee sell order is fully traded at step 582, and either returns the unmatched portion of the guarantee sell order to the guarantee order book at step 584 or else checks if the incoming directed buy order still has quantity remaining to execute at step 586, as described above. If, on the other hand, at step 566 the next-best offer is not the paired guarantee sell order, then the process continues to step 568, where it checks if it is a sell order or an away market quote. The process continues in this fashion, matching posted book sell orders and/or routing to away market offers, until the incoming directed buy order is either depleted (without ever having crossed any part of the guarantee sell order) or else finally executes against the paired guarantee sell order at step 564. Matching the remaining portion of a directed buy order with a paired guarantee sell order is contemporaneous with the internal book marketplace interaction, i.e., if any shares of the directed order were routed to superior away markets, the directed order process does not wait for a response before executing the directed cross.

Referring now to FIG. 10B, in a process similar to the process described above for presenting a directed buy order to the internal book, at step 660, the process for presenting a directed sell order to the internal book is initiated. At step 662, the process retrieves the best bid in the internal book. Then, at step 666, the process checks if the retrieved best bid is the guarantee buy order that the directed sell order was paired with. If the retrieved best bid is indeed the paired guarantee buy order, then the process continues to step 664, where it executes the directed cross. The process executes the incoming directed sell order against the paired guarantee buy order at the computed price set in the Directed-CrossPrice parameter and up to the quantity set in the MaxCrossQuantity parameter.

After executing the directed cross, the process continues to step 682, where it checks if the guarantee buy order was fully traded or not. It should be noted that, in this embodiment, if the guarantee buy order is superior to all other offers in the marketplace, then the incoming directed sell order executes with the guarantee buy order completely because no buy orders or away market bids break up the directed cross transaction. If the guarantee buy order is fully traded, then the process proceeds to step 686, where it checks if the incoming directed sell order still has quantity remaining to trade. If the incoming directed sell order does not have any remaining quantity, then the process terminates as indicated at 690. If, however, the incoming directed sell order does still have quantity available to trade, then the process continues to step 688, where the remaining portion of the incoming directed sell order is automatically converted to a non-directed sell order and is processed according to the rules of the regular continuous order matching process. The instruction to direct this order to the designated market maker is then disregarded, and the process terminates as indicated at 690.

Referring again to step 666, if the retrieved best bid is not the paired guarantee buy order, then the incoming directed sell order must first execute against any superior trading interest in the marketplace. The process proceeds to step 668 where the process determines if the retrieved best bid is a regular (book) buy order. If it is, then the process matches the incoming directed sell order with the posted buy order at the buy order's price, as indicated at step 680. The process then continues on to check if the directed sell order still has quantity remaining at step 676. If, at step 668, the process determines, however, that the best bid is not a buy order, then it is an away market quote instead. The process, therefore, proceeds to step 670 where the process checks if the incoming directed sell order can be routed. If the order type of the directed order cannot route, then the process proceeds to step 678 to retrieve the next best bid and returns to step 666. If, at step 670, the order type of the directed order can route, then the process continues to step 672, where it checks if the away market bid is already "locked down." If the away market bid is fully locked down, then the incoming directed order is not required to route to the away market bid, and the process continues to step 678, where it retrieves the next best bid and returns to step 666.

If, at step 672, however, the away market bid is not fully locked down, then the process continues to step 674, where it routes the lesser of the incoming directed sell order's leaves quantity and the size of the away market bid that is not yet locked down. As it may take up to 30 seconds to receive a response from a slow market center, the process does not wait for a response in this embodiment and proceeds immediately to step 676. If any shares of the routed commitment are declined by the away market, they are returned to the (now) non-directed order, and processed in the continuous order matching process.

At step 676, the process checks if the incoming directed sell order still has quantity remaining to trade after it has interacted with the marketplace. If it does not, then the process continues to step 684, where the process returns the unexecuted portion of the guarantee buy order to the guarantee book. The process then terminates as indicated at step 690.

Referring again to step 676, if, however, the incoming directed sell order does still have quantity available to trade, then the process continues to step 678, where it retrieves the next-best bid in the internal book and returns to step 666. At step 666, the process checks if this next-best bid is the paired guarantee buy order. If it is, then the process executes the directed cross at step 664, checks if the guarantee buy order is fully traded at step 682, and either returns the unmatched portion of the guarantee buy order to the guarantee order book at step 684 or else checks if the incoming directed sell order still has quantity remaining to execute at step 686, as described above. If, on the other hand, at step 666 the next-best bid is not the paired guarantee buy order, the process continues to step 668, where it checks if it is a buy order or an away market quote. The process continues in this fashion, matching posted book buy orders and/or routing to away market bids, until the incoming directed sell order is either depleted (without ever having crossed any part of the guarantee buy order) or else finally executes against the paired guarantee buy order at step 664. Matching the remaining portion of a directed sell order with a paired guarantee buy order is contemporaneous with the internal book marketplace interaction, i.e., if any shares of the directed order were routed to superior away markets, the directed order process does not wait for a response before executing the directed cross.

DETAILED EXAMPLES

Examples of how directed orders in a preferred embodiment of the disclosure operate are provided below. It should be understood that the order and quote prices and sizes discussed in these examples are by way of example only to illustrate how the process of an embodiment of the disclosure handles directed orders. Directed order behavior is not limited to these examples.

In all the examples that follow, the DMM/OSF permissions table 60 appears as follows:

| Issue | Designated Market Maker Firm (DMM) | Default DMM? | Order Sending Firm (OSF) |
|---|---|---|---|
| XYZ | FirmA | | FirmC |
| XYZ | FirmA | Y | FirmD |
| XYZ | FirmB | Y | FirmB |
| XYZ | FirmB | | FirmD |

Example 1

Primary Peg Guarantee Buy Order is Received

At the start of this example, the NBBO is $20.00 to $20.04. Market Maker Firm A 31*a* sends the following guarantee order for Order Sending Firm C 26*a*:
→Guarantee Order 1: Buy 5000 @ Bid, Show Size=1000, Reserve Size=4000, Guarantee Order for FirmC Referring to FIG. 3A, at step 100, the process receives incoming Guarantee Buy Order 1, and then at step 102, the process retrieves the DMM/OSF permissions table data. At step 104, the process determines that Firm A is permissioned to receive directed order flow from Firm C (the first row in the DMM/OSF permissions table 60) and can therefore submit guarantee orders intended for FirmC.

At step 106, the process then retrieves the virtual guarantee order book 62*a* that Firm A created for Firm C. As this is the first order of the day, the guarantee order book 62*a* is empty. At step 108, the process checks if there are any guarantee sell orders resting on the guarantee order book 62*a*. As none exist, the process proceeds to step 114.

At step 114, the process checks if any guarantee buy orders with the same price as incoming Guarantee Buy Order 1 are already resting on the guarantee order book 62*a*. As there are none, the process, at step 116, inserts incoming Guarantee Buy Order 1 into the guarantee order book 62*a*, and the process is completed, as indicated at step 118.

At this point, the guarantee order book 62*a* looks like this:

| FirmA Guarantee Buy Orders for FirmC | FirmA Guarantee Sell Orders for FirmC |
|---|---|
| Guarantee Order 1: Buy 5000 @ Bid, Show Size = 1000, Reserve Size = 4000 | |

Example 2

Limit Guarantee Buy Order is Received

Continuing from the previous example, Market Maker Firm A 31*a* sends a second guarantee buy order for Order Sending Firm C 26*a*:
→Guarantee Order 2: Buy 300 @ 15.00, Guarantee Order for FirmC As before, at step 100, the process receives Guarantee Buy Order 2. At step 102, the process then retrieves the DMM/OSF permissions table 60, and at step 104, the process again determines that Firm A is permissioned to received directed order flow from Firm C and can therefore submit guarantee orders intended for Firm C.

At step 106, the process, as result, retrieves the guarantee order book 62*a* that Firm A created for Firm C. At step 108, the process checks if any guarantee sell orders have been stored yet. As none exist, it proceeds to step 114. At step 114, the process checks if any guarantee buy orders with the same price as incoming Guarantee Buy Order 2 are already on the book 62*a*. The process determines that the current price of resting Guarantee Buy Order 1 is $20.00, as the order is pegged to the bid and the NBBO is currently $20.00 to $20.04 in this example. As incoming Guarantee Buy Order 2 is priced at $15.00, the order prices are different and the process continues to step 116.

As incoming Guarantee Buy Order 2's price ($15.00) is different from resting Guarantee Buy Order 1's price ($20.00), the process inserts incoming Guarantee Buy Order 2 in the guarantee order book 62a in price/time priority, and the process is completed in step 118.

The guarantee order book 62a looks like this at this point:

| FirmA Guarantee Buy Orders for FirmC | FirmA Guarantee Sell Orders for FirmC |
|---|---|
| Guarantee Order 1: Buy 5000 @ Bid, Show Size = 1000, Reserve Size = 4000 Guarantee Order 2: Buy 300 @ 15.00 ← | |

Example 3

Primary Peg Guarantee Sell Order is Received

Continuing from the previous examples, Market Maker Firm A 31a sends the following guarantee sell order for Order Sending Firm C 26a:

→Guarantee Order 3: Sell 4000 @ Offer, Show Size=900, Reserve Size=3100, Guarantee Order for FirmC Referring to FIG. 3B, at step 200, the process receives incoming Guarantee Sell Order 3. At step 202, the process retrieves the DMM/OSF permissions table 60. At step 204, the process determines that Firm A is permissioned to received directed order flow from Firm C and can therefore submit guarantee orders intended for Firm C.

At step 206, the process again retrieves the guarantee order book 62a that Firm A created for Firm C. At step 208, the process checks if any guarantee buy orders exist in the guarantee order book 62a yet. As Guarantee Buy Orders 1 and 2 are currently resting in the order book 62a, the process continues to step 210 and retrieves Guarantee Buy Order 1, the best (highest-priced) guarantee buy order.

At step 212, the process compares the price of incoming Guarantee Sell Order 3 to the price of resting Guarantee Buy Order 1. The NBBO is currently $20.00 to $20.04, which means resting Guarantee Buy Order 1 is currently priced at $20.00 and incoming Guarantee Sell Order 3 is currently priced at $20.04. As incoming Guarantee Sell Order 3's price ($20.04) is higher than resting Guarantee Buy Order 1's price ($20.00), the process continues to step 214.

At step 214, the process checks if any guarantee sell orders with the same price are resting on the guarantee order book 62a. As no guarantee sell orders are presently resting on the guarantee order book 62a yet, the process, at step 216, inserts incoming Guarantee Sell Order 3 in the guarantee order book 62a, and the process is completed at step 218.

The guarantee order book 62a presently looks like this:

| FirmA Guarantee Buy Orders for FirmC | FirmA Guarantee Sell Orders for FirmC |
|---|---|
| Guarantee Order 1: Buy 5000 @ Bid, Show Size = 1000, Reserve Size = 4000 Guarantee Order 2: Buy 300 @ 15.00 | Guarantee Order 3: Sell 4000 @ Offer, ← Show Size = 900, Reserve Size = 3100 |

Example 4

Limit Guarantee Sell Order is Received

Continuing from the previous examples, Market Maker Firm A 31 sends the following limit guarantee sell order for Order Sending Firm C 26a:

→Guarantee Order 4: Sell 500 @ 30.00, Guarantee Order for FirmC

At step 200, the process receives incoming Guarantee Sell Order 4, and then at step 202, the process retrieves the DMM/OSF permissions table 60. As above, at step 204, the process determines that Firm A is permissioned to received directed order flow from Firm C and can therefore submit guarantee orders intended for Firm C.

At step 206, the process retrieves the guarantee order book 62a that Firm A created for Firm C, and at step 208, the process checks if any guarantee buy orders are resting in the guarantee order book 62a. As Guarantee Buy Orders 1 and 2 are resting, the process continues to step 210 and retrieves Guarantee Buy Order 1, the best (highest-priced) guarantee buy order.

At step 212, the process compares the price of the incoming Guarantee Sell Order 4 to the price of resting Guarantee Buy Order 1. The NBBO is currently $20.00 to $20.04, which means Guarantee Buy Order 1 is currently priced at $20.00. As incoming Guarantee Sell Order 4's price ($30.00) is higher than resting Guarantee Buy Order 1's price ($20.00), the process continues to step 214.

At step 214, the process checks if any guarantee sell orders with the same price are resting on the guarantee order book 62a. The process determines that the current price of resting Guarantee Sell Order 3 is $20.04, as the order is pegged to the Offer and the NBBO is currently $20.00 to $20.04. As incoming Guarantee Sell Order 4 is priced at $30.00, the order prices are different, and the process inserts incoming Guarantee Sell Order 4 in the guarantee order book 62a, and the process is completed as indicated at step 218.

The guarantee order book 62a presently looks like this:

| FirmA Guarantee Buy Orders for FirmC | FirmA Guarantee Sell Orders for FirmC |
|---|---|
| Guarantee Order 1: Buy 5000 @ Bid, Show Size = 1000, Reserve Size = 4000 Guarantee Order 2: Buy 300 @ 15.00 | Guarantee Order 3: Sell 4000 @ Offer, Show Size = 900, Reserve Size = 3100 Guarantee Order 4: Sell 500 @ 30.00 ← |

The NBBO is currently $20.00 to $20.04. The Guarantee Orders' current prices and available sizes are as follows:

| FirmA Guarantee Buy Orders for FirmC | FirmA Guarantee Sell Orders for FirmC |
|---|---|
| Guarantee Order 1: Buy 1000 @ 20.00, Reserve Size = 4000 Guarantee Order 2: Buy 300 @ 15.00 | Guarantee Order 3: Sell 900 @ 20.04 Reserve Size = 3100 Guarantee Order 4: Sell 500 @ 30.00 |

Example 5

Guarantee Order is Not Permissioned (no DMM/OSF Pair in Permissions Table)

Continuing from the previous examples, Market Maker A 31*a* sends the following guarantee order for a different firm, Order Sending Firm B 26*c:*
→Order 22: Buy 2000 @ 19.99, Guarantee Order for FirmB At step 100, the process receives Guarantee Buy Order 22. Then at step 102, the process retrieves the DMM/OSF permissions table 60. At step 104, the process determines that Market Maker Firm A is not permissioned to received directed order flow from Order Sending Firm B. (Market Maker Firm A is only permissioned to receive directed order flow from FirmC and FirmD, as indicated in the first two rows of the DMM/OSF permissions table 60.) Accordingly, Firm A cannot submit guarantee orders for Firm B. Therefore, at step 122, incoming Guarantee Sell Order 22 is rejected back to Firm A, and the process is completed as indicated at step 124.

Example 6

Directed Order is not Permissioned (no DMM/OSF Pair in Permissions Table)

Continuing from the previous example, Order Sending Firm C 26*a* sends the following directed order for Market Maker Firm B 31*b:*
→Order 23: Buy 500 @ Market, Directed Order for FirmB Incoming Directed Buy Order 23 enters the process at step 300. Then, at step 302, the process sets the OSF parameter to "FirmC", the identifier of the order sending firm. Then, at step 304, the process retrieves the DMM/OSF permissions table 60.

At step 306, the process checks if incoming Directed Buy Order 23 explicitly specifies a Designated Market Maker. As it does, at step 308, the process sets the DMM parameter to "FirmB", the identifier specified on incoming Directed Buy Order 23. At step 310, the process looks in the DMM/OSF permissions table 60 to determine if Firm C is permissioned to direct orders to Firm B. The process determines that Firm C is not permissioned to direct orders to Firm B. (Firm C is only permissioned to direct orders to Firm A, as indicated in the first row of the DMM/OSF permissions table 60.) Therefore, at step 312, the directed order process is suspended and incoming Directed Buy Order 23 is converted to a non-directed buy order and is passed to the regular continuous order matching process instead. In the regular continuous order matching process, the buy order 23 executes against the marketplace in the same manner as any other non-directed market order.

Example 7

Directed Exchange-Restricted Buy Order is Permissioned, but Fails Trade Through Test Continuing from the previous example, Order Sending Firm D 26*b* sends the following directed order for Market Maker Firm A 31*a:*
→Order 24: Buy 1200 @ 20.02, Exchange-Restricted, Directed Order for FirmA Incoming Directed Buy Order 24 enters the process at step 300. Then, at step 302, the process sets the OSF parameter to "FirmD", the identifier of the order sending firm. At step 304, the process retrieves the DMM/OSF permissions table 60. At step 306, the process checks if incoming Directed Buy Order 24 explicitly specifies a Designated Market Maker. As it does, at step 308, the process sets the DMM parameter to "FirmA", the identifier specified on the order. At step 310, the process looks in the DMM/OSF permissions table 60 to determine if Firm D is permissioned to direct orders to Firm A. As Firm D is indeed permissioned to direct orders to Firm A, the process continues to step 320 where the side of incoming Directed Buy Order 24 is checked. As it is a buy order, at step 322, the "Determine if Directed Buy Order Can Trade" routine 42*a* is invoked, and the process continues to step 350 in FIG. 6A, At step 352, the process retrieves the virtual guarantee order book 62*b* that Firm A has allocated exclusively for crossing with Firm D. The guarantee order book 62*b* created for Firm D appears as follows in this example:

| FirmA Guarantee Buy Orders for FirmD | FirmA Guarantee Sell Orders for FirmD |
|---|---|
| Guarantee Order 5: Buy 900 @ 20.00 | Guarantee Order 8: Sell 700 @ 20.02 |
| Guarantee Order 6: Buy 1200 @ 19.99 | Guarantee Order 9: Sell 900 @ 20.03 |
| Guarantee Order 7: Buy 2000 @ 19.98 | Guarantee Order 10: Sell 1100 @ 20.04 |

At step 354, the process retrieves the best (lowest priced) resting guarantee sell order, Guarantee Sell Order 8 in this example. At step 356, then, the process retrieves the NBBO (19.99 to 20.00). At step 358, the process checks if Guarantee Sell Order 8's price is superior to the NBO. In this example, it is not superior. So, at step 364, the process sets the price of the pending cross (DirectedCrossPrice parameter) equal to $20.02, which is Guarantee Sell Order 8's price.

At step 366, the process then compares the price of incoming Directed Buy Order 24 ($20.02) to the DirectedCrossPrice parameter ($20.02), Because they are equal, the process proceeds to step 368 where the process compares the DirectedCrossPrice parameter ($20.02) to the NBB price ($19.99). As the DirectedCrossPrice parameter is higher than the NBB in this example, the directed cross is able to execute at this price without being adjusted because it would not trade through the NBB. The process continues to step 374, where it checks the order type of incoming Directed Buy Order 24.

As incoming Directed Buy Order 24 is an exchange-restricted order in this example, it cannot be routed off the posting market center by definition. The process, therefore, continues to step 376, where it retrieves the best away market offer price. As shown in the internal book below, the best away market offer is on Away Market A.

→The NBBO is 19.99 to 20.00 (500×300)

The internal book, which contains the ranked lists of all book orders and the BBO of each away market, looks like this:

| Internal Matching Engine Ranked Bids | Internal Matching Engine Ranked Offers |
|---|---|
| Book Order 150: Buy 200 @ 19.99 | Away Market A: Offer 300 @ 20.00 |
| Away Market A: Bid 300 @ 19.99 | Book Order 147: Sell 100 @ 20.01 |
| Away Market B: Bid 400 @ 19.98 | Book Order 153: Sell 200 @ 20.02 |
| Book Order 145: Buy 100 @ 19.97 | Away Market B: Offer 200 @ 20.02 |
| Away Market C: Bid 500 @ 19.97 | Away Market C: Offer 400 @ 20.02 |
| Book Order 141: Buy 200 @ 19.96 | Book Order 143: Sell 100 @ 20.03 |
| Book Order 151: Buy 600 @ 19.96 | Book Order 144: Sell 700 @ 20.03 |

At step 378, Away Market A's offer price ($20.00) is compared to the DirectedCrossPrice parameter ($20.02). As Away Market A's offer is lower, the process continues to step 380, to check the trade-through rules. According to the trade-through rules in this example, incoming Directed Buy Order 24 cannot trade through Away Market A, as this issue does not allow trade-throughs. As such, as an exchange-restricted order, incoming Directed Buy Order 24 can neither route to Away Market A nor can it trade through Away Market A's superior offer to match Guarantee Sell Order 8. Accordingly, the directed cross cannot execute.

As a result, incoming Directed Buy Order 24 is automatically converted to a non-directed buy order and is given to the regular continuous order matching process as indicated at step 386. In the regular continuous order matching process, Buy Order 24 cannot trade through Away Market A to match posted Sell Orders 147 or 153 because it is an exchange-restricted order. For the same reason, Buy Order 24 cannot be posted at the price of $20.02 as that would cause a crossed NBBO. Therefore, incoming Buy Order 24 is rejected back to order sending firm Firm D, and the process terminates at step 388.

It should be noted that incoming Buy Order 24, a directed exchange-restricted order, executes in exactly the same manner in this example as a directed IOC order would have. Neither order type can route off the posting market center 20 and, therefore, must execute at the NBBO unless the issue allows trade-throughs up to a specified price increment (e.g., a 3 cent exemption). The difference between the two order types is that an IOC order is always canceled if it does not execute, while an exchange-restricted order can be posted if it would not lock or cross the market.

Example 8

Directed Sweep Limit Buy Order interacts with the market and participates in the Directed Cross This example is similar to the previous one, with one important difference—instead of sending a directed exchange-restricted order, the order sending firm sends a directed sweep limit order. Even though the directed orders in both examples have the same size and price, they are processed differently because of the rules governing their underlying order types. Because a sweep limit order can interact fully with the marketplace, the directed order in this example is not rejected as above and is able to trade with the designated market maker after it has executed all superior trading interest first.

Specifically, Order Sending Firm D 26*b* sends the following directed order for Market Maker Firm A 31*a*:

→Order 25: Buy 1200 @ 20.02, Sweep Limit, Directed Order for FirmA

In this example, the guarantee order book 62*b* and the internal book are exactly the same as in the previous example. Specifically, the guarantee order book 62*b* looks like this:

| FirmA Guarantee Buy Orders for FirmD | FirmA Guarantee Sell Orders for FirmD |
|---|---|
| Guarantee Order 5: Buy 900 @ 20.00 | Guarantee Order 8: Sell 700 @ 20.02 |
| Guarantee Order 6: Buy 1200 @ 19.99 | Guarantee Order 9: Sell 900 @ 20.03 |
| Guarantee Order 7: Buy 2000 @ 19.98 | Guarantee Order 10: Sell 1100 @ 20.04 |

The internal book looks like this:

| Internal Matching Engine Ranked Bids | Internal Matching Engine Ranked Offers |
|---|---|
| Book Order 150: Buy 200 @ 19.99 | Away Market A: Offer 300 @ 20.00 |
| Away Market A: Bid 300 @ 19.99 | Book Order 147: Sell 100 @ 20.01 |
| Away Market B: Bid 400 @ 19.98 | Book Order 153: Sell 200 @ 20.02 |
| Book Order 145: Buy 100 @ 19.97 | Away Market B: Offer 200 @ 20.02 |
| Away Market C: Bid 500 @ 19.97 | Away Market C: Offer 400 @ 20.02 |
| Book Order 141: Buy 200 @ 19.96 | Book Order 143: Sell 100 @ 20.03 |
| Book Order 151: Buy 600 @ 19.96 | Book Order 144: Sell 700 @ 20.03 |

Incoming Directed Buy Order 25 enters the process at step 300 and continues through step 368, exactly as described for Directed Buy Order 24 in the prior example. For Directed Buy Order 25 in this example, the processing is different starting at step 374, where the process evaluates whether the order type has any routing restrictions. Whereas exchange-restricted orders cannot route off the posting market center 20, sweep limit orders can. A directed sweep limit order can route contemporaneously to all away markets whose quotes are marketable against the limit price. As Directed Buy Order 25 has no routing restrictions, the process continues to step 382, where the "Generate Matched Sell Instruction" routine 46*a* is invoked and then proceeds to step 530 in FIG. 9A.

At step 532, the size of incoming Directed Buy Order 25 (1200 shares) is compared to the size of the retrieved Guarantee Sell Order 8 (700 shares). As the size of incoming Directed Buy Order 25 is greater, at step 538, the process pulls (removes) Guarantee Sell Order 8 from the guarantee order book 62*b* for potential matching. The updated guarantee order book 62*b* then appears as follows:

| FirmA Guarantee Buy Orders for FirmD | FirmA Guarantee Sell Orders for FirmD |
|---|---|
| Guarantee Order 5: Buy 900 @ 20.00 | Guarantee Order 9: Sell 900 @ 20.03 |
| Guarantee Order 6: Buy 1200 @ 19.99 | Guarantee Order 10: Sell 1100 @ 20.04 |
| Guarantee Order 7: Buy 2000 @ 19.98 | |

As Guarantee Sell Order 8 is not a reserve order, the process continues to step 542, where it sets the MaxCrossQuantity to 700 shares, the size of Guarantee Sell Order 8. Then, at step 546, the process creates a logical link pairing incoming Directed Buy Order 25 and pulled Guarantee Sell Order 8. It does this by appending a 'match instruction' to incoming Directed Buy Order 25. The match instruction includes information required for the pending directed cross transaction, such as an identifier for Guarantee Sell Order 8, the MaxCrossQuantity parameter and the DirectedCrossPrice parameter. This is done to ensure that incoming Directed Buy Order 25 recognizes pulled Guarantee Sell Order 8 as the contra side of its directed cross when the Directed Buy Order 25 encounters the Guarantee Sell Order 8 in the internal book's ranked list of offers. The Directed Cross Order instruction looks like this in this example:

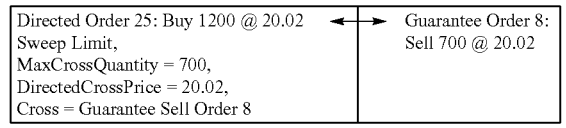

Then, at step 548, the process momentarily ranks pulled Guarantee Sell Order 8 in the internal book according to the price/time priority of the DirectedCrossPrice parameter. As previously described, guarantee orders are ranked behind all book orders superior or equal to the DirectedCrossPrice parameter and ahead of all away market quotes equal to the DirectedCrossPrice parameter. The internal book momentarily looks like this:

| Internal Matching Engine Ranked Bids | Internal Matching Engine Ranked Offers |
|---|---|
| Book Order 150: Buy 200 @ 19.99 | Away Market A: Offer 300 @ 20.00 |
| Away Market A: Bid 300 @ 19.99 | Book Order 147: Sell 100 @ 20.01 |
| Away Market B: Bid 400 @ 19.98 | Book Order 153: Sell 200 @ 20.02 |
| Book Order 145: Buy 100 @ 19.97 | Guarantee Order 8: Sell 700 @ 20.02 ← |
| Away Market C: Bid 500 @ 19.97 | Away Market B: Offer 200 @ 20.02 |
| Book Order 141: Buy 200 @ 19.96 | Away Market C: Offer 400 @ 20.02 |
| Book Order 151: Buy 600 @ 19.96 | Book Order 143: Sell 100 @ 20.03 |
|  | Book Order 144: Sell 700 @ 20.03 |

Then, at step 550, the process invokes the "Present Directed Buy to Internal Book" routine 48a and proceeds to step 560 in FIG. 10A.

At step 562, the process retrieves the best offer in the internal book, which in this example is from Away Market A. At step 566, the process checks if the retrieved offer is its paired Guarantee Sell Order. As the retrieved offer is an Away Market A quote and not Guarantee Sell Order 8, the process continues to step 568, where the process checks to see if the retrieved offer is a regular book sell order. As Away Market A's quote is not a sell order, the process continues to step 570, where it checks if incoming Directed Buy Order 25 can be routed or not.

As incoming Directed Buy Order 25 is a sweep limit order, it is eligible for routing. The process continues to step 572, where it checks if Away Market A is already "locked down" or if it is eligible for routing. As no quantity has previously been routed to Away Market A's present offer, the quote is not locked down and it is eligible for routing. At step 574, the process, therefore, routes 300 shares (the offer size) at $20.00 (the offer price) to Away Market A. The updated internal book momentarily looks like this:

| Internal Matching Engine Ranked Bids | Internal Matching Engine Ranked Offers |
|---|---|
| Book Order 150: Buy 200 @ 19.99 | Away Market A: Offer 300 @ 20.00 → Locked Down Quantity = 300 |
| Away Market A: Bid 300 @ 19.99 | Book Order 147: Sell 100 @ 20.01 |
| Away Market B: Bid 400 @ 19.98 | Book Order 153: Sell 200 @ 20.02 |
| Book Order 145: Buy 100 @ 19.97 | Guarantee Order 8: Sell 700 @ 20.02 |
| Away Market C: Bid 500 @ 19.97 | Away Market B: Offer 200 @ 20.02 |
| Book Order 141: Buy 200 @ 19.96 | Away Market C: Offer 400 @ 20.02 |
| Book Order 151: Buy 600 @ 19.96 | Book Order 143: Sell 100 @ 20.03 |
|  | Book Order 144: Sell 700 @ 20.03 |

At step 576, then, the process checks if incoming Directed Buy Order 25 still has shares available to trade. As it has 900 shares remaining, in step 578, the process retrieves the next best offer in the internal book. The next best offer is Sell Order 147. The process then returns to step 566, where it checks if the next best retrieved offer is paired Guarantee Sell Order 8. As it is not, the process continues to step 568, where it checks if the retrieved offer is a regular book sell order. Sell Order 147 is indeed a regular book order. The process, therefore, continues to step 580, where it matches 100 shares of incoming Directed Buy Order 25 with posted Sell Order 147 at $20.01 (i.e., Sell Order 147's sell price). Posted Sell Order 147 is completely filled and is removed from the internal book. The updated internal book momentarily looks like this:

| Internal Matching Engine Ranked Bids | Internal Matching Engine Ranked Offers |
|---|---|
| Book Order 150: Buy 200 @ 19.99 | Away Market A: Offer 300 @ 20.00 → Locked Down Quantity = 300 |
| Away Market A: Bid 300 @ 19.99 | Book Order 153: Sell 200 @ 20.02 |
| Away Market B: Bid 400 @ 19.98 | Guarantee Order 8: Sell 700 @ 20.02 |
| Book Order 145: Buy 100 @ 19.97 | Away Market B: Offer 200 @ 20.02 |
| Away Market C: Bid 500 @ 19.97 | Away Market C: Offer 400 @ 20.02 |
| Book Order 141: Buy 200 @ 19.96 | Book Order 143: Sell 100 @ 20.03 |
| Book Order 151: Buy 600 @ 19.96 | Book Order 144: Sell 700 @ 20.03 |

At step 576, the process checks if incoming Directed Buy Order 25 still has shares available to trade. As it has 800 shares remaining, the process at step 578 retrieves the next best offer in the internal book. The next best offer is Sell Order 153. The process returns to step 566, where it checks if this next best offer is paired Guarantee Sell Order 8. As it is not in this example, the process continues to step 568, where it checks if this offer is a regular book sell order. Sell Order 153 is a regular book order. The process continues to step 580, where it matches 200 shares of incoming Directed Buy Order 25 with posted Sell Order 153 at $20.02, which is Sell Order 153's price. Posted Sell Order 153 is completely filled and is removed from the internal book. The updated internal book momentarily looks like this:

| Internal Matching Engine Ranked Bids | Internal Matching Engine Ranked Offers |
|---|---|
| Book Order 150: Buy 200 @ 19.99 | Away Market A: Offer 300 @ 20.00 → Locked Down Quantity = 300 |
| Away Market A: Bid 300 @ 19.99 | Guarantee Order 8: Sell 700 @ 20.02 |
| Away Market B: Bid 400 @ 19.98 | Away Market B: Offer 200 @ 20.02 |
| Book Order 145: Buy 100 @ 19.97 | Away Market C: Offer 400 @ 20.02 |
| Away Market C: Bid 500 @ 19.97 | Book Order 143: Sell 100 @ 20.03 |
| Book Order 141: Buy 200 @ 19.96 | Book Order 144: Sell 700 @ 20.03 |
| Book Order 151: Buy 600 @ 19.96 | |

Again at step 576, the process checks if incoming Directed Buy Order 25 still has shares available to trade. It has 600 shares remaining in this example. Therefore, at 578, the process retrieves the next best offer in the internal book. The next best offer is Guarantee Sell Order 8. The process returns to step 566, where it checks if this next best retrieved offer is paired Guarantee Sell Order 8. As it is in this example, the process continues to step 564, where the process crosses the remaining 600 shares of incoming Directed Buy Order 25 with pulled Guarantee Sell Order 8 at $20.02, the DirectedCrossPrice parameter. Although the orders were eligible to cross up to the MaxCrossQuantity of 700 shares, incoming Directed Buy Order 25 only had 600 shares remaining to match at this point in the process.

At step 582, the process checks if pulled Guarantee Sell Order 8 is fully traded. As the order still has 100 unmatched shares, at step 584, the process removes Guarantee Sell Order 8 from the internal book's ranked list of offers. The process returns the unmatched shares of Guarantee Sell Order 8 to the guarantee order book 62b, where it is eligible to match with subsequent incoming directed buy orders. The process is then terminated, as indicated at step 590. The updated guarantee order book 62b looks like this:

| FirmA Guarantee Buy Orders for FirmD | FirmA Guarantee Sell Orders for FirmD |
|---|---|
| Guarantee Order 5: Buy 900 @ 20.00 | Guarantee Order 8: Sell 100 @ 20.02 ← |
| Guarantee Order 6: Buy 1200 @ 19.99 | Guarantee Order 9: Sell 900 @ 20.03 |
| Guarantee Order 7: Buy 2000 @ 19.98 | Guarantee Order 10: Sell 1100 @ 20.04 |

Once the directed order process terminates, any subsequent processing occurs in the regular continuous order matching process. In this example, 15 seconds later, Away Market A fills 100 shares of the 300 shares that were routed to it on behalf of underlying Directed Buy Order 25, but declines 200 shares and fades its offer to 500 at $20.01. As this is a new offer, the continuous order matching process unlocks the quote. The updated internal book looks like this:

| Internal Matching Engine Ranked Bids | Internal Matching Engine Ranked Offers |
|---|---|
| Book Order 150: Buy 200 @ 19.99 | Away Market A: Offer 500 @ 20.01 ← |
| Away Market A: Bid 300 @ 19.99 | Away Market B: Offer 200 @ 20.02 |
| Away Market B: Bid 400 @ 19.98 | Away Market C: Offer 400 @ 20.02 |
| Book Order 145: Buy 100 @ 19.97 | Book Order 143: Sell 100 @ 20.03 |
| Away Market C: Bid 500 @ 19.97 | Book Order 144: Sell 700 @ 20.03 |
| Book Order 141: Buy 200 @ 19.96 | |
| Book Order 151: Buy 600 @ 19.96 | |

The 200 declined shares are returned to Buy Order 25. As the order is no longer a directed order, it is processed as if it were a regular sweep limit order. Specifically, Buy Order 25 is no longer allowed to cross any portion of the declined shares in the directed order process, which has terminated. The continuous order matching process routes the 200 declined shares to Away Market A at its quote price of $20.01. Away Market A fills the routed shares, and the process is complete.

It should be noted that incoming Buy Order 25, a directed sweep limit order, would execute in exactly the same manner in this example if it were a directed sweep market order instead. Both order types can route contemporaneously to multiple away markets at multiple price levels, and therefore have no routing restrictions. The only difference between the two order types in this embodiment is that a directed sweep limit order has a limit price that caps how many price levels it can execute, whereas a directed sweep market order has no such cap.

Example 9

Directed Inside Limit Buy Order Cannot Participate in Directed Cross Off the NBO This example is similar to the previous one, except that instead of sending a directed sweep limit order, the order, sending firm sends a directed inside limit order. The difference between a sweep limit order and an inside limit order is that an inside limit order must execute at the NBBO. As a result, a directed inside limit order can participate in a directed cross only if the directed cross is priced at the NBBO or better.

Specifically, Order Sending Firm D 26b sends the following directed inside limit order to Market Maker Firm A 31a:
→Order 26: Buy 1200 @ 20.02, Inside Limit, Directed Order for FirmA In this example, the guarantee order book 62b and the internal book are the same as at the start of the previous example. The guarantee order book 62b looks like this:

| FirmA Guarantee Buy Orders for FirmD | FirmA Guarantee Sell Orders for FirmD |
|---|---|
| Guarantee Order 5: Buy 900 @ 20.00 | Guarantee Order 8: Sell 700 @ 20.02 |
| Guarantee Order 6: Buy 1200 @ 19.99 | Guarantee Order 9: Sell 900 @ 20.03 |
| Guarantee Order 7: Buy 2000 @ 19.98 | Guarantee Order 10: Sell 1100 @ 20.04 |

The internal book looks like this:

| Internal Matching Engine Ranked Bids | Internal Matching Engine Ranked Offers |
|---|---|
| Book Order 150: Buy 200 @ 19.99 | Away Market A: Offer 300 @ 20.00 |
| Away Market A: Bid 300 @ 19.99 | Book Order 147: Sell 100 @ 20.01 |
| Away Market B: Bid 400 @ 19.98 | Book Order 153: Sell 200 @ 20.02 |
| Book Order 145: Buy 100 @ 19.97 | Away Market B: Offer 200 @ 20.02 |
| Away Market C: Bid 500 @ 19.97 | Away Market C: Offer 400 @ 20.02 |
| Book Order 141: Buy 200 @ 19.96 | Book Order 143: Sell 100 @ 20.03 |
| Book Order 151: Buy 600 @ 19.96 | Book Order 144: Sell 700 @ 20.03 |

As incoming Directed Buy Order 26 has the same price and size as Directed Buy Order 25 from the previous example, incoming Directed Buy Order 26 enters the directed order process at step 300 and continues through step 368 in the same manner as described above for Directed Buy Order 25. However, at step 374, when the process checks if the directed order type has any routing restrictions, the results are different. As an inside limit order does have routing restrictions (i.e., it can only route to away markets at the NBBO), the process continues to step 376 and retrieves the price of the best away market offer.

In this example, Away Market A has the best offer. Then, at step 378, the process compares Away Market A's offer price ($20.00) to the DirectedCrossPrice parameter ($20.02). As Away Market A's offer price is lower, the process continues to step 380, where the matching rules for inside limit orders are evaluated to determine if incoming Directed Buy Order 26 can route to Away Market A or not. As Away Market A is at the NBO, incoming Directed Buy Order 26 can indeed route to it. However, inside limit orders can only execute at the NBBO (or better) by definition in this embodiment. Accordingly, incoming Buy Order 26 cannot execute against Guarantee Sell Order 8 at the DirectedCrossPrice parameter ($20.02), as that price is inferior to the NBO ($20.00). Such an execution would not cause a tradethrough violation, but it would violate the rules of the underlying inside limit order type.

As incoming Directed Buy Order 26 cannot execute against Guarantee Sell Order 8, the process continues to step 386, where it automatically converts incoming Directed Buy Order 26 to a non-directed order and passes it to the regular continuous order matching process. The directed order process is terminated, and incoming Buy Order 26 is processed as a regular inside limit order. Accordingly, it routes 300 shares to Away Market A at $20.00, reprices itself to $20.00, and posts its remaining 900 shares at $20.00, locking the market.

It should be noted that incoming Buy Order 26, a directed inside limit order, would execute in the same manner in this example if it were a directed inside market order instead, except that after routing to Away Market A, an inside market order would neither be repriced nor posted. Both order types can only execute at the NBBO. The difference between the two order types in this embodiment is that a directed inside limit order has a limit price cap that causes it to post (and reprice, if necessary) when it is no longer marketable, whereas a directed inside market order continues to execute at the NBBO until it is finally exhausted.

Example 10

Directed IOC Buy Order Matches Book Orders Off the NBO and Participates in the Directed Cross This example is similar to the preceding example, except that the order sending firm sends a directed IOC buy order instead of a directed inside limit buy order. This example illustrates what happens if issue XYZ has a 3-cent trade through exemption in effect for IOC orders and exchange-restricted orders. Accordingly, an incoming directed IOC buy order would be allowed to cross a guarantee order if its price is not more than 3 cents worse than the NBO.

Order Sending Firm D 26b sends the following directed IOC order to Market Maker Firm A 31a:

→Order 27: Buy 1200 @ 20.02, IOC, Directed Order for FirmA

In this example, the guarantee order book 62b and the internal book are the same as at the start of the previous examples. The guarantee order book 62b looks like this:

| FirmA Guarantee Buy Orders for FirmD | FirmA Guarantee Sell Orders for FirmD |
|---|---|
| Guarantee Order 5: Buy 900 @ 20.00 | Guarantee Order 8: Sell 700 @ 20.02 |
| Guarantee Order 6: Buy 1200 @ 19.99 | Guarantee Order 9: Sell 900 @ 20.03 |
| Guarantee Order 7: Buy 2000 @ 19.98 | Guarantee Order 10: Sell 1100 @ 20.04 |

The internal book looks like this:

| Internal Matching Engine Ranked Bids | Internal Matching Engine Ranked Offers |
|---|---|
| Book Order 150: Buy 200 @ 19.99 | Away Market A: Offer 300 @ 20.00 |
| Away Market A: Bid 300 @ 19.99 | Book Order 147: Sell 100 @ 20.01 |
| Away Market B: Bid 400 @ 19.98 | Book Order 153: Sell 200 @ 20.02 |
| Book Order 145: Buy 100 @ 19.97 | Away Market B: Offer 200 @ 20.02 |
| Away Market C: Bid 500 @ 19.97 | Away Market C: Offer 400 @ 20.02 |
| Book Order 141: Buy 200 @ 19.96 | Book Order 143: Sell 100 @ 20.03 |
| Book Order 151: Buy 600 @ 19.96 | Book Order 144: Sell 700 @ 20.03 |

Incoming Directed IOC Buy Order 27 enters the directed order process at step 300 and continues through step 378 as described for Directed Inside Limit Buy Order 26 in the previous example. At step 380, the processing for this example diverges from the previous example. Whereas Directed Inside Limit Buy Order 26 was unable to match Guaranteed Sell Order 8 in Example 9 because the DirectedCrossPrice parameter was not at the NBO, Directed IOC Buy Order 27 is allowed to match. This is because this issue allows IOC orders to trade through the NBO by up to 3 cents. As the DirectedCrossPrice parameter ($20.02) is two cents off the NBO ($20.00), the directed cross can execute in this example. Accordingly, the process continues to step 382, where the "Generate Matched Sell Instruction" routine 46a is invoked and proceeds to step 530 in FIG. 9A.

At step 532, the size of incoming Directed Buy Order 27 (1200 shares) is compared to the size of Guarantee Sell Order 8 (700 shares). As the size of incoming Directed Buy Order 27 is greater, at step 538, the process pulls (removes) Guarantee Sell Order 8 from the guarantee order book 62b. As Guarantee Sell Order 8 is not a reserve order, the process continues to step 542 where it sets the MaxCrossQuantity parameter to 700 shares, the size of Guarantee Sell Order 8. The updated guarantee order book 62b looks like this after Guarantee Sell Order 8 is pulled:

| FirmA Guarantee Buy Orders for FirmD | FirmA Guarantee Sell Orders for FirmD |
|---|---|
| Guarantee Order 5: Buy 900 @ 20.00 | Guarantee Order 9: Sell 900 @ 20.03 |
| Guarantee Order 6: Buy 1200 @ 19.99 | Guarantee Order 10: Sell 1100 @ 20.04 |
| Guarantee Order 7: Buy 2000 @ 19.98 | |

At step 546, the process creates a logical link pairing incoming Directed Buy Order 27 and pulled Guarantee Sell Order 8. It does this by appending a 'match instruction' to incoming Directed Buy Order 27. The match instruction includes information required for the pending directed cross, such as an identifier for Guarantee Sell Order 8, the MaxCrossQuantity parameter and the DirectedCrossPrice parameter. This is done to ensure that incoming Directed Buy Order 27 recognizes Guarantee Sell Order 8 as the contra side of its directed cross when it encounters Guarantee Sell Order 8 in the internal book's ranked list of offers. The directed cross order instruction looks like this:

| Directed Order 27: Buy 1200 @ 20.02 IOC, MaxCrossQuantity = 700, DirectedCrossPrice = 20.02, Cross = Guarantee Sell Order 8 | ←→ | Guarantee Order 8: Sell 700 @ 20.02 |
|---|---|---|

Then, at step 548, the process momentarily ranks pulled Guarantee Sell Order 8 in the internal book according to price/time priority of the DirectedCrossPrice parameter. The updated internal book momentarily looks like this:

| Internal Matching Engine Ranked Bids | Internal Matching Engine Ranked Offers |
|---|---|
| Book Order 150: Buy 200 @ 19.99 | Away Market A: Offer 300 @ 20.00 |
| Away Market A: Bid 300 @ 19.99 | Book Order 147: Sell 100 @ 20.01 |
| Away Market B: Bid 400 @ 19.98 | Book Order 153: Sell 200 @ 20.02 |
| Book Order 145: Buy 100 @ 19.97 | Guarantee Order 8: Sell 700 @ 20.02 ← |
| Away Market C: Bid 500 @ 19.97 | Away Market B: Offer 200 @ 20.02 |
| Book Order 141: Buy 200 @ 19.96 | Away Market C: Offer 400 @ 20.02 |
| Book Order 151: Buy 600 @ 19.96 | Book Order 143: Sell 100 @ 20.03 |
| | Book Order 144: Sell 700 @ 20.03 |

From this point onward, steps 550 through step 568 are processed for Directed IOC Buy Order 27 exactly as they were for Directed Sweep Limit Buy Order 25 in Example 8. However, at step 570, the processing changes. Whereas sweep limit orders are eligible to route, IOC orders can never route by definition. Therefore, in step 570, the process continues to step 578 (instead of routing to Away Market A's offer in steps 572 and 574), where it retrieves the next best offer, posted Sell Order 147.

The process returns to step 566, where it checks if this next best offer is paired Guarantee Sell Order 8. As it is not in this example, the process continues to step 568, where it checks if the retrieved offer is a regular book sell order. Sell Order 147 is a regular book order. The process, therefore, continues to step 580, where the process matches 100 shares of incoming Directed Buy Order 27 with posted Sell Order 147 at $20.01, the sell order's price. Posted Sell Order 147 is completely filled and is removed from the internal book. The updated internal book momentarily looks like this:

| Internal Matching Engine Ranked Bids | Internal Matching Engine Ranked Offers |
| --- | --- |
| Book Order 150: Buy 200 @ 19.99 | Away Market A: Offer 300 @ 20.00 |
| Away Market A: Bid 300 @ 19.99 | Book Order 153: Sell 200 @ 20.02 |
| Away Market B: Bid 400 @ 19.98 | Guarantee Order 8: Sell 700 @ 20.02 |
| Book Order 145: Buy 100 @ 19.97 | Away Market B: Offer 200 @ 20.02 |
| Away Market C: Bid 500 @ 19.97 | Away Market C: Offer 400 @ 20.02 |
| Book Order 141: Buy 200 @ 19.96 | Book Order 143: Sell 100 @ 20.03 |
| Book Order 151: Buy 600 @ 19.96 | Book Order 144: Sell 700 @ 20.03 |

At step 576, the process checks if incoming Directed Buy Order 27 still has shares available to trade. As it has 1100 shares remaining, at step 578, the process retrieves the next best offer, which is posted Sell Order 153 in this example.

The process then returns to step 566, where it checks if this next best offer is paired Guarantee Sell Order 8. It is not. Therefore, the process continues to step 568, where it checks if the retrieved offer is a regular book sell order. Sell Order 153 is a regular book order. The process, therefore, continues to step 580, where it matches 200 shares of incoming Directed Buy Order 27 with posted Sell Order 153 at $20.02, the Sell order's price. Posted Sell Order 153 is completely filled and is removed from the internal book. The undated internal book momentarily looks like this:

| Internal Matching Engine Ranked Bids | Internal Matching Engine Ranked Offers |
| --- | --- |
| Book Order 150: Buy 200 @ 19.99 | Away Market A: Offer 300 @ 20.00 |
| Away Market A: Bid 300 @ 19.99 | Guarantee Order 8: Sell 700 @ 20.02 |
| Away Market B: Bid 400 @ 19.98 | Away Market B: Offer 200 @ 20.02 |
| Book Order 145: Buy 100 @ 19.97 | Away Market C: Offer 400 @ 20.02 |
| Away Market C: Bid 500 @ 19.97 | Book Order 143: Sell 100 @ 20.03 |
| Book Order 141: Buy 200 @ 19.96 | Book Order 144: Sell 700 @ 20.03 |
| Book Order 151: Buy 600 @ 19.96 | |

At step 576, the process checks if incoming Directed Buy Order 27 still has shares available to trade. In this example, it has 900 shares remaining. Therefore, at step 578, the process retrieves the next best offer in the internal book.

The next best Offer is Guarantee Sell Order 8. The process returns to step 566 where it checks if this next best offer is paired Guarantee Sell Order 8. As it is in this example, the process continues to step 564, where it crosses 700 shares of incoming Directed Buy Order 27, the MaxCrossQuantity parameter, with pulled Guarantee Sell Order 8 at $20.02, the DirectedCrossPrice parameter. The updated internal book looks like this:

| Internal Matching Engine Ranked Bids | Internal Matching Engine Ranked Offers |
| --- | --- |
| Book Order 150: Buy 200 @ 19.99 | Away Market A: Offer 300 @ 20.00 |
| Away Market A: Bid 300 @ 19.99 | Away Market B: Offer 200 @ 20.02 |
| Away Market B: Bid 400 @ 19.98 | Away Market C: Offer 400 @ 20.02 |
| Book Order 145: Buy 100 @ 19.97 | Book Order 143: Sell 100 @ 20.03 |
| Away Market C: Bid 500 @ 19.97 | Book Order 144: Sell 700 @ 20.03 |
| Book Order 141: Buy 200 @ 19.96 | |
| Book Order 151: Buy 600 @ 19.96 | |

At step 582, the process checks if pulled Guarantee Sell Order 8 is fully traded. As it is, the process continues to step 586, where it checks if incoming Directed Buy Order 27 still has any quantity remaining. As incoming Directed Buy Order 27 still has 200 shares, the process continues to step 588, where it automatically converts the remaining portion of incoming Directed Buy Order 27 to a non-directed buy order. As there are no more book orders to match and non-directed IOC Buy Order 27 cannot route, the process cancels the remainder of the order. The process is terminated as indicated at step 590.

It should be noted that incoming Buy Order 27, a directed IOC order, would execute in the same manner in this example if it were a directed exchange-restricted order instead. Neither order type can route off the posting market center, but both order types can execute with orders priced up to 3 cents off the NBO in this issue. The difference between the two order types is that an IOC order is always canceled when it can no longer execute, whereas an exchange-restricted order is posted unless it would lock or cross the market.

Example 11

Directed Exchange-Restricted Sell Order Matches posted Buy Orders and Participates in the Directed Cross In the previous examples, Firm D 26b directed buy orders to Firm A 31a. In the examples that follow, Firm C 26a is directing sell orders to Firm A 31a. The DMM/OSF permissions table 60 is the same as in the previous examples.

Order Sending Firm C 26a sends the following directed order to Market Maker Firm A 31a:

→Order 28: Sell 900 @ 19.99, Exchange-Restricted, Directed Order for FirmA

The incoming directed sell order enters the directed order process at step 300. At step 302, the process sets the OSF parameter to "FirmC", the identifier of the order sending firm. At step 304, the process retrieves the DMM/OSF permissions table data. At step 306, the process checks if the incoming order explicitly specifies a Designated Market Maker. As it does in this example, at step 308, the process sets the DMM parameter to "FirmA", the identifier specified on the order. Then, at step 310, the process checks the DMM/OSF permissions table 60 to determine if Firm C is permissioned to direct orders to Firm A.

As Firm C is permissioned to direct orders to Firm A in this example, the process continues to step 320 where the order type (e.g., buy or sell) of the incoming order is determined. As the incoming order is a sell order, at step 326, the process invokes the "Determine if Directed Sell Order Can Trade" routine 42b, which directs the process to step 450 (FIG. 6B).

At step 452, the process retrieves the guarantee order book 62a that Firm A created for crossing with Firm C. As explained above, the guarantee order book 62a that Firm A created for crossing with Firm C is different than the guarantee order book 62b that Firm A created for crossing with Firm D.

→The NBBO is 19.99 to 20.00 (500×300).

The guarantee order book 62a for Firm C looks like this:

| FirmA Guarantee Buy Orders for FirmC | FirmA Guarantee Sell Orders for FirmC |
|---|---|
| Guarantee Order 1: Buy 1000 @ 19.99 (Bid) Reserve Size = 4000 Guarantee Order 2: Buy 300 @ 15.00 | Guarantee Order 3: Sell 900 @ 20.00 (Offer) Reserve Size = 3100 Guarantee Order 4: Sell 500 @ 30.00 |

At step 454, the process retrieves the best guarantee buy order from the guarantee order book 62a, which is Order 1. At step 456, the process retrieves the NBBO ($19.99 to $20.00). Then at step 458, the process checks if Guarantee Buy Order 1's price ($19.99) is higher than the NBB ($19.99). As the prices are equal in this example, the process continues to step 464, where it sets the DirectedCrossPrice parameter equal to $19.99, which is Guarantee Buy Order 1's price.

Then at step 466, the process compares the price of the incoming Directed Sell Order 28 ($19.99) to the DirectedCrossPrice parameter ($19.99). As the prices are equal, the process continues to step 468, where the process compares the DirectedCrossPrice parameter ($19.99) to the NBO ($20.00). As the DirectedCrossPrice parameter is lower than the NBO, the directed cross can execute at this price without being adjusted because it will not trade through the best offer.

The process then continues to step 474, where it checks the order type for the incoming directed order. As the directed order in this example is an exchange-restricted order, it cannot be routed off the posting market center, and therefore has routing restrictions. The process, as a result, continues to step 476, where it retrieves the best away market bid price. As shown in the internal book below, the best away market bid price is Away Market A's Bid at $19.99. The internal book appears as follows (the same as at the start of the previous examples):

| Internal Matching Engine Ranked Bids | Internal Matching Engine Ranked Offers |
|---|---|
| Book Order 150: Buy 200 @ 19.99 | Away Market A: Offer 300 @ 20.00 |
| Away Market A: Bid 300 @ 19.99 | Book Order 147: Sell 100 @ 20.01 |
| Away Market B: Bid 400 @ 19.98 | Book Order 153: Sell 200 @ 20.02 |
| Book Order 145: Buy 100 @ 19.97 | Away Market B: Offer 200 @ 20.02 |
| Away Market C: Bid 500 @ 19.97 | Away Market C: Offer 400 @ 20.02 |
| Book Order 141: Buy 200 @ 19.96 | Book Order 143: Sell 100 @ 20.03 |
| Book Order 151: Buy 600 @ 19.96 | Book Order 144: Sell 700 @ 20.03 |

At step 478, the best Away Market Bid ($19.99) is compared to the DirectedCrossPrice parameter ($19.99). The prices in this example are equal. This means Guarantee Buy Order 1 is superior to Away Market A's Bid, as guarantee orders have priority over away markets at the same price. The process, therefore, continues to step 482, where the process invokes the "Generate Matched Buy Instruction" routine 46b, and the process continues to step 630 (FIG. 9B).

At step 632, the size of incoming Directed Sell Order 28 (900 shares) is compared to the size of the Guarantee Buy Order 1 (1000 shares, the Show Size). As the size of incoming Directed Sell Order 28 is lower, 900 shares of Guarantee Buy Order 1 (the quantity required to match the Directed Sell) are pulled from the guarantee order book 62a at step 634, reducing Guarantee Buy Order 1's Show Size to 100 shares. The updated guarantee order book 62a looks like this:

| FirmA Guarantee Buy Orders for FirmC | FirmA Guarantee Sell Orders for FirmC |
|---|---|
| Guarantee Order 1: Buy 100 @ Bid, ← Reserve Size = 4000 Guarantee Order 2: Buy 300 @ 15.00 | Guarantee Order 3: Sell 900 @ Offer, Reserve Size = 3100 Guarantee Order 4: Sell 500 @ 30.00 |

The process continues to step 636, where it sets the MaxCrossQuantity parameter to 900 shares, the size of incoming Directed Sell Order 28. At step 646, the process creates a logical link between incoming Directed Sell Order 28 and Guarantee Buy Order 1. The process does this by appending a 'match instruction' to incoming Directed Sell Order 28. The match instruction includes information required for the pending directed cross, such as an identifier for Guarantee Buy Order 1, the MaxCrossQuantity parameter, and the DirectedCrossPrice parameter. This is done to ensure that incoming Directed Sell Order 28 recognizes Guarantee Buy Order 1 as the contra side of its directed cross when Directed Sell Order 28 encounters Guarantee Buy Order 1 in the internal book ranked list. The directed cross order instruction looks like this:

| Guarantee Order 1: Buy 900 @ 19.99 | Directed Order 28: Sell 900 @ 19.99 |
|---|---|
| | Exchange-Restricted, |
| | MaxCrossQuantity = 900, |
| | DirectedCrossPrice = 19.99, |
| | Cross = Guarantee Buy Order 1 |

At step 648, the process momentarily ranks Guarantee Buy Order 1 in the internal book according to the price/time priority of the DirectedCrossPrice parameter. As previously described, guarantee orders are ranked behind all book orders at or better than the DirectedCrossPrice parameter and ahead of all away market quotes equal to the DirectedCrossPrice parameter. The internal book momentarily looks like this:

| Internal Matching Engine Ranked Bids | Internal Matching Engine Ranked Offers |
|---|---|
| Book Order 150: Buy 200 @ 19.99 | Away Market A: Offer 300 @ 20.00 |
| Guarantee Order 1: Buy 900 @ 19.99 ← | Book Order 147: Sell 100 @ 20.01 |
| Away Market A: Bid 300 @ 19.99 | Book Order 153: Sell 200 @ 20.02 |
| Away Market B: Bid 400 @ 19.98 | Away Market B: Offer 200 @ 20.02 |
| Book Order 145: Buy 100 @ 19.97 | Away Market C: Offer 400 @ 20.02 |
| Away Market C: Bid 500 @ 19.97 | Book Order 143: Sell 100 @ 20.03 |
| Book Order 141: Buy 200 @ 19.96 | Book Order 144: Sell 700 @ 20.03 |
| Book Order 151: Buy 600 @ 19.96 | |

At step 650, the process invokes the "Present Directed Sell to Internal Book" routine 48b, and the process then continues to step 660 (FIG. 10B).

At step 662, the process retrieves the best bid in the internal book, which in this example is posted Buy Order 150. At step 666, the process checks if the best bid is the guarantee buy order. As this bid is not the guarantee buy order, the process continues to step 668, where the process checks to see if this bid is a regular book buy order. Book Order 150 is a regular buy order. As such, at step 680, the process matches 200 shares of Directed Sell Order 28 with posted Buy Order 150 at $19.99. Posted Buy Order 150 is completely filled and removed from the internal book. The internal book momentarily looks like this:

| Internal Matching Engine Ranked Bids | Internal Matching Engine Ranked Offers |
|---|---|
| Guarantee Order 1: Buy 900 @ 19.99 | Away Market A: Offer 300 @ 20.00 |
| Away Market A: Bid 300 @ 19.99 | Book Order 147: Sell 100 @ 20.01 |
| Away Market B: Bid 400 @ 19.98 | Book Order 153: Sell 200 @ 20.02 |
| Book Order 145: Buy 100 @ 19.97 | Away Market B: Offer 200 @ 20.02 |
| Away Market C: Bid 500 @ 19.97 | Away Market C: Offer 400 @ 20.02 |
| Book Order 141: Buy 200 @ 19.96 | Book Order 143: Sell 100 @ 20.03 |
| Book Order 151: Buy 600 @ 19.96 | Book Order 144: Sell 700 @ 20.03 |

At step 676, the process checks if incoming Directed Sell Order 28 still has shares available to trade. As Directed Sell Order 28 has 700 shares remaining, at step 678, the process retrieves the next best bid in the internal book. The next best bid is Guarantee Buy Order 1. The process then returns to step 666, where it determines that this is a guarantee buy order and that according to the match instructions appended on Directed Sell Order 28, this is the correct order to cross. Therefore, at step 664, the process executes the directed cross. The process crosses the remaining 700 shares of incoming Directed Sell Order 28 with Guarantee Buy Order 1 at $19.99, the DirectedCrossPrice parameter.

At step 682, the process checks if Guarantee Buy Order 1 is fully traded. As Guarantee Buy Order 1 still has 200 unmatched shares in this example, the process, at step 684 pulls Guarantee Buy Order 1 from the internal book ranked list and returns the unmatched shares to the guarantee order book 62a. The process then terminates as indicated at step 690. The updated guarantee order book 62a looks like this:

| FirmA Guarantee Buy Orders for FirmC | FirmA Guarantee Sell Orders for FirmC |
|---|---|
| Guarantee Order 1: Buy 200 @ Bid, ← Reserve Size = 4000 | Guarantee Order 3: Sell 900 @ Offer, Reserve Size = 3100 |
| Guarantee Order 2: Buy 300 @ 15.00 | Guarantee Order 4: Sell 500 @ 30.00 |

The updated internal book looks like this:

| Internal Matching Engine Ranked Bids | Internal Matching Engine Ranked Offers |
|---|---|
| Away Market A: Bid 300 @ 19.99 | Away Market A: Offer 300 @ 20.00 |
| Away Market B: Bid 400 @ 19.98 | Book Order 147: Sell 100 @ 20.01 |
| Book Order 145: Buy 100 @ 19.97 | Book Order 153: Sell 200 @ 20.02 |
| Away Market C: Bid 500 @ 19.97 | Away Market B: Offer 200 @ 20.02 |
| Book Order 141: Buy 200 @ 19.96 | Away Market C: Offer 400 @ 20.02 |
| Book Order 151: Buy 600 @ 19.96 | Book Order 143: Sell 100 @ 20.03 |
| | Book Order 144: Sell 700 @ 20.03 |

If Firm C had sent a different type of directed order to Firm A, the processing in this embodiment would be the same as long as the directed sell order price is marketable ($19.99 or lower). In each case, the incoming directed sell order would have matched posted Buy Order 150 and would then have crossed Guarantee Buy Order 1. For example, if Firm C had sent any of the following orders instead of Exchange-Restricted Sell Order 28, each order would have traded exactly as Exchange-Restricted Sell Order 28 did:

→Order 29: Sell 900 @ 19.99, Sweep Limit, Directed Order for Firm A

→Order 29a: Sell 900 @ 19.99, Inside Limit, Directed Order for Firm A

→Order 30: Sell 900 @ Market, Sweep Market, Directed Order for Firm A

→Order 30a: Sell 900 @ Market, Inside Market, Directed Order for Firm A

→Order 31: Sell 900 @ 19.99, IOC, Directed Order for Firm A

Example 12

Directed Inside Market Sell Order Crosses Cleanly in a Locked Market

In this example, Away Market B changes its bid to $20.00, locking Away Market A's Offer. The NBBO is $20.00 to $20.00 (400×300). The market is locked. The internal book looks like this:

| Internal Matching Engine Ranked Bids | Internal Matching Engine Ranked Offers |
|---|---|
| Away Market B: Bid 400 @ 20.00 ← | Away Market A: Offer 300 @ 20.00 |
| Book Order 150: Buy 200 @ 19.99 | Book Order 147: Sell 100 @ 20.01 |
| Away Market A: Bid 300 @ 19.99 | Book Order 153: Sell 200 @ 20.02 |
| Book Order 145: Buy 100 @ 19.97 | Away Market B: Offer 200 @ 20.02 |
| Away Market C: Bid 500 @ 19.97 | Away Market C: Offer 400 @ 20.02 |
| Book Order 141: Buy 200 @ 19.96 | Book Order 143: Sell 100 @ 20.03 |
| Book Order 151: Buy 600 @ 19.96 | Book Order 144: Sell 700 @ 20.03 |

When the process detects a new NBB, it must determine if any primary peg guarantee buy orders must be repriced. The order matching engine 21 invokes the "New NBB Updates Pegged Guarantee Buy Orders" routine 54a which initiates at step 130 (FIG. 4A). At step 132, the process retrieves the NBBO. Then, at step 134, the process checks if the NBBO ($20.00 to $20.00) is crossed. As the NBBO is locked but not crossed in this example, the process continues to step 136, where it retrieves the guarantee order books 62a-62d for this issue. As illustrated in FIG. 2, in this example, there are four guarantee order books 62a-62d for issue XYZ, three of which 62a, 62c-62d include primary peg buy orders that are eligible to be repriced by the new NBB.

In an alternate embodiment of the disclosure, the process depicted in FIG. 4A is only invoked on an as needed basis, e.g., not every time the NBB reprices, but rather only when an incoming directed sell order is about to be paired with the best resting guarantee buy order, and the current prices of the resting guarantee buy orders must be determined first. In this alternate embodiment, only the guarantee order book that is being evaluated against the incoming directed order is retrieved and updated. The alternate embodiment is shown and discussed in the examples that follow.

In this example, the guarantee order book 62a allocated by Firm A 31a for Firm C 26a is retrieved at step 136.

(Although Guarantee Order 1 was partially executed in prior Example 11, it is restored to its full original size in this example.):

| FirmA Guarantee Buy Orders for FirmC | FirmA Guarantee Sell Orders for FirmC |
|---|---|
| Guarantee Order 1: Buy 1000 @ Bid, Reserve Size = 4000 | Guarantee Order 3: Sell 900 @ Offer, Reserve Size = 3100 |
| Guarantee Order 2: Buy 300 @ 15.00 | Guarantee Order 4: Sell 500 @ 30.00 |

Then at step 138, the process checks if there are any primary peg guarantee buy orders in the guarantee order book 62*a*. As Order 1 is a primary peg guarantee buy order, the process continues to step 142, where it retrieves Guarantee Buy Order 1.

At step 144, the process initially sets Guarantee Buy Order 1's price equal to $20.00, the NBB. At step 146, the process then checks if Guarantee Buy Order 1 includes a discretionary offset. In this example, it does not. The process, therefore, continues to step 150, where it checks if Guarantee Buy Order 1 includes a peg offset. It does not, so the process continues to step 154, where it checks if Guarantee Buy Order 1 includes a peg limit. As it does not, the process continues to step 160, where it reinserts Guarantee Buy Order 1 in the guarantee order book 62*a* at its new price/time priority. At step 162, the process checks if there are any additional primary peg guarantee buy orders in this guarantee order book 62*a*. In this example, the process, determining that there are none, terminates as indicated at step 166.

The NBBO is still $20.00 to $20.00 (400×300), and the market is still locked. The guarantee order book 62*a* looks like this.

| FirmA Guarantee Buy Orders for FirmC | FirmA Guarantee Sell Orders for FirmC |
|---|---|
| Guarantee Order 1: Buy 1000 @ 20.00 (Peg to Bid) Reserve Size = 4000 | Guarantee Order 3: Sell 900 @ 20.00 (Peg to Offer) Reserve Size = 3100 |
| Guarantee Order 2: Buy 300 @ 15.00 | Guarantee Order 4: Sell 500 @ 30.00 |

As illustrated in this example, in this embodiment of the disclosure, although market makers 31 are not allowed to submit orders that lock their guarantee order books 62, resting primary peg orders may temporarily follow the NBBO to lock (but not cross) a guarantee order book 62.

Order Sending Firm C 26*a* sends the following directed order to Market Maker Firm A 31*a*:
→Order 32: Sell 2000 @ Market, Inside Market, Directed Order for FirmA As the directed order process is not suspended when the NBBO is locked in this embodiment of the disclosure, incoming Directed Sell Order 32 enters the directed order process at step 300 (FIG. 5). At step 302, the process sets the OSF parameter to "FirmC", the identifier of the order sending firm. At step 304, the process retrieves the DMM/OSF permissions table data. The process then follows the same sequence of validation steps as in the previous example, from step 306 through step 450.

At step 452, the process retrieves the guarantee order book 62*a* that Firm A has allocated exclusively for crossing with Firm C. At step 454, the process retrieves the best (highest-priced) resting guarantee buy order, Guarantee Buy Order 1. The guarantee order book 62*a* still looks like this:

| FirmA Guarantee Buy Orders for FirmC | FirmA Guarantee Sell Orders for FirmC |
|---|---|
| Guarantee Order 1: Buy 1000 @ 20.00 (Bid) Reserve Size = 3000 | Guarantee Order 3: Sell 900 @ 20.00 (Offer) Reserve Size = 3100 |
| Guarantee Order 2: Buy 300 @ 15.00 | Guarantee Order 4: Sell 500 @ 30.00 |

At step 456, the process retrieves the NBBO ($20.00 to $20.00), and at step 458, the process checks if resting Guarantee Buy Order 1's price ($20.00) is higher than the NBB ($20.00). As the prices are equal in this example, the process continues to step 464, where it sets the DirectedCrossPrice parameter equal to $20.00, the price of resting Guarantee Buy Order 1.

At step 466, the process compares the price of incoming Directed Sell Order 32 (Market) to the DirectedCrossPrice parameter ($20.00). As market orders are marketable by definition, the process continues to step 468, where it compares the DirectedCrossPrice parameter ($20.00) to the NBO ($20.00). As the prices are equal in this example, the process continues to step 470, where it checks if it should attempt to adjust the DirectedCrossPrice parameter or else stop the directed order process. As directed cross prices are adjusted in this embodiment of the disclosure, the process continues to step 472, where it invokes the "Adjust Directed Cross Price for NBO Trade Through" routine 44*b* and proceeds to step 600 in FIG. 8B.

The NBBO is still $20.00 to $20.00 (400×300), and the internal book still looks like this:

| Internal Matching Engine Ranked Bids | Internal Matching Engine Ranked Offers |
|---|---|
| Away Market B: Bid 400 @ 20.00 | Away Market A: Offer 300 @ 20.00 |
| Book Order 150: Buy 200 @ 19.99 | Book Order 147: Sell 100 @ 20.01 |
| Away Market A: Bid 300 @ 19.99 | Book Order 153: Sell 200 @ 20.02 |
| Book Order 145: Buy 100 @ 19.97 | Away Market B: Offer 200 @ 20.02 |
| Away Market C: Bid 500 @ 19.97 | Away Market C: Offer 400 @ 20.02 |
| Book Order 141: Buy 200 @ 19.96 | Book Order 143: Sell 100 @ 20.03 |
| Book Order 151: Buy 600 @ 19.96 | Book Order 144: Sell 700 @ 20.03 |

At step 602, the process retrieves the best offer in the internal book, which is from Away Market A. At step 604, the process checks if the offer is a sell order or an away market quote. As it is an away market quote in this example, the process continues to step 610, where it sets the DirectedCrossPrice parameter to $20.00, Away Market A's offer price. By way of explanation, as the best offer is an away market quote and not a sell order, the DirectedCrossPrice parameter is not adjusted to improve the NBO by the Minimum Price Improvement Increment. The process then continues to step 612, where it checks if the derived DirectedCrossPrice parameter ($20.00) is lower than incoming Directed Sell Order 32's price (Market). As market orders are always marketable by definition, the process continues to step 614, where it returns back to step 472 in FIG. 6B.

From step 472, the process continues to step 474, where it checks if incoming Directed Sell Order 32 has any routing restrictions due to its underlying order type. As an inside market order can only route to away markets at the NBBO, the process continues to step 476, where it retrieves the best away market bid, which is Away Market B's Bid. At step

478, it checks if Away Market B's Bid ($20.00) is less than or equal to the DirectedCrossPrice parameter ($20.00). As the prices are equal in this example, the process continues to step 482, where the "Generate Matched Buy Instruction" routine 46b is invoked and proceeds to step 630 in FIG. 9B.

At step 632, the size of incoming Directed Sell Order 32 (2000 shares) is compared to the available size of resting Guarantee Buy Order 1 (1000 shares, the Show Size). As the size of incoming Directed Sell Order 32 is higher, 1000 shares of Guarantee Buy Order 1 are pulled from the guarantee order book 62a as indicated at step 638. At step 640, the Show Size of Guarantee Buy Order 1 is replenished from its Reserve Size, reducing the Reserve Size to 3000 shares. The updated guarantee order book looks like this:

| FirmA Guarantee Buy Orders for FirmC | FirmA Guarantee Sell Orders for FirmC |
|---|---|
| Guarantee Order 1: Buy 1000 @ Bid, Reserve Size = 3000 ← Guarantee Order 2: Buy 300 @ 15.00 | Guarantee Order 3: Sell 900 @ Offer, Reserve Size = 3100 Guarantee Order 4: Sell 500 @ 30.00 |

The process continues to step 642, where it sets the MaxCrossQuantity parameter equal to 1000 shares, the pulled size (Show Size) of Guarantee Buy Order 1. At step 646, the process creates a logical link pairing incoming Directed Sell Order 32 and resting Guarantee Buy Order 1. It does this by appending a 'match instruction' to incoming Directed Sell Order 32. The directed cross order instruction looks like this:

| Guarantee Order 1: Buy 1000 @ 20.00 | ←→ | Directed Order 32: Sell 2000 @ Market, Inside Market, MaxCrossQuantity = 1000, DirectedCrossPrice = 20.00, Cross = Guarantee Buy Order 1 |
|---|---|---|

At step 648, the process momentarily ranks Guarantee Buy Order 1 in the internal book according to the price/time priority of the DirectedCrossPrice parameter. As previously described, guarantee orders are ranked behind all book orders at or better than the DirectedCrossPrice parameter and ahead of all away market quotes equal to the Directed-CrossPrice parameter. As Away Market B's Bid is not superior, Guarantee Buy Order 1 has the highest priority in the marketplace. The internal book momentarily looks like this:

| Internal Matching Engine Ranked Bids | Internal Matching Engine Ranked Offers |
|---|---|
| Guarantee Order 1: Buy 1000 @ 20.00 ← | Away Market A: Offer 300 @ 20.00 |
| Away Market B: Bid 400 @ 20.00 | Book Order 147: Sell 100 @ 20.01 |
| Book Order 150: Buy 200 @ 19.99 | Book Order 153: Sell 200 @ 20.02 |
| Away Market A: Bid 300 @ 19.99 | Away Market B: Offer 200 @ 20.02 |
| Book Order 145: Buy 100 @ 19.97 | Away Market C: Offer 400 @ 20.02 |
| Away Market C: Bid 500 @ 19.97 | Book Order 143: Sell 100 @ 20.03 |
| Book Order 141: Buy 200 @ 19.96 | Book Order 144: Sell 700 @ 20.03 |
| Book Order 151: Buy 600 @ 19.96 | |

The process continues to step 650, where the "Present Directed Sell to Internal Book" routine 48b is invoked, and proceeds to step 660 in FIG. 10B. At step 662, the process retrieves the best bid in the internal book, which is Guarantee Buy Order 1. At step 666, it checks if the best bid is the paired guarantee buy order. As Guarantee Buy Order 1 is the paired order, the process continues to step 664, where it executes the directed cross. The process matches 1000 shares of incoming Directed Sell Order 32 (the Max-CrossQuantity parameter) with Guarantee Buy Order 1 at $20.00 (the DirectedCrossPrice parameter). As no orders or quotes are superior to Guarantee Buy Order 1, the directed cross executes cleanly with no marketplace interaction.

The process continues to step 682, where it checks if Guarantee Buy Order 1 is fully traded. As it has been folly traded and removed from the internal book's ranked list of bids, the process continues to step 686, where it checks if incoming Directed Sell Order 32 still has shares remaining to trade. In this example, incoming Directed Sell Order 32 still has 1000 unmatched shares. Therefore, at step 688, the unmatched shares are automatically converted to non-directed shares and are received by the regular continuous order matching process. The directed order process terminates at step 690. Incoming Sell Order 32 is no longer a directed order and is subsequently processed as a regular (non-directed) inside market order. Accordingly, 400 shares of Sell Order 32 are routed to Away Market B at $20.00. As inside market orders in the regular continuous order matching process must clear each price level before proceeding to the next, Sell Order 32 cannot match Book Order 150 or any other bid until Away Market B moves off the NBB. The internal book temporarily appears as follows while Sell Order 32 is queued waiting for a new NBB:

| Internal Matching Engine Ranked Bids | Internal Matching Engine Ranked Offers |
|---|---|
| Away Market B: Bid 400 @ 20.00 | → Order 32: Sell 600 @ Market → Locked Down Quantity = 400 |
| Book Order 150: Buy 200 @ 19.99 | Away Market A: Offer 300 @ 20.00 |
| Away Market A: Bid 300 @ 19.99 | Book Order 147: Sell 100 @ 20.01 |
| Book Order 145: Buy 100 @ 19.97 | Book Order 153: Sell 200 @ 20.02 |
| Away Market C: Bid 500 @ 19.97 | Away Market B: Offer 200 @ 20.02 |
| Book Order 141: Buy 200 @ 19.96 | Away Market C: Offer 400 @ 20.02 |
| Book Order 151: Buy 600 @ 19.96 | Book Order 143: Sell 100 @ 20.03 |
| | Book Order 144: Sell 700 @ 20.03 |

Sell Order 32 continues to execute against trading interest as it presents at the NBB, until the order is completely filled.

Example 13

Directed Sweep Market Sell Order Trades with Superior Interest in a Crossed Market and Then Participates in the Directed Cross Continuing from the previous example, Away Market B changes its Bid to $20.01, crossing the market. The NBBO is $20.01 to $20.00 (400×300). The market is crossed. The internal book looks like this:

| Internal Matching Engine Ranked Bids | Internal Matching Engine Ranked Offers |
|---|---|
| Away Market B: Bid 400 @ 20.01 ← | Away Market A: Offer 300 @ 20.00 |
| Book Order 150: Buy 200 @ 19.99 | Book Order 147: Sell 100 @ 20.01 |
| Away Market A: Bid 300 @ 19.99 | Book Order 153: Sell 200 @ 20.02 |
| Book Order 145: Buy 100 @ 19.97 | Away Market B: Offer 200 @ 20.02 |
| Away Market C: Bid 500 @ 19.97 | Away Market C: Offer 400 @ 20.02 |
| Book Order 141: Buy 200 @ 19.96 | Book Order 143: Sell 100 @ 20.03 |
| Book Order 151: Buy 600 @ 19.96 | Book Order 144: Sell 700 @ 20.03 |

As the process detects the new NBB, it invokes the procedures that update pegged guarantee buy orders when the NBB changes. Referring to FIG. 4A, at step 130, the "New NBB Updates Pegged Guarantee Buy Orders" routine 54a is activated. At step 132, the process retrieves the NBBO. At step 134, the process checks if the NBBO is crossed. As the NBBO is crossed, the process terminates as indicated at step 140. Guarantee Buy Order 1, therefore, is not repriced at $20.01, the NBB. Instead, it remains priced at $20.00, its previous price. The directed order process is not suspended in this embodiment when the NBBO is crossed. Pegged guarantee orders, however, are not repriced when the NBBO is crossed. The guarantee order book 62a for Firm C remains unchanged and continues to look like this:

| FirmA Guarantee Buy Orders for FirmC | FirmA Guarantee Sell Orders for FirmC |
|---|---|
| Guarantee Order 1: Buy 1000 @ 20.00 (Bid) Reserve Size = 3000 Guarantee Order 2: Buy 300 @ 15.00 | Guarantee Order 3: Sell 900 @ 20.00 (Offer) Reserve Size = 3100 Guarantee Order 4: Sell 500 @ 30.00 |

Order Sending Firm C 26a sends the following directed order to Market Maker Firm A 31a:
→Order 33: Sell 2000 @ Market, Sweep Market, Directed Order for FirmA According to rules for this embodiment of the disclosure, the directed order process is not suspended when the NBBO is crossed. Accordingly, incoming Directed Sell Order 33 enters the directed order process at step 300. At step 302, the process sets the OSF parameter to "FirmC", the identifier, of the order sending firm. At step 304, the process retrieves the DMM/OSF permissions table data. The process follows the same sequence of validation steps as in the previous example, from steps 306 through step 450.

At step 452, the process retrieves the guarantee order book 62a that Firm A allocated for crossing with Firm C. The guarantee order book 62a looks like this:

| FirmA Guarantee Buy Orders for FirmC | FirmA Guarantee Sell Orders for FirmC |
|---|---|
| Guarantee Order 1: Buy 1000 @ 20.00 (Bid) Reserve Size = 3000 Guarantee Order 2: Buy 300 @ 15.00 | Guarantee Order 3: Sell 900 @ 20.00 (Offer) Reserve Size = 3100 Guarantee Order 4: Sell 500 @ 30.00 |

At step 454, the process retrieves the best resting guarantee buy order, Guarantee Buy Order 1. At step 456, the process retrieves the NBBO ($20.01 to $20.00). At step 458, the process checks if resting Guarantee Buy Order 1's price ($20.00) is higher than the NBB ($20.01). As its price is lower in this example, the process continues to step 464, where it sets the DirectedCrossPrice parameter equal to $20.00, the price of Guarantee Buy Order 1.

At step 466, the process compares the price of incoming Directed Sell Order 33 (Market) to the DirectedCrossPrice parameter ($20.00). As the prices are marketable by definition, the process continues to step 468, where it compares the DirectedCrossPrice parameter ($20.00) to the NBO price ($20.00). As the prices are equal in this example, the process continues to step 470, where it checks if it should attempt to adjust the directed cross price or else stop the directed order process. As directed cross prices are adjusted in this embodiment of the disclosure, the process continues to step 472, where the "Adjust Directed Cross Price for NBO Trade Through" routine 44b and proceeds to step 600 in FIG. 8B. The NBBO is still $20.01 to $20.00 (400×300). The market is still crossed, and the internal book still looks like this:

| Internal Matching Engine Ranked Bids | Internal Matching Engine Ranked Offers |
|---|---|
| Away Market B: Bid 400 @ 20.01 | Away Market A: Offer 300 @ 20.00 |
| Book Order 150: Buy 200 @ 19.99 | Book Order 147: Sell 100 @ 20.01 |
| Away Market A: Bid 300 @ 19.99 | Book Order 153: Sell 200 @ 20.02 |
| Book Order 145: Buy 100 @ 19.97 | Away Market B: Offer 200 @ 20.02 |
| Away Market C: Bid 500 @ 19.97 | Away Market C: Offer 400 @ 20.02 |
| Book Order 141: Buy 200 @ 19.96 | Book Order 143: Sell 100 @ 20.03 |
| Book Order 151: Buy 600 @ 19.96 | Book Order 144: Sell 700 @ 20.03 |

At step 602, the process retrieves the best offer in the internal book, which is on Away Market A. At step 604, the process checks if the offer is a sell order or an away market quote. As it is an away market quote in this example, the process continues to step 610, where it sets the DirectedCrossPrice parameter to $20.00, Away Market A's Offer price. The process then continues to step 612, where it checks if the derived DirectedCrossPrice parameter ($20.00) is lower than incoming Directed Sell Order 33's price (Market). As Market Orders are always marketable by definition, the process continues to step 614, where it returns to step 472 in FIG. 6B.

From step 472, the process continues to step 474, where it checks if incoming Directed Sell Order 33 has any routing restrictions due to its underlying order type. As a sweep market order has no routing restrictions, the process continues to step 482, where the "Generate Matched Buy Instruction" routine 46b is invoked and proceeds to step 630 in FIG. 9B.

Then at step 632, the size of incoming Directed Sell Order 33 (2000 shares) is compared to the size of the Guarantee Buy Order 1 (1000 shares, the Show Size). As the size of incoming Directed Sell Order 33 is higher, 1000 shares of Guarantee Buy Order 1 are pulled from the guarantee order book 62a at step 638. At step 640, the Show Size is replenished from the Reserve Size, reducing the Reserve Size to 2000 shares. The updated guarantee order book 62a looks like this:

| FirmA Guarantee Buy Orders for FirmC | FirmA Guarantee Sell Orders for FirmC |
|---|---|
| Guarantee Order 1: Buy 1000 @ Bid, Reserve Size = 2000 ← Guarantee Order 2: Buy 300 @ 15.00 | Guarantee Order 3: Sell 900 @ Offer, Reserve Size = 3100 Guarantee Order 4: Sell 500 @ 30.00 |

The process then continues to step 642, where it sets the MaxCrossQuantity parameter equal to 1000 shares, the pulled size (Show Size) of Guarantee Buy Order 1. At step 646, the process then creates a logical link pairing incoming Directed Sell Order 33 and Guarantee Buy Order 1. It does this by appending a 'match instruction' to incoming Directed Sell Order 33. The directed cross order instruction looks like this:

| Guarantee Order 1: | Directed Order 33: Sell 2000 @ Market, |
|---|---|
| Buy 1000 @ 20.00 | Sweep Market, |
| | MaxCrossQuantity = 1000, |
| | DirectedCrossPrice = 20.00, |
| | Cross = Guarantee Buy Order 1 |

At step 648, the process momentarily ranks Guarantee Buy Order 1 in the internal book according to the price/time priority of the DirectedCrossPrice parameter. As previously described, guarantee orders are ranked behind all book orders at or better than the DirectedCrossPrice parameter and ahead of all away market quotes equal to the DirectedCrossPrice parameter. Guarantee Buy Order 1 has the second highest priority in the marketplace, as Away Market B has price priority. The internal book momentarily looks like this:

| Internal Matching Engine Ranked Bids | Internal Matching Engine Ranked Offers |
|---|---|
| Away Market B: Bid 400 @ 20.01 | Away Market A: Offer 300 @ 20.00 |
| Guarantee Order 1: | Book Order 147: Sell 100 @ 20.01 |
| Buy 1000 @ 20.00 ← | |
| Book Order 150: Buy 200 @ 19.99 | Book Order 153: Sell 200 @ 20.02 |
| Away Market A: Bid 300 @ 19.99 | Away Market B: Offer 200 @ 20.02 |
| Book Order 145: Buy 100 @ 19.97 | Away Market C: Offer 400 @ 20.02 |
| Away Market C: Bid 500 @ 19.97 | Book Order 143: Sell 100 @ 20.03 |
| Book Order 141: Buy 200 @ 19.96 | Book Order 144: Sell 700 @ 20.03 |
| Book Order 151: Buy 600 @ 19.96 | |

The process continues to step 650, where the "Present Directed Sell to Internal Book" routine 48b is invoked and proceeds to step 660 in FIG. 10B, At step 662, the process retrieves the best bid in the internal book, which is Away Market B's Bid. At step 666, the process checks if this bid is the guarantee buy order. As this bid is not the guarantee buy order in this example, the process continues to step 668, where the process checks to see if this bid is a regular (book) buy order. As this bid is not a book order, the process continues to step 670, where it checks if incoming Directed Sell Order 33 can be routed. As sweep market orders can be routed, the process continues to step 672, where it checks if Away Market B's Bid is already locked down. As the posting market center has not previously routed any shares to Away Market B's current bid, the quote is not locked down and is eligible to receive the full bid size. Then, at step 674, the process routes 400 shares of incoming Directed Sell Order 33 to Away Market B at $20.01. The internal book momentarily looks like this:

| Internal Matching Engine Ranked Bids | Internal Matching Engine Ranked Offers |
|---|---|
| Away Market B: Bid 400 @ 20.01 | Away Market A: Offer 300 @ 20.00 |
| → Locked Down Quantity = 400 | |
| Guarantee Order 1: | Book Order 147: Sell 100 @ 20.01 |
| Buy 1000 @ 20.00 | |
| Book Order 150: Buy 200 @ 19.99 | Book Order 153: Sell 200 @ 20.02 |
| Away Market A: Bid 300 @ 19.99 | Away Market B: Offer 200 @ 20.02 |
| Book Order 145: Buy 100 @ 19.97 | Away Market C: Offer 400 @ 20.02 |
| Away Market C: Bid 500 @ 19.97 | Book Order 143: Sell 100 @ 20.03 |
| Book Order 141: Buy 200 @ 19.96 | Book Order 144: Sell 700 @ 20.03 |
| Book Order 151: Buy 600 @ 19.96 | |

Without waiting for a response from Away Market B, the process proceeds to step 676 and determines that incoming Directed Sell Order 33 still has 1600 shares available to trade. Therefore, the process proceeds to step 678 where it retrieves the next best bid in the internal book, which is Guarantee Buy Order 1.

The process then returns to step 666 where the process checks if this is the paired guarantee buy order. As Guarantee Buy Order 1 is the paired Guarantee Order, the process continues to step 664, where it executes the directed cross. The process matches 1000shares of incoming Directed Sell Order 33 (the MaxCrossQuantity parameter) with Guarantee Buy Order 1 at $20.00 (the DirectedCrossPrice parameter). The internal book momentarily looks like this:

| Internal Matching Engine Ranked Bids | Internal Matching Engine Ranked Offers |
|---|---|
| Away Market B: Bid 400 @ 20.01 | Away Market A: Offer 300 @ 20.00 |
| → Locked Down Quantity = 400 | |
| Book Order 150: Buy 200 @ 19.99 | Book Order 147: Sell 100 @ 20.01 |
| Away Market A: Bid 300 @ 19.99 | Book Order 153: Sell 200 @ 20.02 |
| Book Order 145: Buy 100 @ 19.97 | Away Market B: Offer 200 @ 20.02 |
| Away Market C: Bid 500 @ 19.97 | Away Market C: Offer 400 @ 20.02 |
| Book Order 141: Buy 200 @ 19.96 | Book Order 143: Sell 100 @ 20.03 |
| Book Order 151: Buy 600 @ 19.96 | Book Order 144: Sell 700 @ 20.03 |

The process continues to step 682, where it checks if Guarantee Buy Order 1 is fully traded. As Guarantee Buy Order 1 has been fully traded and removed from the internal book's ranked list of bids, the process continues to step 686, where it checks if incoming Directed Sell Order 33 still has shares remaining to trade. Incoming Directed Sell Order 33 still has 600 unmatched shares. As such, at step 688, the unmatched shares are automatically converted to non-directed shares and are received by the regular continuous order matching process. The directed order process terminates as indicated at step 690. Incoming Sell Order 33 is no longer a directed order and is subsequently treated as a regular sweep market order. As sweep market orders can contemporaneously execute against all trading interest in the marketplace, incoming Sell Order 33 matches 200 shares of posted Buy Order 150 at $19.99, routes 300 shares to Away Market A at $19.99 and matches 100 shares of posted Buy Order 145 at $19.97. The posted buy orders are completely depleted and are removed from the book. The updated internal book appears as follows:

| Internal Matching Engine Ranked Bids | Internal Matching Engine Ranked Offers |
|---|---|
| Away Market B: Bid 400 @ 20.01 | Away Market A: Offer 300 @ 20.00 |
| Locked Down Quantity = 400 | |
| Away Market A: Bid 300 @ 19.99 | Book Order 147: Sell 100 @ 20.01 |
| → Locked Down Quantity = 300 | |
| Away Market C: Bid 500 @ 19.97 | Book Order 153: Sell 200 @ 20.02 |
| Book Order 141: Buy 200 @ 19.96 | Away Market B: Offer 200 @ 20.02 |
| Book Order 151: Buy 600 @ 19.96 | Away Market C: Offer 400 @ 20.02 |
| | Book Order 143: Sell 100 @ 20.03 |
| | Book Order 144: Sell 700 @ 20.03 |

Away Market B and Away Market A fill the orders routed to them and move their quotes. The continuous order matching process unlocks their bids.

Example 14

Guarantee Sell Order Price Locks Best Bid in the Marketplace; Directed Cross Price must be Adjusted to Avoid Trading Through the Internal Book In this example, a different order sending firm, Firm B 26c, directs an order to its own Market Maker 31b. Firm B has been configured in the DMM/OSF permissions table 60 so that whenever it sends a directed order but does not explicitly specify a DMM, the order defaults to its own market maker.

→Order 35: Buy 600 @ Market, Sweep Market, Directed Order

The incoming directed buy order enters the directed order process at step 300. At step 302, the process sets the OSF parameter to "FirmB", the identifier of the order sending firm. At step 304, the process retrieves the DMM/OSF permissions table data, and at step 306, the process checks if incoming Directed Buy Order 35 explicitly specifies a Designated Market Maker. As it does not, at step 316, the process checks if a default DMM exists in the DMM/OSF permissions table 60. As a default does exist, at step 318, the process sets the DMM parameter to "FirmB".

As Firm B is permissioned to direct orders to Firm B (itself), the process continues to step 320 where the side of the incoming order is checked. As incoming Directed Buy Order 35 is a buy order, at step 322 the process invokes the "Determine if Directed Buy Order Can Trade" routine 42a and proceeds to step 350 (FIG. 6A).

Then, at step 352, the process retrieves the guarantee order book 62c that Firm B has created for crossing with incoming orders from the same firm. The guarantee order book 62c looks like this:

| FirmB Guarantee Buy Orders for FirmB | FirmB Guarantee Sell Orders for FirmB |
| --- | --- |
| Guarantee Order 11: Buy 600 @ Bid | Guarantee Order 13: Sell 600 @ Offer, Discretion = −.01 |
| Guarantee Order 12: Buy 1000 @ Bid, Peg Offset = −.01 | Guarantee Order 14: Sell 900 @ Offer |

By way of explanation regarding Guarantee Sell Order 13, in this example, the posting market center's business rules allow guarantee orders to grant price improvement, i.e., to execute at prices better than the NBBO. This is why Guarantee Sell Order 13 was allowed to include a discretionary offset, which always improves the current order price of a guarantee order. Accordingly, if guarantee orders are not allowed to grant price improvement, then guarantee orders are not allowed to include a discretionary offset.

Regardless of whether guarantee orders are allowed to unconditionally grant price improvement or not, there are cases where a guarantee order must receive price improvement, i.e., must execute at a better price, to prevent a trade-through. This is illustrated in the example that follows.

In this example, the NBBO is $19.99 to $20.00 (500× 300). Accordingly, the primary peg orders in the guarantee order book 62c are currently priced as follows:

| FirmB Guarantee Buy Orders for FirmB | FirmB Guarantee Sell Orders for FirmB |
| --- | --- |
| Guarantee Order 11: Buy 600 @ 19.99 (Bid) | Guarantee Order 13: Sell 600 @ 19.99 (Offer − .01) |
| Guarantee Order 12: Buy 1000 @ 19.98 (Bid − .01) | Guarantee Order 14: Sell 900 @ 20.00 (Offer) |

As illustrated in this example, in this embodiment of the disclosure, although primary peg orders are not allowed to be submitted at limit prices that would result in a locked guarantee order book, resting primary peg guarantee orders are allowed to follow the NBBO to prices that temporarily lock (but not cross) the guarantee order book. In this example, even though the NBBO is not locked, the guarantee order book 62c is momentarily locked because the spread is tight and Guarantee Sell Order B's price ($19.99) is pegged to be superior to the NBO ($20.00).

At step 354, the process retrieves the best guarantee sell order, Order 13 in this example. At step 356, the process retrieves the NBBO ($19.99 to $20.00). At step 358, the process checks if Guarantee Sell Order 13's price ($19.99) is lower than the NBO ($20.00). In this example, it is lower, so the process continues to step 360, where it checks if guarantee sell orders are allowed to execute at prices that are lower than the NBO. In this example, the posting market center's business rules allow guarantee sell orders to execute at prices superior to the NBO, so the process continues to step 364, where it sets the DirectedCrossPrice parameter equal to $19.99, which is Guarantee Sell Order 13's price.

Next, at step 366, the process compares the price of incoming Directed Buy Order 35 (Market) to the DirectedCrossPrice parameter ($19.99). As the prices are marketable by definition, the process continues to step 368, where it compares the DirectedCrossPrice ($19.99) to the NBB price ($19.99). Because the spread is so tight, Guarantee Sell Order 13's price is the same as the NBB price. As the directed cross price may potentially trade through the NBB, the process continues to step 370, where it checks if the directed cross price should be adjusted or if the directed order process should be stopped instead. As prices are adjusted in this embodiment of the disclosure, the process continues to step 372, where the "Adjust Directed Cross Price for NBB Trade Through" routine 44a is invoked, and the process proceeds to step 500 in FIG. 8A. The internal book looks like this:

| Internal Matching Engine Ranked Bids | Internal Matching Engine Ranked Offers |
| --- | --- |
| Book Order 150: Buy 200 @ 19.99 | Away Market A: Offer 300 @ 20.00 |
| Away Market A: Bid 300 @ 19.99 | Book Order 147: Sell 100 @ 20.01 |
| Away Market B: Bid 400 @ 19.98 | Book Order 153: Sell 200 @ 20.02 |
| Book Order 145: Buy 100 @ 19.97 | Away Market B: Offer 200 @ 20.02 |
| Away Market C: Bid 500 @ 19.97 | Away Market C: Offer 400 @ 20.02 |
| Book Order 141: Buy 200 @ 19.96 | Book Order 143: Sell 100 @ 20.03 |
| Book Order 151: Buy 600 @ 19.96 | Book Order 144: Sell 700 @ 20.03 |

At step 502, the process retrieves the best bid from the internal book's ranked list of bids, which is posted Buy Order 150 in this example. At step 504, the process checks if the best bid is a buy order or an away market quote. As Buy Order 150 is a buy order, the process continues to step 506, where the process retrieves the Minimum Price Improvement Increment, In this example, the Minimum Price Improvement Increment is set to a penny. Therefore, at step 508, the process derives the DirectedCrossPrice parameter by adding the Minimum Price Improvement Increment (.01) to posted Buy Order 150's price ($19.99) to derive the DirectedCrossPrice parameter of $20.00. By way of explanation, the reason that incoming Directed Buy Order 35 and resting Guarantee Sell Order 13 cannot cross at $19.99 is because it would result in a trade through of posted Buy Order 150. Posted Buy Order 15 has time priority at the price of $19.99. However, posted Buy Order 150 cannot be executed because Guarantee Sell Order 13 cannot match it. By definition, guarantee orders cannot interact with the marketplace, they can only match the directed order with which they are paired for crossing.

The process continues to step 512, where it compares the DirectedCrossPrice parameter ($20.00) to incoming Directed Buy Order 35's price (Market). As the Directed-CrossPrice parameter is not higher in this example, the process continues to step 514, where it returns to step 372 in FIG. 6A.

From step 372, the process continues to step 374, where it checks if incoming Directed Buy Order 35 has any routing restrictions. As sweep market orders do not have routing restrictions, the process continues to step 382, where the "Generate Matched Sell Instruction" routine 46a is invoked, and the process continues to step 530 in FIG. 9A.

From step 530, the process at step 532 compares the size of incoming Directed Buy Order 35 (600 shares) to the size of resting Guarantee Sell Order 13 (600 shares). As the sizes are equal, the process, at step 538, pulls Guarantee Sell Order 13 from the guarantee order book 62c. The updated guarantee order book 62c looks like this:

| FirmB Guarantee Buy Orders for FirmB | FirmB Guarantee Sell Orders for FirmB |
|---|---|
| Guarantee Order 11: Buy 600 @ Bid<br>Guarantee Order 12: Buy 1000 @ Bid, Peg Offset = −.01 | Guarantee Order 14: Sell 900 @ Offer |

The process determines that Guarantee Sell Order 13 is not a reserve order at step 540 and continues to step 542, where it sets the MaxCrossQuantity parameter to 600 shares, which is the size of Guarantee Sell Order 13.

At step 546, the process creates a logical link between incoming Directed Buy Order 35 and resting Guarantee Sell Order 13. It does this by appending a 'match instruction' to incoming Directed Buy Order 35. The directed cross order instruction looks like this:

| Directed Order 35: Buy 600 @ Market ◄──► Sweep Market,<br>MaxCrossQuantity = 600,<br>DirectedCrossPrice = 20.00,<br>Cross = Guarantee Sell Order 13 | Guarantee Order 13: Sell 600 @ 19.99 |
|---|---|

At step 548, the process momentarily ranks Guarantee Sell Order 13 in the internal book—but it ranks it according to the adjusted DirectedCrossPrice parameter ($20.00), not according to Guarantee Sell Order 13's original unadjusted price ($19.99). By way of explanation, the reason that the pulled guarantee order's price is not also permanently adjusted is because any portion of a guarantee order that does not trade is returned to the guarantee order book. The adjusted price is only in effect for the pending directed cross transaction.

Guarantee Sell Order 13 is ranked in the internal book according to the price/time priority rules for guarantee orders, i.e., behind all book orders at or better than the DirectedCrossPrice parameter and ahead of all away market quotes equal to the DirectedCrossPrice parameter. As no offers are superior, Guarantee Sell Order 13 is ranked first in the internal book. The Directed Buy and the Guarantee Sell will be able to cross cleanly without any interaction with the marketplace. The internal book momentarily looks like this:

| Internal Matching Engine Ranked Bids | Internal Matching Engine Ranked Offers |
|---|---|
| Book Order 150: Buy 200 @ 19.99 | Guarantee Order 13: Sell 600 @ 20.00 ← |
| Away Market A: Bid 300 @ 19.99 | Away Market A: Offer 300 @ 20.00 |
| Away Market B: Bid 400 @ 19.98 | Book Order 147: Sell 100 @ 20.01 |
| Book Order 145: Buy 100 @ 19.97 | Book Order 153: Sell 200 @ 20.02 |
| Away Market C: Bid 500 @ 19.97 | Away Market B: Offer 200 @ 20.02 |
| Book Order 141: Buy 200 @ 19.96 | Away Market C: Offer 400 @ 20.02 |
| Book Order 151: Buy 600 @ 19.96 | Book Order 143: Sell 100 @ 20.03 |
| | Book Order 144: Sell 700 @ 20.03 |

The process continues to step 550, where the "Present Directed Buy to Internal Book" routine 48a is invoked, and the process proceeds to step 560 in FIG. 10A.

From step 560, at step 562, the process retrieves the best offer in the internal book, which is Guarantee Sell Order 13. At step 566, the process determines that this is the paired guarantee sell order. Therefore, at step 564, the process executes the directed cross. The process crosses 600 shares of incoming Directed Buy Order 35 (the MaxCrossQuantity parameter) with Guarantee Sell Order 13 at the price of $20.00 (the DirectedCrossPrice parameter).

Then, at step 582, the process checks if Guarantee Sell Order 13 is fully traded. As the Guarantee Order has no unexecuted shares, the process proceeds to step 586, where it checks if incoming Directed Buy Order 35 has any unexecuted shares. As incoming Directed Buy Order 35 is also folly traded, the process terminates as indicated at step 590.

Detailed Examples Of The Automatic Repricing Of Pegged Guarantee Orders

The examples in this section illustrate how primary peg guarantee orders are updated as the NBBO changes. As discussed above, primary peg guarantee orders behave somewhat differently than regular (non-guarantee) primary peg orders. Primary Peg Guarantee Buy Orders Updated by NBB Changes These examples illustrate how primary peg guarantee buy orders are automatically repriced as the NBB changes. In these examples, the NBBO is $19.99 to $20.02. A permissioned market maker sends the following primary peg guarantee buy orders:

→Guarantee Order 1: Buy @ Bid
→Guarantee Order 2: Buy @ Bid, Peg Offset=−0.01
→Guarantee Order 3: Buy @ Bid, Discretionary Offset=+ 0.01
→Guarantee Order 4: Buy @ Bid, Peg Offset=−0.02, Peg Limit=19.98
→Guarantee Order 5: Buy @ Bid, Discretionary Offset=+ 0.02, Peg Limit=20.02

All primary peg buy orders are priced in relation to the NBB ("Bid"), which is presently $19.99. The guarantee order book looks like this when the orders are priced and ranked according to price/time priority:

| Guarantee Order Book Bids | Current Order Price |
|---|---|
| Guarantee Order 5: Buy @ Bid + .02, Peg Limit = 20.02 | 20.01 |
| Guarantee Order 3: Buy @ Bid + .01 | 20.00 |
| Guarantee Order 1: Buy @ Bid | 19.99 |
| Guarantee Order 2: Buy @ Bid − .01 | 19.98 |
| Guarantee Order 4: Buy @ Bid − .02, Peg Limit = 19.98 | 19.97 |

The NBBO changes to $20.03 to $20.05. Referring to FIG. 4A, at step 132, the new NBBO price is retrieved. At step 134, the process checks to see if the NBBO is crossed. If the NBBO is crossed, then the pegged orders are not repriced, and the process terminates as indicated at step 140.

As the NBBO is not crossed in this example, the process continues to step 136 and retrieves the guarantee order book. Then, at step 138, the process determines, in this example, that primary peg guarantee buy orders do reside in the book and continues to step 142.

Example 15

Update Guarantee Buy Order 5 (discretion offset+peg limit)

At step 142, the process retrieves the best guarantee buy order, Order 5:

Guarantee Order 5: Buy @ Bid, Discretionary Offset=+ 0.02, Peg Limit=20.02

At step 144, the process initially sets the CurrentOrderPrice parameter of Guarantee Buy Order 5 to $20.03, which is the present NBB. At step 146, the process checks if Guarantee Buy Order 5 has a discretionary offset. It does in this example, and the process, at step 148, adds the discretionary offset (0.02) to the CurrentOrderPrice parameter ($20.03) to derive the updated CurrentOrderPrice parameter ($20.05). If updating the CurrentOrderPrice would cause the guarantee order book to become crossed (i.e., buy higher than sell), then the process does not update the CurrentOrderPrice parameter with the discretionary offset.

The process continues to step 150, where it checks if Guarantee Buy Order 5 has a peg offset. As it does not (a guarantee order can have a discretionary offset or a peg offset, but not both), the process continues to step 154, where it checks if Guarantee Buy Order 5 has a peg limit. It does in this example. As such, the process continues to step 156, where it compares the CurrentOrderPrice parameter ($20.05) to the Peg Limit ($20.02). As the CurrentOrderPrice parameter is higher than the Peg Limit, the process continues to step 158, where it resets the CurrentOrderPrice parameter equal to the Peg Limit ($20.02). At step 160, the process reinserts Guarantee Buy Order 5 in the guarantee order book in price/time priority according to its CurrentOrderPrice parameter.

Then at step 162, the process checks if additional pegged buy orders exist and, in this example, finding this to be true, proceeds to step 164 where it retrieves the next buy order, Guarantee Buy Order 3.

Example 16

Update Guarantee Buy Order 3 (discretion offset)

Retrieved Guarantee Buy Order 3 looks like this:
→Guarantee Order 3: Buy @ Bid, Discretionary Offset=+ 0.01

The process returns to step 144, where it initially sets the CurrentOrderPrice parameter of Guarantee Order 3 to $20.03, the NBB. At step 146, the process checks if Guarantee Buy Order 3 has a discretionary offset. It does in this example, so the process continues to step 148, where it adds the discretionary offset (+0.01) to the CurrentOrderPrice parameter ($20.03) to derive the updated CurrentOrderPrice parameter ($20.04). If updating the CurrentOrderPrice parameter would cause the guarantee order book to become crossed (i.e., buy higher than sell), then the process does not update the CurrentOrderPrice parameter with the discretionary offset.

The process then continues to step 150, where it checks if Guarantee Buy Order 3 has a peg offset. As it does not in this example, the process continues to step 154, where it checks if Guarantee Buy Order 3 has a peg limit. It does not in this example. The process, therefore, continues to step 160, where it reinserts Guarantee Buy Order 3 in the guarantee order book in price/time priority according to its CurrentOrderPrice parameter.

At step 162, the process checks if additional pegged buy orders exist and finding this to be true in this example, proceeds to step 164 where it retrieves the next buy order, which is Guarantee Buy Order 1.

Example 17

Update Guarantee Buy Order 1

Retrieved Guarantee Buy Order 1 looks like this:
→Guarantee Order 1: Buy @ Bid

The process returns to step 144, where it initially sets the CurrentOrderPrice parameter of Guarantee Order 1 to $20.03, the NBB. Then, at step 146, the process checks if Guarantee Buy Order 1 has a discretionary offset. As it does not in this example, the process continues to step 150, where it checks if Guarantee Buy Order 1 has a peg offset. It does not, so the process continues to step 154, where it checks if Guarantee Buy Order 1 has a peg limit. As it does not in this example, the process continues to step 160, where it reinserts Guarantee Buy Order 1 in the guarantee order book in price/time priority according to its CurrentOrderPrice parameter.

At step 162, the process checks if additional pegged guarantee buy orders exist and, in this example, finding this to be true, proceeds to step 164 where it retrieves the next buy order, which is Guarantee Buy Order 2.

Example 18

Update Guarantee Buy Order 2 (peg offset)

Retrieved Guarantee Buy Order 2 looks like this:
→Guarantee Order 2: Buy @ Bid, Peg Offset=−0.01

The process returns to step 144 again, where it initially sets the CurrentOrderPrice parameter of Guarantee Buy Order 2 to $20.03, the NBB. At step 146, the process checks if Guarantee Buy Order 2 has a discretionary offset. It does not in this example. Therefore, the process continues to step 150. At step 150, the process checks if Guarantee Buy Order 2 has a peg offset. In this example, it does. As such, the process continues to step 152, where it subtracts the peg offset (−0.01) from the CurrentOrderPrice parameter ($20.03) to derive the updated CurrentOrderPrice parameter ($20.02).

The process then continues to step 154, where it checks if Guarantee Buy Order 2 has a peg limit. As it does not in this example, the process continues to step 160, where it reinserts Guarantee Buy Order 2 in the guarantee order book in price/time priority according to its CurrentOrderPrice parameter.

At step 162, the process checks if additional pegged guarantee buy orders exist. In this example, additional pegged guarantee buy orders do exist. Therefore, the process proceeds to step 164 where it retrieves the last buy order, which is Guarantee Buy Order 4.

Example 19

Update Guarantee Buy Order 4 (Peg Offset+Peg Limit)

Retrieved Guarantee Buy Order 4 looks like this:
→Guarantee Order 4: Buy @ Bid, Peg Offset=−0.02, Peg Limit=19.98

The process returns to step 144, where it initially sets the CurrentOrderPrice parameter of Guarantee Buy Order 4 to $20.03, the NBB. At step 146, the process checks if Guarantee Buy Order 4 has a discretionary offset. It does not in this example, and the process continues to step 150. At step 150, the process checks if Guarantee Buy Order 4 has a peg offset. It does in this example. Therefore, the process continues to step 152, where it subtracts the offset (−0.02) from the CurrentOrderPrice parameter ($20.03) to derive the updated CurrentOrderPrice parameter ($20.01).

The process then continues to step 154, where it checks if Guarantee Buy Order 4 has a peg limit. As it does in this example, the process continues to step 156, where it compares the CurrentOrderPrice parameter ($20.01) to the Peg Limit ($19.98). As the CurrentOrderPrice parameter is higher than the Peg Limit, the process continues to step 158, where it resets the CurrentOrderPrice parameter equal to $19.98, which is the Peg Limit. Then at step 160, the process reinserts Guarantee Buy Order 4 in the guarantee order book in price/time priority according to its CurrentOrderPrice parameter.

At step 162, the process checks if additional pegged guarantee buy orders exist, and finding none, continues to step 166 where the process is terminated. With the NBB at $20.03, the updated guarantee order book looks like this when ranked in price/time priority:

| Guarantee Order Book Bids | Current Order Price |
| --- | --- |
| Guarantee Order 3: Buy @ Bid + .01 | 20.04 |
| Guarantee Order 1: Buy @ Bid | 20.03 |
| Guarantee Order 5: Buy @ Bid + .02, Peg Limit = 20.02 | 20.02 |
| Guarantee Order 2: Buy @ Bid − .01 | 20.02 |
| Guarantee Order 4: Buy @ Bid − .02, Peg Limit = 19.98 | 19.98 |

It should be noted that Guarantee Buy Order 5 and Guarantee Buy Order 2 currently have the same price ($20.02) because the Peg Limit on Guarantee Buy Order 5 imposed a ceiling price. Even if multiple orders at the same limit price cannot be submitted according to the rules in this embodiment of the disclosure, multiple orders are permitted to momentarily be repriced at the same price as the NBBO fluctuates. As Guarantee Buy Order 5 was priced at $20.02 before Guarantee Buy Order 2 was, it has time priority.

Primary Peg Guarantee Sell Orders Updated by NBO changes

The examples that follow illustrate how primary peg guarantee sell orders are automatically repriced as the NBO changes. For ease of illustration, the guarantee sell orders in the following examples reside in a different guarantee order book than the guarantee buy orders of the previous example.

In this example, the NBBO is $20.03 to $20.05, and a permissioned market maker sends the following primary peg guarantee sell orders:

→Guarantee Order 6: Sell @ Offer
→Guarantee Order 7: Sell @ Offer, Peg Offset=+0.01
→Guarantee Order 8: Sell @ Offer, Discretionary Offset=−0.01
→Guarantee Order 9: Sell @ Offer, Peg Offset=+0.02, Peg Limit=20.06
→Guarantee Order 10: Sell @ Offer, Discretionary Offset=−0.02, Peg Limit=20.02

The guarantee order book looks like this when the orders are priced and ranked according to price/time priority:

| Guarantee Order Book Offers | Current Order Price |
| --- | --- |
| Guarantee Order 10: Sell @ Offer − .02, Peg Limit = 20.02 | 20.03 |
| Guarantee Order 8: Sell @ Offer − .01 | 20.04 |
| Guarantee Order 6: Sell @ Offer | 20.05 |
| Guarantee Order 7: Sell @ Offer + .01 | 20.06 |
| Guarantee Order 9: Sell @ Offer + .02, Peg Limit = 20.06 | 20.07 |

The NBBO changes to $20.00 to $20.01. Referring to FIG. 4B, at step 232, the new NBBO price is retrieved, and at step 234, the process checks to see if the NBBO is crossed. If the NBBO is crossed, then the pegged orders are not repriced, and the process terminates as indicated at step 240.

In this example, the NBBO is not crossed. As such, the process continues to step 236 and retrieves the guarantee order book. At step 238, the process determines that primary peg guarantee sell orders reside in the book and continues to step 242.

EXAMPLE 20

Update Guarantee Sell Order 10 (discretionary offset+peg limit)

At step 242, the process retrieves the best guarantee sell order, which is Order 10 in this example:
→Guarantee Order 10: Sell @ Offer, Discretionary Offset=0.02, Peg Limit=20.02

Then, at step 244, the process initially sets the CurrentOrderPrice parameter of Guarantee Sell Order 10 to $20.01, which is the present NBO. At step 246, the process then checks it Guarantee Sell Order 10 has a discretionary offset. As it does in this example, the process continues to step 248, where it subtracts the Discretionary Offset (.02) from the CurrentOrderPrice parameter ($20.01) to derive the updated CurrentOrderPrice parameter of $19.99. If updating the CurrentOrderPrice parameter would cause the guarantee order book to become crossed (buy higher than sell), then the process does not update the CurrentOrderPrice parameter with the discretionary offset.

The process then continues to step 250, where it checks if Guarantee Sell Order 10 has a peg offset. As it does not (as explained above a guarantee order cannot have both a discretionary offset and a peg offset), the process continues to step 254, where it checks if Guarantee Sell Order 10 has a peg limit. Guarantee Sell Order 10 does have a peg limit. The process, therefore, continues to step 256, where it compares the CurrentOrderPrice parameter ($19.99) to the Peg Limit ($20.02). As the CurrentOrderPrice parameter is lower than the Peg Limit in this example, the process continues to step 258, where it resets the CurrentOrderPrice parameter equal to $20.02, which is the Peg Limit. At step 260, the process then reinserts Guarantee Sell Order 10 in the guarantee order book in price/time priority according to its CurrentOrderPrice parameter.

At step 262, the process checks if additional pegged sell orders exist, and in this example finding this to be true, the process proceeds to step 264 where it retrieves the next sell order, which is Guarantee Sell Order 8.

EXAMPLE 21

Update Guarantee Sell Order 8 (discretion offset)

Retrieved Guarantee Sell Order 8 looks like this:
→Guarantee Order 8: Sell @ Offer, Discretionary Offset=−0.01

The process returns to step 244, where it initially sets the CurrentOrderPrice parameter of Guarantee Sell Order 8 to $20.01, the NBO. Then, at step 246, it checks if Guarantee Sell Order 8 has a discretionary offset. As it does in this example, the process continues to step 248, where it subtracts the Discretionary Offset (−0.01) from the CurrentOrderPrice parameter ($20.01) to derive the updated CurrentOrderPrice parameter ($20.00). If updating the CurrentOrderPrice parameter would cause the guarantee order book to become crossed (i.e., buy higher than sell), then the process does not update the CurrentOrderPrice parameter with the Discretionary Offset.

The process then continues to step 250, where it checks if Guarantee Sell Order 8 has a Peg Offset. As it does not in this example (a guarantee order cannot have both a discretionary offset and a peg offset), the process continues to step 254, where it checks if Guarantee Sell Order 8 has a peg limit. As it does not in this example, the process continues to step 260, where it reinserts Guarantee Sell Order 8 in the guarantee order book in price/time priority according to its CurrentOrderPrice parameter.

Then at step 262, the process checks if additional pegged guarantee sell orders exist and, in this example, that is the case. As such, the process proceeds to step 264 where it retrieves the next sell order, which is Guarantee Sell Order 6.

EXAMPLE 22

Update Guarantee Sell Order 6

Retrieved Guarantee Sell Order 6 looks like this:
→Guarantee Order 6: Sell @ Offer The process returns to step 244, where it initially sets the CurrentOrderPrice parameter of Guarantee Sell Order 6 to $20.01, the NBO. Then at step 246, the process checks if Sell Order 6 has a discretionary offset. As it does not in this example, the process continues to step 250. At step 250, the process checks if Guarantee Sell Order 6 has a peg offset. As it does not in this example, the process continues to step 254, where it checks if Guarantee Sell Order 6 has a peg limit. As it does not in this example, the process continues to step 260, where it reinserts Guarantee Sell Order 6 in the guarantee order book in price/time priority according to its CurrentOrderPrice parameter.

At step 262, the process checks if additional pegged guarantee sell orders exist. In this example, there are additional pegged guarantee sell orders, so the process proceeds to step 264 where it retrieves the next sell order, which is Guarantee Sell Order 7.

EXAMPLE 23

Update Guarantee Sell Order 7 (Peg Offset)

Retrieved Guarantee Sell Order 7 looks like this:
→Guarantee Order 7: Sell @ Offer, Peg Offset=+0.01

The process returns to step 244, where it initially sets the CurrentOrderPrice parameter of Guarantee Sell Order 7 to $20.01, the NBO. Then at step 246, the process checks if Guarantee Sell Order 7 has a discretionary offset. As it does not in this example, the process continues to step 250. At step 250, the process checks if Guarantee Sell Order 7 has a peg offset. As it does in this example, the process continues to step 252, where it adds the Peg Offset (+0.01) to the CurrentOrderPrice parameter ($20.01) to derive the updated CurrentOrderPrice parameter ($20.02).

The process continues to step 254, where it checks if Guarantee Sell Order 7 has a peg limit. As it does not in this example, the process continues to step 260, where it reinserts Guarantee Sell Order 7 in the guarantee order book in price/time priority according to its CurrentOrderPrice parameter.

At step 262, the process checks if additional pegged guarantee sell orders exist, and finding this to be true in this example, proceeds to step 264 where it retrieves the last sell order, which is Guarantee Sell Order 9.

EXAMPLE 24

Update Guarantee Sell Order 9 (Peg Offset+Peg Limit)

Retrieved Guarantee Sell Order 9 looks like this:
→Guarantee Order 9: Sell @ Offer, Peg Offset=+0.02, Peg Limit=20.06

The process returns to step 244, where it initially sets the CurrentOrderPrice parameter of Guarantee Sell Order 9 to $20.01, the NBO. Then at step 246, the process checks if Guarantee Sell Order 9 has a discretionary offset. As it does not in this example, the process continues to step 250. At step 250, the process checks if Guarantee Sell Order 9 has a peg offset. As it does in this example, the process continues to step 252, where it adds the Peg Offset (+0.02) to the CurrentOrderPrice parameter ($20.01) to derive the updated CurrentOrderPrice parameter ($20.03).

The process then continues to step 254, where it checks if Guarantee Sell Order 9 has a peg limit. As it does in this example, the process continues to step 256, where it compares the CurrentOrderPrice parameter ($20.03) to the Peg Limit ($20.06). As the CurrentOrderPrice parameter is lower than the Peg Limit, the process continues to step 258, where it resets the CurrentOrderPrice parameter equal to $20.06, which is the Peg Limit. Then at step 260, the process reinserts Guarantee Sell Order 9 in the guarantee order book in price/time priority according to its CurrentOrderPrice parameter.

At step 262, the process checks if additional pegged guarantee sell orders exist, and finding none in this example, continues to step 266 where the process is terminated. With the NBO at $20.01, the updated guarantee order book looks like this:

| Guarantee Order Book Offers | Current Order Price |
|---|---|
| Guarantee Order 8: Sell @ Offer − .01 | 20.00 |
| Guarantee Order 6: Sell @ Offer | 20.01 |
| Guarantee Order 10: Sell @ Offer − .02, | 20.02 |

| Guarantee Order Book Offers | Current Order Price |
|---|---|
| Peg Limit = 20.02 | |
| Guarantee Order 7: Sell @ Offer + .01 | 20.02 |
| Guarantee Order 9: Sell @ Offer + .02, | 20.06 |
| Peg Limit = 20.06 | |

It should be noted that Guarantee Sell Order 10 and Guarantee Sell Order 7 currently have the same price ($20.02) because the Peg Limit on Guarantee Sell Order 10 imposed a floor price. Even if orders cannot be submitted at the same limit price in this embodiment of the disclosure, multiple orders are permitted to momentarily be repriced at the same price as the NBBO fluctuates. As Guarantee Sell Order 10 was priced at $20.02 before Guarantee Sell Order 7 was, it has time priority.

While the disclosure has been discussed in terms of certain embodiments, it should be appreciated that the disclosure is not so limited. The embodiments are explained herein by way of example, and there are numerous modifications, variations and other embodiments that may be employed that would still be within the scope of the present disclosure.

The invention claimed is:

1. A method for crossing a directed order, comprising:
providing a posting market center having an internal book and having a guarantee order book, wherein the guarantee order book is specified for a designated market maker to populate the guarantee order book with guarantee orders for a specific order sending firm that is permissioned to send directed orders to the designated market maker,
said posting market center comprising a computer system having memory and at least one processor executing one or more routines that generate and present said internal book and guarantee order book;
automatically executing non-directed order trades via a continuous order matching process;
receiving a plurality of guarantee orders on the posting market center from the designated market maker intended for a specific order sending firm;
validating the received guarantee orders;
populating the guarantee order book with the validated guarantee orders;
receiving a directed order on the posting market center from the order sending firm directed to a specific designated market maker;
activating a Check Permissions for Incoming Directed Order (CPIDO) routine upon receipt of the directed order, the CPIDO routine comprising computer-readable instructions stored on a non-transitory computer readable storage medium and executed by at least one processor, said computer-readable instructions, when executed, causing the activated CPIDO routine to perform functions including:
identifying the order sending firm;
requesting and retrieving designated market maker order sending firm (DMM/OSF) table data; and
comparing the identity of the order sending firm against the table data to verify permission;
where the order sending firm does not have permission to send directed orders to the specified market maker, automatically converting the directed order to a non-directed order for matching through the continuous order matching process;
where the order sending firm is permissioned to send directed orders to the specified market maker, retrieving the guarantee order book and retrieving the best contra side guarantee order from the plurality of guarantee orders on the guarantee order book;
determining the marketability, including determining routing restrictions, of the directed order in relation to the retrieved best guarantee order;
for marketable directed orders, setting the price at which a directed cross is to execute;
determining the maximum size of a potential directed cross;
generating a match instruction for the directed order that pairs the directed order with the retrieved guarantee order and includes parameters for the determined directed cross price and the determined maximum size of the potential directed cross;
ranking the retrieved guarantee order in the internal book;
presenting the received directed order to the internal book;
retrieving the best contra side interest from the internal book; and
determining if the retrieved best contra side interest is the guarantee order paired with the directed order in the match instruction,
wherein if the retrieved best contra side interest is the paired guarantee order, matching the received directed order with the paired guarantee order at the determined directed cross price and at the determined maximum size, and
wherein the directed cross occurs automatically thereby eliminating human intervention and preventing negotiation in order matching.

2. The method of claim 1, wherein the received directed order is a buy order and the retrieved contra side guarantee order is a sell order.

3. The method of claim 1, wherein the received directed order is a sell order and the retrieved contra side guarantee order is a buy order.

4. The method of claim 1, wherein the posting market center interacts with a plurality of designated market makers and order sending firms; wherein the posting maker center has a plurality of guarantee orders books and wherein each designated market maker creates a specific guarantee order book for each order sending firm that is permissioned to send such designated market maker a directed order.

5. The method of claim 1, wherein the posting market center further includes a table storing the DMM/OSF table data, said table data listing which order sending firms are permissioned to send directed orders to which designated market makers.

6. The method of claim 5, wherein the permissions table includes a designation which specifies a default designated market maker for a specific order sending firm.

7. The method of claim 1, wherein validating the received guarantee orders includes determining if the received guarantee order crosses the guarantee order book.

8. The method of claim 1, wherein validating the received guarantee orders includes determining if the received guarantee order has the same price as a guarantee order already on the guarantee order book.

9. The method of claim 1, wherein at least one of the received guarantee orders on the guarantee order book is a pegged order.

10. The method of claim 9, wherein the price of the pegged order is updated when the NBBO changes.

11. The method of claim 9, wherein the pegged order includes a discretionary offset.

12. The method of claim 9, wherein the pegged order includes a peg offset.

13. The method of claim 12, wherein the pegged order includes a peg limit.

14. The method of claim 1, wherein the parameter for the determined directed cross price is adjusted to prevent a trade through violation.

15. The method of claim 1, wherein if the retrieved best contra side interest is a regular book order, matching the received directed order with the retrieved contra side book order up to the size of the retrieved contra side book order and continuing to match the received directed order with contra side interest in the internal book until the directed order is fully traded or the directed order matches with the paired guarantee order.

16. The method of claim 1, wherein if the retrieved best contra side interest is a protected away market quote, determining whether the received directed order can be routed and where the received directed order can be routed, routing commitments on behalf of the directed order to the away market center up to the size of the away market quote; and continuing to match the received directed order with contra side interest in the internal book until the directed order is fully traded or the directed order matches with the paired guarantee order.

17. The method of claim 1, wherein if, after matching the received directed order, a portion of the guarantee order remains, returning the unmatched portion of the guarantee order to the guarantee order book.

18. A posting market center, comprising:

a computer system having memory and a processor executing one or more routines that generate and present an internal book and a guarantee order book, wherein the guarantee order book is specified for a designated market maker to populate the guarantee order book with guarantee orders for a specific order sending firm that is permissioned to send directed orders to the designated market maker;

an interface for receiving orders, including guarantee orders and directed orders;

the posting market center memory for storing code for analyzing and matching guarantee orders and directed orders; and the processor for interacting with the interface and executing the code for analyzing and matching guarantee orders and directed orders, wherein the code, when executed:

automatically executes non-directed order trades via a continuous order matching process;

receives a plurality of guarantee orders from the designated market maker intended for a specific order sending firm;

validates the received guarantee orders;

populates the guarantee order book with the validated guarantee orders;

receives a directed order from the order sending firm directed to a specific designated market maker;

automatically activates a Check Permissions for Incoming Directed Order (CPIDO) routine upon receipt of the directed order, the CPIDO routine, when executed, causing the activated CPIDO routine to perform functions including:

identifying the order sending firm;

requesting and retrieving designated market maker order sending firm (DMM/OSF) table data; and comparing the identity of the order sending firm against the table data to verify permission;

where the order sending firm does not have permission to send directed orders to the specified market maker, automatically converts the directed order to a non-directed order for matching through the continuous order matching process;

where the order sending firm is permissioned to send directed orders to the specified market maker, retrieves the guarantee order book and retrieves the best contra side guarantee order from the plurality of guarantee orders on the guarantee order book;

determines the marketability, including determining routing restrictions, of the directed order in relation to the retrieved best guarantee order;

for marketable directed orders, sets the price at which a directed cross is to execute;

determines the maximum size of a potential directed cross;

generates a match instruction for the directed order that pairs the directed order with the retrieved guarantee order and includes parameters for the determined directed cross price and the determined maximum size of the potential directed cross;

ranks the retrieved guarantee order in the internal book;

presents the received directed order to the internal book;

retrieves the best contra side interest from the internal book; and determines if the retrieved best contra side interest is the guarantee order paired with the directed order in the match instruction, wherein if the retrieved best contra side interest is the paired guarantee order, matches the received directed order with the paired guarantee order at the determined directed cross price and at the determined maximum size, and wherein the directed cross occurs automatically thereby eliminating human intervention and preventing negotiation in order matching.

* * * * *